(12) United States Patent
Unose et al.

(10) Patent No.: US 6,484,077 B1
(45) Date of Patent: Nov. 19, 2002

(54) MOBILE VEHICLE TRAVEL CONTROL SYSTEM

(75) Inventors: Noriyuki Unose; Eiichi Inoue; Yoshiharu Nakazono; Muneatsu Minato; Hideya Yamamuro, all of Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 90 days.

(21) Appl. No.: 09/629,718

(22) Filed: Jul. 31, 2000

(51) Int. Cl.$^7$ ............................................. G06F 17/00
(52) U.S. Cl. ............................ 701/24; 701/19; 701/33
(58) Field of Search ............................ 701/20, 19, 29, 701/32, 33, 34, 35; 709/217, 218, 223

(56) References Cited

U.S. PATENT DOCUMENTS 5,537,414 A * 7/1996 Takiyasu et al. ............ 370/347

FOREIGN PATENT DOCUMENTS

| JP | 5-24538 | 2/1993 |
|----|---------|--------|
| JP | 5-75573 | 3/1993 |
| JP | 7-81567 | 3/1995 |
| JP | 7-95145 | 4/1995 |
| JP | 7095145 | 4/1995 |
| JP | 7-182038 | 7/1995 |
| JP | 9062352 | 3/1997 |

* cited by examiner

Primary Examiner—Tan Nguyen

(57) ABSTRACT

An assembly carrying vehicle running control system, includes a plurality of assembly carrying vehicles, a control apparatus, and a plurality of access points connected with said control apparatus and provided for said plurality of assembly carrying vehicles. Each of the plurality of access points has a communication area. When each of the plurality of assembly carrying vehicles is individually in the communication area of a currently communicating access point of the plurality of access points, the assembly carrying vehicle transmits an operation status data indicative of an operation status to the control apparatus through the currently communicating access point. The control apparatus determines an operation control instruction based on the operation status data to transmit to the assembly carrying vehicle. The assembly carrying vehicle receives the operation control instruction from the control apparatus through the currently communicating access point such that an operation of the assembly carrying vehicle is controlled based on the operation control instruction.

58 Claims, 21 Drawing Sheets

MOBILE VEHICLE TRAVEL CONTROL SYSTEM

BACKGROUND OF THE INVENTION

1. Field of the Invention

The present invention relates to a travel control system for an assembly carrying vehicle.

2. Description of the Related Art

An assembly carrying vehicle is used to carry the body of an automobile to be assembled in an automobile assembly line of an automobile production factory. Therefore, a system for controlling running or travel of the assembly carrying vehicles is necessary. A conventional assembly carrying vehicle is run along a predetermined energized orbit. An electrical power for the assembly carrying vehicle is supplied to the vehicle through the contact of a brush to the orbit.

The conventional assembly carrying vehicle running or travel control system will be described below. In the conventional assembly carrying vehicle running control system, the assembly carrying vehicle is generally used in a final automobile assembly line, during which parts such as seats, doors, interior, and exterior are mounted on the body after painting.

At first, a different individual work is carried out in each of a plurality of stations disposed along the orbit on which the assembly carrying vehicle runs, manually or by use of a working robot in the final automobile assembly line. The assembly carrying vehicle is moved at a slow speed in the station in which the work is manually carried out, while the assembly carrying vehicle is stopped in a perfectly positioned state in the station in which the work is carried out by use of the working robot. Generally, the manual work is carried out to mount a small part, and the work using the working robot is carried out to mount a large part such as a door. Also, in the respective stations, a height of the body carried by the assembly carrying vehicle from a floor is automatically adjusted to a height at which a worker can easily carry out the mounting work, or an appropriate height when the mounting work is carried out by use of the working robot.

The assembly carrying vehicle running control system has a control apparatus for controlling the whole system. The movement of the assembly carrying vehicle is controlled through communication between the control apparatus and the assembly carrying vehicle. The communication is carried out between a communicating unit of the assembly carrying vehicle and a plurality of access points (AP) connected to the control apparatus.

Conventionally, a fixed point communication system using optical communication has been mainly used for the communication between the assembly carrying vehicle and the access points AP. In recent years, a radio communication system has been used for the communication between the assembly carrying vehicle and the access points AP.

A technique related to such a radio go communication system is disclosed in Japanese Laid Open Patent Application (JP-A-Heisei 7-95145). In this reference, it is intended to easily check a communication status in all communication positions on a moving route of an assembly carrying vehicle. In this configuration, the assembly carrying vehicle has a communicating unit for carrying out radio communication with a communicating unit of a ground station. The assembly carrying vehicle communicating unit is provided with a controlling section and a communication position detecting section. The controlling section controls the movement of the assembly carrying vehicle, and also controls a communicating operation of the assembly carrying vehicle communicating unit. The communication position detecting section detects a communication position at which a communication with the ground station communicating unit is carried out. Then, in the conventional assembly carrying vehicle running control system, the controlling section drives the assembly carrying vehicle communicating unit in accordance with the detected result of the communication position detecting section.

When a communication test mode is instructed, the controlling unit controls the assembly carrying vehicle to carry out a test run to pass through each of a plurality of test communication positions. Also, the controlling unit controls the communicating unit to carry out a test communication with the ground station communicating unit in each of the plurality of test communication positions. Moreover, a spectrum spreading communication method may be used in the radio communication.

Next, another conventional technique with regard to the operational control of the assembly carrying vehicle will be described below. At first, a plurality of fixed indication plates are installed on a predetermined orbit on which the assembly carrying vehicle moves. The indication plates are fixedly installed on a floor. A sensor is mounted in the assembly carrying vehicle to detect the indication plate. When detecting one of the plurality of indication plates by use of the sensor, the assembly carrying vehicle acquires an operation pattern data at the detected location. The operation of the assembly carrying vehicle is defined by the operation pattern data from an external unit. The assembly carrying vehicle carries out an operation to retain or maintain a tact pitch distance, a cornering operation or a constant speed operation, until detecting a next one of the plurality of fixed indication plates by use of the sensor.

In this way, according to the conventional technique, a current position control for the assembly carrying vehicle itself is not carried out. Therefore, it is difficult to carry out a position recovery resulting from occurrence of overrun or a position displacement of the assembly carrying vehicle. Also, this requires work for changing the fixed indication plates in association with a line change. Hence, in the above configuration, the line can not be changed flexibly or easily.

Also, in the conventional assembly carrying vehicle running controller system, the control of the assembly carrying vehicle is carried out by the control apparatus through monitoring a status table of the assembly carrying vehicle.

A supersonic sensor is mounted on an assembly carrying vehicle, in order to measure a distance from a preceding assembly carrying vehicle running immediately before. The running speed of the assembly carrying vehicle can be adjusted based on the distance from the preceding assembly carrying vehicle, which is measured by the supersonic sensor. Thus, the assembly carrying vehicle can be moved while keeping a constant interval from the preceding assembly carrying vehicle. When the assembly carrying vehicle is running on a corner on a predetermined orbit, the supersonic sensor may likely sense things other than the preceding assembly carrying vehicle. For this reason, it is impossible to accurately measure the distance from the preceding assembly carrying vehicle on the corner. Hence, when the assembly carrying vehicle is running on the corner, the running control can not be carried out by use of the supersonic sensor. Especially, if the assembly carrying vehicle is urgently stopped on the corner, a succeeding assembly carrying vehicle may collide with the preceding assembly carrying vehicle.

Also, in the conventional assembly carrying vehicle running control system, the running or travel control of the assembly carrying vehicle is carried out through optical communication between the control apparatus and the communicating unit of the assembly carrying vehicle via a relaying unit, which is provided for one of the plurality of fixed indication plates. The assembly carrying vehicle receives control data such as a running operation and the height of a carried member through the communication. Then, the assembly carrying vehicle is moved to the next fixed indication plate based on the control data. For this reason, when trouble occurs in a part of the fixed indication plates, the assembly carrying vehicle can not be correctly controlled.

In conjunction with the above description, a spectrum spreading communication apparatus is disclosed in Japanese Laid Open Patent Application (JP-A-Heisei 5-75573). In this reference, a received signal is subjected to FFT frequency analysis to extract noise. The extracted noise is subjected to inverse FFT transformation. The noise is inverted and added to the received signal. As a result, the noise is removed from the received or cancelled signal.

Also, a train position detecting apparatus is disclosed in Japanese Laid Open Patent Application (JP-A-Heisei 5-24538). In this reference, a spread signal is alternately sent to crossed induction lines from a pair of antennas which are provided on a train. A receiver is provided to carry out an inverse spreading operation. In this way, it can be detected that the pair of antennas of the train is positioned on one of the loops.

Also, a train detecting apparatus is disclosed in Japanese Laid Open Patent Application (JP-A-Heisei 7-81567). In this reference, a PN code sequence of PN1 code and a PN2 code is spread and modulated to produce a modulation signal. The modulation signal is transmitted from a ground transmitting side to a loop P. A signal is received and demodulated by a ground receiving side, and the PN code sequence is extracted from the demodulated signal by use of a low pass filter. Then, each of the PN codes is detected by use of correlation matched filters. From a train, a signal which has been spread and modulated with the PN1 code is always transmitted from the head portion of the train to the loop. Also, a signal which has been spread and modulated with the PN2 code is always transmitted from the last portion of the train to the loop. In this way, when only the PN code contained in the signal from the ground transmitting side is detected, a relay CHR is turned on. Thus, it is detected that there is no train. When the PN code contained in the signal from the ground transmitting side and the PN1 code from the head portion of the train are detected, the relay CHR is turned off and a relay INR is turned on. Thus, it is detected that the train is coming in the loop. When the PN code contained in the signal from the ground transmitting side and the PN2 code from the last portion of the train are detected, the relay CHR and the relay INR are turned off and a relay OUTR is turned on. Thus, it is detected that the train is going out from the loop.

Also, a moving vehicle control facility is disclosed in Japanese Laid Open Patent Application (JP-A-Heisei 7-182038). In this reference, memory media are provided along a running route L of a moving vehicle. Each of the memory media is composed of a storage section for storing control data of the moving vehicle, and a communicating section for communicating the control data. The moving vehicle is composed of a read section for reading the control data through communication with one of the memory media and a control unit,for controlling the operation of the moving vehicle based on the control data. In such a system, the control data is divisionally stored in a plurality of memory media TPA and TPB which are arranged adjacent to each other along the running route L. The control section reads out the control data from the memory media TPA and TPB while the moving vehicle runs on the running route L.

SUMMARY OF THE INVENTION

Therefore, an object of the present invention is to provide an assembly carrying vehicle travel control system in which a current position of an assembly carrying vehicle can be accurately detected.

Another object of the present invention is to provide an assembly carrying vehicle travel control system in which an assembly carrying vehicle can be always controlled by a control apparatus.

Still another object of the present invention is to provide an assembly carrying vehicle travel control system in which the running state of an assembly carrying vehicle on a corner of an orbit can be properly managed by a control apparatus.

Yet still another object of the present invention is to provide an assembly carrying vehicle travel control system in which a collision between assembly carrying vehicles on a corner can avoided.

It is also an object of the present invention to provide an assembly carrying vehicle travel control system in which stoppage of the running operation of the assembly carrying vehicle is assured even when one of a plurality of access points has failed.

Another object of the present invention is to provide an assembly carrying vehicle travel control system in which a control apparatus can communicate with an assembly carrying vehicle irrespective of the position of the assembly carrying vehicle.

Still another object of the present invention is to provide an assembly carrying vehicle travel control system in which a control apparatus can always communicate with an assembly carrying vehicle via access points.

Yet still another object of the present invention is to provide an assembly carrying vehicle travel control system in which a high speed roaming operation by an assembly carrying vehicle can be made possible when the control apparatus communicates with the running assembly carrying vehicle through one of a plurality of access points.

It is an object of the present invention to provide an assembly carrying vehicle travel control system in which collisions between assembly carrying vehicles can be avoided, even when any failure occurs in the running assembly carrying vehicles.

In order to achieve an aspect of the present invention, an assembly carrying vehicle travel control system includes a plurality of assembly carrying vehicles, a control apparatus, and a plurality of access points. The plurality of access points are connected with the control apparatus and provided for the plurality of assembly carrying vehicles. Each of the plurality of access points has a communication area. When each of the plurality of assembly carrying vehicles is individually in the communication area of a currently communicating one of the access points, the assembly carrying vehicle transmits an operation status data indicative of an operation status thereof to the control apparatus through the currently communicating access point. The control apparatus determines an operation control instruction based on the operation status data to transmits the instruction to the assembly carrying vehicle. The assembly carrying vehicle receives the operation control instruction from the control apparatus through the currently communicating access point such that an operation of the assembly carrying vehicle is controlled based on the operation control instruction.

In this case, the control apparatus may issue a state notice request signal to the plurality of access points. Each of the plurality of access points transmits an access point operating state data indicating an operating state thereof to the control apparatus. The control apparatus determines a failed one of the plurality of access points based on the access point operating state data.

Also, it is desirable that each of the plurality of access points has a peculiar data and transmits the peculiar data to the control apparatus in response to the state notice request signal from the control apparatus when the access point has not failed. The control apparatus determines the failed access point from the transmitted peculiar data from the plurality of access points. Alternately, each of the plurality of access points may transmit the peculiar data to the control apparatus in response to the state notice request signal from the control apparatus when the access point has failed. At that time, the control apparatus determines the failed access point from the peculiar data transmitted from the plurality of access points.

Also, the control apparatus and the plurality of access points may be connected with a LAN using Ethernet.

The plurality of access points are arranged such that electric field intensity levels of reception signals from a predetermined number of ones of the plurality of access points are equal to or higher than a first threshold intensity level. In this case, the plurality of access points are desirably arranged such that the electric field intensity level of the reception signal from at least one of the predetermined number of access points is equal to or higher than a second threshold intensity level. Here, the second threshold intensity level is higher than the first threshold intensity level. Also, the predetermined number may be at least 2.

Also, the plurality of access points may be arranged such that electric field intensity levels of reception signals from two or more of the plurality of access points are at least a predetermined threshold intensity level.

Also, the currently communicating access point may include a communicating unit to communicate with the assembly carrying vehicle. In this case, the control apparatus transmits the operation control instruction to the assembly carrying vehicle via the currently communicating access point. Each of the assembly carrying vehicle may include a communicating unit communicating with the currently communicating access point and with the control apparatus via the currently communicating access point, and a control unit controlling the operation of the assembly carrying vehicle based on the operation control instruction received from the control apparatus via the currently communicating access point. In this case, it is desirable that the communication between the currently communicating access point and the one assembly carrying vehicle is a spectrum spreading communication of a frequency hopping system.

Also, the control apparatus may determine the operation status of the assembly carrying vehicle based on the operation status data transmitted from the assembly carrying vehicle, and transmit an operation status data indicative of the determined operation as the operation control instruction to the assembly carrying vehicle. Also, the assembly carrying vehicle may further include a high speed roaming table, which stores next communicatable ones of the plurality of access points. The next communicatable access points are associated with the currently communicating access point. In this case, the control unit selects one of the next communicatable access points stored in the high speed roaming table as a new currently communicating access point when an electric field intensity of a reception signal from the currently communicating access point becomes lower than a predetermined threshold intensity level. Each of the plurality of access points may also have a high speed roaming table to store the next communicatable access points. The communicating unit of the assembly carrying vehicle receives the next communicatable access points from the currently communicating access point. The control unit stores the next communicatable access points received from the currently communicating access point in the high speed roaming table of the assembly carrying vehicle.

Also, the control unit selects one, having a maximum reception signal electric field intensity level, of the next communicatable access points stored in the high speed roaming table of the assembly carrying vehicle, when the reception signal electric field intensity level from the currently communicating access point is lower than the predetermined threshold intensity level.

Also, the control apparatus may include an input unit used to input the next communicatable access points for each of the plurality of access points, and a which notifies unit notifying the inputted next communicatable access points to the plurality of access points, respectively. Each of the plurality of access points stores the next communicatable access points received from the control apparatus in the roaming table thereof.

Also, each of the plurality of assembly carrying vehicles has a status table indicating the operation status of the assembly carrying vehicle. The communicating unit of the assembly carrying vehicle transmits a data of the status table as the operation status data to the control apparatus through the currently communicating access point. In this case, the data of the status table may include: a current position data indicative of a current position of the assembly carrying vehicle; the operation status data indicative of the operation status of the assembly carrying vehicle; and a failure indication data indicative of a failure in the assembly carrying vehicle. The communicating unit notifies the operation status data of the assembly carrying vehicle to the control apparatus, when the operating status data or the failure indication data of the assembly carrying vehicle is updated. In this case, the control apparatus may further include a display unit displaying at least one of the current position of the assembly carrying vehicle, the operation status thereof, and existence or non-existence of the failure based on the operation status data transmitted from the assembly carrying vehicle.

Also, the assembly carrying vehicle travel control system may further include a plurality of position indication members provided along an orbit, the assembly carrying vehicle traveling on the orbit. It is desirable that each of the assembly carrying vehicles includes a position indication member detector which detects each of the plurality of indication members, and a running distance measuring unit measuring a running distance of the assembly carrying vehicle from a start point of the orbit to a current position of the assembly carrying vehicle, or from one of the plurality of position indication members to a next one of the plurality of position indication members. In this case, the communicating unit of the assembly carrying vehicle transmits a failure indication data to the control apparatus when a difference between a position corresponding to one of the position indication members detected by the position indication member detector and a position corresponding to the running distance measured by the running distance measuring unit is larger than a predetermined value. Also, the running distance measuring unit measures the running distance of the assembly carrying vehicle based on a number of rotations of a motor to drive a wheel of the assembly carrying vehicle.

Also, each of the assembly carrying vehicles may further include an operation table, which stores a plurality of operation data indicative of operations to be executed by the assembly carrying vehicle. The control unit acquires a specific one of the plurality of operation data from the operation table and carries out the operation corresponding to the acquired operation data. In this case, the communicating unit receives a plurality of operation data from the control apparatus at a start point of the orbit, and the control unit stores the plurality of operation data received by the communicating unit in the operation table. Also, the plurality of operation data may be stored by the control unit in the operation table in an order of execution. In this case, the control units accesses to the operation table based on a number of position indication members detected by the position indication member detector from the start point of the orbit to acquire one of the plurality of operation data, and executes the operation corresponding to the acquired operation data. Alternatively, when the plurality of operation data are stored in the operation table based on the distance from the start point of the orbit and, the control units accesses to the operation table based on the running distance measured by the running distance measuring unit to acquire one of the plurality of operation data, and executes the operation corresponding to the acquired operation data.

Also, when each of the plurality of operation data received by the communicating unit contains a distance data, the control unit may search the operation table for one of the plurality of operation data having a distance data corresponding to the running distance measured by the running distance measuring unit, and carry out any such operation data found by the search. In this case, the control unit may continue to carry out a current one of the operation data, when any of the operation data having the distance data corresponding to the running distance measured is not found by the search.

Also, the control unit may transmit the operation status data indicative of failure occurrence to the control apparatus when the position indication member detector does not detect any position indication member for a predetermined time interval after a previous position indication member is detected. Then the control apparatus transmits a stop request signal as the operation control instruction to the plurality of assembly carrying vehicles, and the control unit of the assembly carrying vehicle stops the running of the assembly carrying vehicle in response to the stop request signal. In this case the control system is a operative according to the equations:

$$I < T1 \times V$$

$$T1 < W/V - T2$$

where I is a distance between the previous position indication member and the position indication member currently detected, T1 is the predetermined time interval, V is a velocity of the assembly carrying vehicle, W is a distance between the assembly carrying vehicle and a preceding one of the plurality of assembly carrying vehicles, and T2 is a time interval from transmission of the operation status data indicative of failure occurrence by the preceding assembly carrying vehicle to reception of the stop request signal.

Also, the current position of the assembly carrying vehicle is updated based on a position data corresponding to the position indication member currently detected by the position indication member detector.

In another aspect, a control method of an assembly carrying vehicle in an assembly carrying vehicle travel control system, is attained by the steps of arranging a plurality of position indication members along an orbit, each of a plurality of assembly carrying vehicles running on the orbit; providing a plurality of access points connected to a control apparatus, each of the plurality of access points has a communication area, and each of the assembly carrying vehicles being communicatable with one of the plurality of access points as a currently communicating access point when the assembly carrying vehicle is in the communication area of the one access point; transmitting from the assembly carrying vehicle an operation status data indicative of an operation status thereof to the control apparatus through the currently communicating access point; determining by the control apparatus an operation control instruction based on the operation status data and transmitting the operation control instruction to the assembly carrying vehicle; receiving the operation control instruction by the assembly carrying vehicle from the control apparatus through the currently communicating access point; and controlling operation of the assembly carrying vehicle based on the operation control instruction received from the control apparatus via the currently communicating access point.

The control method may further include the steps of: detecting each of the plurality of position indication members; measuring a running distance of the assembly carrying vehicle from a start point of the orbit to a current position of the assembly carrying vehicle, or from one of the plurality of indication members to a next one of the plurality of indication members; determining a current position of the assembly carrying vehicle based on at least one of the detected position indication members or the measured running distance: receiving and storing a plurality of operation data indicative of operations to be executed by the assembly carrying vehicle in an operation table; controlling the operation of the assembly carrying vehicle based on a specific one of the plurality of operation data which is determined based on the determined current position; updating a status table indicating the operation status of the assembly carrying vehicle based on at least one of change of the operation status of the assembly carrying vehicle, change of the at least one detected position indication member or the measured running distance, and a failure of the assembly carrying vehicle; and transmitting the status table as the operation status data from the assembly carrying vehicle to the control apparatus.

The step of providing a plurality of access points is attained by transmitting a state notice request signal from the control apparatus to the plurality of access points; transmitting from each of the plurality of access points an access point operating state data indicating an operating state thereof to the control apparatus; and determining a failed one of the plurality of access points by the control apparatus based on the access point operating state data.

Also, when each of the plurality of access points has a peculiar data, the control method may further include the step of: notifying the peculiar data from each of the plurality of access points to the control apparatus in response to the state notice request signal from the control apparatus, when the access point has not failed; and the step of determining a failed one of access points involves determining the failed access point from the notified peculiar data from the plurality of access points. Alternately, when each of the plurality of access points has a peculiar data, the control method may further include the step of: notifying the peculiar data from each of the plurality of access points to the control apparatus in response to the state notice request signal from the control apparatus, when the access point has failed; and the step of determining a failed one of access points involves determining the failed access point from the notified peculiar data from the plurality of access points.

Also, the control apparatus and the plurality of access points may be connected with a LAN using Ethernet.

Also, the step of providing a plurality of access points may be attained by arranging the plurality of access points such that electric field intensity levels of reception signals from a predetermined number of ones of the plurality of access points are higher than a first threshold intensity level. In this case, the step of providing a plurality of access points may include: arranging the plurality of access points such that the electric field intensity level of the reception signal from at least one of the predetermined number of access points is higher than a second threshold intensity level, the second threshold intensity level is higher than the first threshold intensity level. It is desirable that the predetermined number is equal to or more than 2.

Also, the step of providing a plurality of access points may be attained by arranging the plurality of access points such that electric field intensity levels of reception signals from two or more of the plurality of access points are higher than a predetermined threshold intensity level.

Also, communication between the currently communicating access point and the assembly carrying vehicle may be a spectrum spreading communication of a frequency hopping system.

Also, the step of determining an operation control instruction may include: determining the operation status of the assembly carrying vehicle by the control apparatus based on the operation status data transmitted from the assembly carrying vehicle, and transmitting an operation data indicative of the determined operation status as the operation control instruction to the assembly carrying vehicle.

The control method may further include the step of: selecting one of next communicatable access points stored in a high speed roaming table of the assembly carrying vehicle as a new currently communicating access point, when an electric field intensity of a reception signal from the currently communicating access point becomes lower than a predetermined threshold intensity level, wherein the next communicatable access points are associated with the currently communicating access point. In this case, when each of the plurality of access points also include a high speed roaming table to store the next communicatable access points, the step of selecting one of next communicatable access points may be attained by receiving the next communicatable access points from the currently communicating access point to store in the high speed roaming table of the assembly carrying vehicle.

Also, the selecting step may include: selecting one, having a maximum reception signal electric field intensity level, of the next communicatable access points stored in the high speed roaming table of the assembly carrying vehicle, when the reception signal electric field intensity level from the currently communicating access point is lower than a predetermined threshold intensity level.

Also, the selecting step may be attained by inputting the next communicatable access points for each of the plurality of access points in the control apparatus; by transmitting the inputted next communicatable access points to the plurality of access points, respectively; and by storing the next communicatable access points received from the control apparatus in the roaming table of each of the plurality of access points.

Also, the control method may further includes the step of: Also, displaying at least one of the current position of the assembly carrying vehicle, the operation status thereof, and existence or non-existence of the failure of the assembly carrying vehicle based on the operation status data notified from the assembly carrying vehicle.

The control method may further include the step of: transmitting a failure indication data from the assembly carrying vehicle to the control apparatus when a difference between a position corresponding to a detected one of the position indication members and a position corresponding to the measured running distance of the assembly carrying vehicle is larger than a predetermined value.

Also, the measuring step includes: measuring the running distance of the assembly carrying vehicle based on a number of rotations of a motor driving a wheel of the assembly carrying vehicle.

The step of receiving and storing a plurality of operation data may include: receiving the plurality of operation data from the control apparatus at a start point of the orbit; and storing the plurality of received operation data in the operation table. In this case, the step of storing the plurality of received operation data may be attained by storing the plurality of received operation data in the operation table in an order of execution, and the step of controlling operation of the assembly carrying vehicle may be attained by accessing the operation table based on a number of position indication members detected from the start point of the orbit to acquire one of the plurality of operation data; and carrying out the operation corresponding to the acquired one of the plurality of operation data.

Also, the storing the step of plurality of received operation data may be attained by storing the plurality of received operation data in the operation table based on the running distance from the start point of the orbit, and the step of controlling an operation of the assembly carrying vehicle may be attained by accessing the operation table based on the measured running distance to acquire one of the plurality of operation data; and carrying out the operation corresponding to the acquired one of the plurality of operation data.

Also, when each of the plurality of operation data contains a distance data, the step of controlling an operation of the assembly carrying vehicle may be attained by searching the operation table for a specific one of the plurality of operation data having a distance data corresponding to the measured running distance and carrying out any such operation data found by the search. In this case, the step of controlling an operation of the assembly carrying may include: continuing to carry vehicle out a current operation data when any operation data having the distance data corresponding to the measured distance measured is not found by the search.

Also, the step of controlling an operation of the assembly carrying vehicle may include: transmitting the operation status data indicative of failure occurrence to the control apparatus when any of the position indication members is not detected for a predetermined time interval after a previous position indication member is detected. The control method may further include the step of: transmitting by the control apparatus a stop request signal as the operation control instruction to the assembly carrying vehicle upon receiving the operation status data indicative. Also, the step of controlling an operation of the assembly carrying vehicle may stop the running of the assembly carrying vehicle in response to the stop request signal. In this case the method is operative according to the equations, $$I < T1 \times V$$

$$T1 < W/V - T2$$

where I is a distance between the previous position indication member and the position indication member currently detected, T1 is the predetermined time interval, V is a velocity of the assembly carrying vehicle, W is a distance between the assembly carrying vehicle and a preceding one of the plurality of assembly carrying vehicles, and T2 is a time interval from transmission of the operation status data indicative of failure occurrence by the preceding assembly carrying vehicle to reception of the stop request signal.

Also, the current position of the assembly carrying vehicle is updated based on a position data corresponding to the detected position indication members.

DESCRIPTION OF THE PREFERRED EMBODIMENTS

An assembly carrying vehicle travel control system of the present invention will be described below in detail with reference to the attached drawings. Hereinafter the terms "travel" and "running" are used interchangeably. The assembly carrying vehicle running control system of the present invention is applied to an automobile assembly line, especially to a final automobile assembly line. However, the present invention is not limited to such specific applications.

Figure 1:
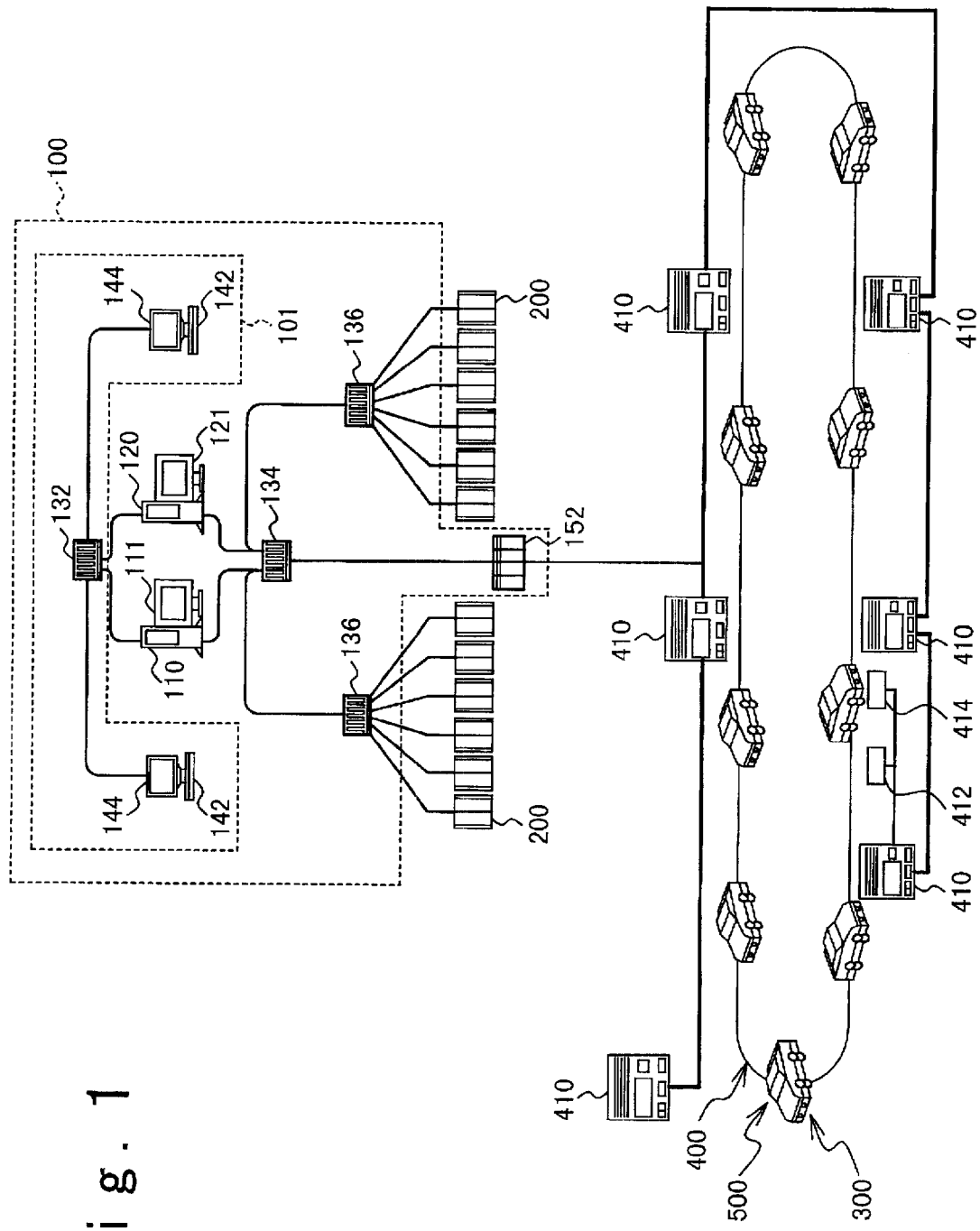
FIG. 1 is a diagram showing the structure of an assembly carrying vehicle travel control system of the present invention.

FIG. 1 is a schematic block diagram showing the structure of the assembly carrying vehicle running control system of the present invention. Referring to FIG. 1, the assembly carrying vehicle running control system of the present invention is composed of a control apparatus 100, a plurality of access points AP 200, a plurality of assembly carrying vehicles 300, a plurality of indication plates 402 (not shown in FIG. 1), a plurality of block controllers 410, and a plurality of stations 412 and 414 controlled by each block controller 410.

The control apparatus 100 is connected to the plurality of access point AP 200, and communicates with the respective assembly carrying vehicles 300 through the access points AP 200. The control apparatus 100 controls or manages the running states of the assembly carrying vehicles 300 through the communication with each of the assembly carrying vehicles 300. Also, the control apparatus 100 is connected to the plurality of block controllers 410, and manages or controls the operations carried out in the plurality of stations 412 and 414 through each block controller 410.

The control apparatus 100 of the present invention is composed of an input and output unit 101, a host computer 110, a host computer display 111, a backup computer 120, a backup computer display 121, a block controller relaying unit 152, a relaying unit 134 and access point AP relaying units 136. The input and output unit 101 is composed of a plurality of data input and output computers 142, a plurality of display units 144, and a relaying unit 132.

The host computer 110 has a control algorithm to control the whole system, the station control data to control the respective stations 412 and 414 and the assembly carrying vehicle control data to control the operation of each of the assembly carrying vehicles 300. The control algorithm is composed of a station control algorithm to control the operations of the stations 412 and 414 and a control algorithm to control the access points AP 200 and the assembly carrying vehicles 300. The station control data is sent through the relaying units 134 and 152 to the plurality of block controllers 410. Thus, the block controller 410 receiving the station control data controls the respective stations 412 and 414. The assembly carrying vehicle control data is sent through the relaying unit 134 and 136 to the access points AP 200, and then sent from the access points AP 200 to the assembly carrying vehicles 300.

Also, the host computer 110 is connected to the host computer display unit 111. Thus, various data managed by the host computer 110 can be displayed on the host computer display unit 111.

The computers 142 of the input and output unit 101 are used to update the station control data and the assembly carrying vehicle control data stored in the control apparatus 100 through the relaying unit 132. The assembly carrying vehicle control data includes data indicative of the installation positions of the respective indication plates 402. The assembly carrying vehicles 300 and the stations 412 and 414 are managed or controlled based on the assembly carrying vehicle control data and the station control data. Also, the computers 142 are used to update the control algorithm. The computers 142 are connected to the corresponding display units 144. Thus, the data inputted to and outputted from the host computer 110 can be displayed on the display units 144.

The control apparatus 100 has at least one backup computer 120 for trouble countermeasure of the host computer 110. The backup computer 120 has the same function as the host computer 110. When any trouble occurs in the host computer 110, the backup computer 120 controls the whole control system, instead of the host computer 110. For this purpose, similarly to the host computer 110, the backup computer 120 is connected to the plurality of block controllers 410 through the relaying unit 134 and 152. Also, the backup computer 120 is connected to the access points AP 200 through the relaying unit 134 and 136, and connected to the computers 142 through the relaying unit 132. The backup computer 120 is connected to the backup computer display unit 121. Thus, various data managed by the backup computer 120 can be displayed on the backup computer display 121.

A local area network (LAN) using Ethernet is used for the connections between the respective units provided in the control apparatus 100. According to the present invention, 100 Base-TX is, for example used for the respective connections between the host computer,110, the backup computer 120, the data input output computers 142, and the relaying units 152, 132, 134 and 136. Also, 10 Base-T is, for example used for the connections between the access point AP relaying units 136 and the respective access points AP 200. Thus, each access point AP 200 can communicate with the plurality of assembly carrying vehicles 300.

The access points AP 200 are installed at positions near the orbit 400 on which the assembly carrying vehicles 300 are moved. The communication between one of the access points AP 200 and one of the assembly carrying vehicles 300 can be carried out when the assembly carrying vehicle 300 passes through or stops at a preset fixed point associated with the access point. The fixed points are different from each other for each access point AP 200. One of the access points AP 200 is provided at a start point of a work line.

Each assembly carrying vehicle 300 carries an automobile 500 which is being assembled. Each assembly carrying vehicle 300 can communicate with each access point associated therewith AP 200 at the fixed point.

The plurality of indication plates 402 are installed on a floor along the orbit 400, on which the assembly carrying vehicle 300 is moved. One of the indication plates 402 is provided at a start point of the orbit 400.

The plurality of block controllers 410 control or manage the plurality of stations 412 and 414 in accordance with instructions from the control apparatus 100. A predetermined process for final assembling of an automobile is carried out manually or by use of a robot in the plurality of stations 412 and 414.

Figure 2:
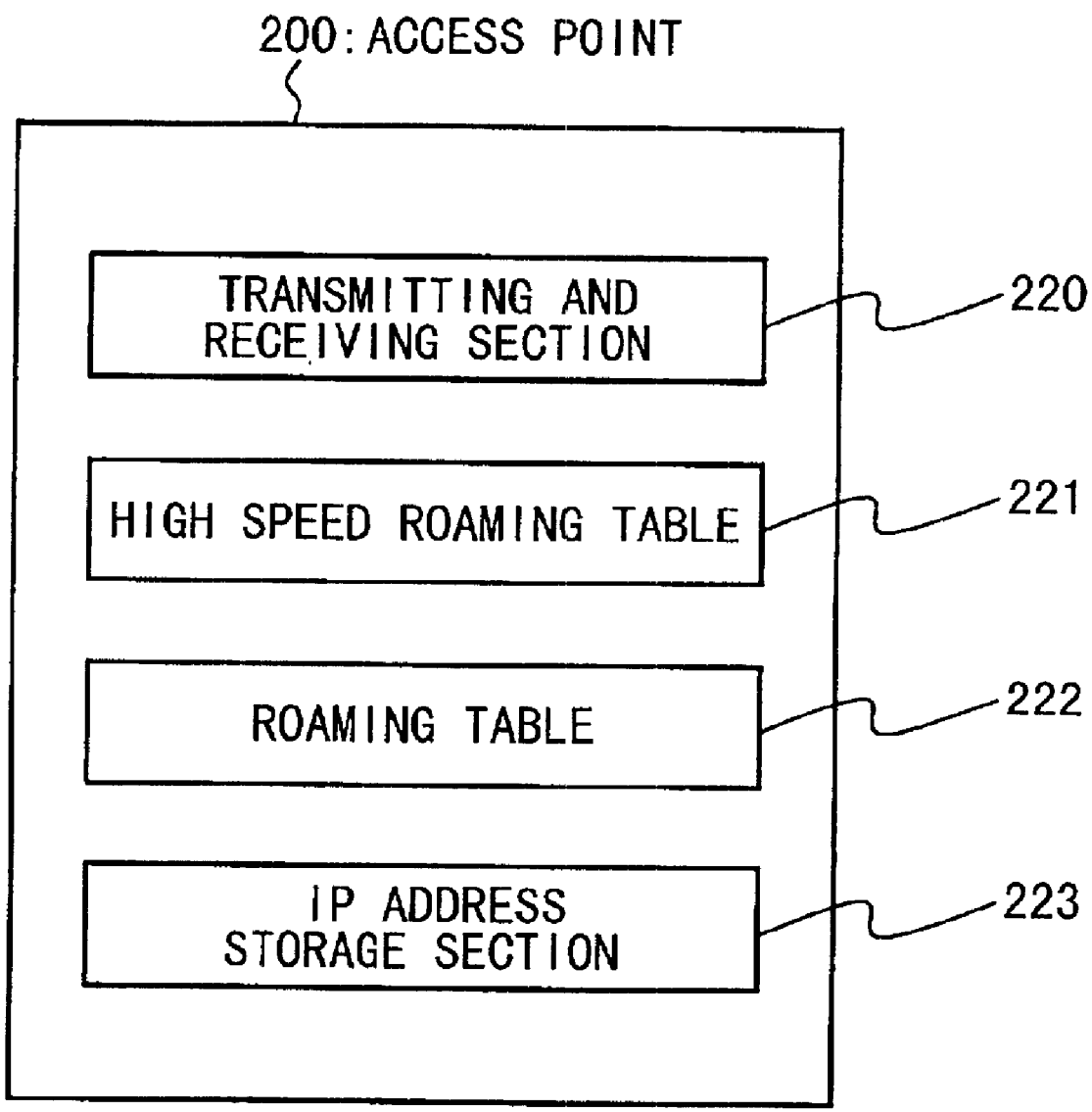
FIG. 2 is a block diagram showing the structure of an access point AP.

FIG. 2 shows a function block diagram of the access point AP 200. Referring to FIG. 2, the access point AP 200 has a transmitting and receiving section 220, a high speed roaming table 221, a roaming table 222, and an IP address storage section 223. The transmitting and receiving section 220 can carry out the radio communication with the plurality of assembly carrying vehicles 300. The high speed roaming table 221 stores the access points AP 200 adjacent to one access point AP 200. The high speed roaming table 221 is used for a high speed roaming operation. The adjacent access points AP stored in the high speed roaming table 221 are selected from among the access points AP 200 installed physically close to the access point AP 200. The number of adjacent access points AP to be registered is desired to be 4 or less. The roaming table 222 stores all the access points AP 200, and is used for a normal roaming operation. The IP address storage section 223 stores an IP address of the access point AP 200 which is used to communicate with the control apparatus 100. It should be noted that each of the access points AP 200 has a cell or communication area in which the communication with the assembly carrying vehicle 300 can be carried out.

Figure 3:
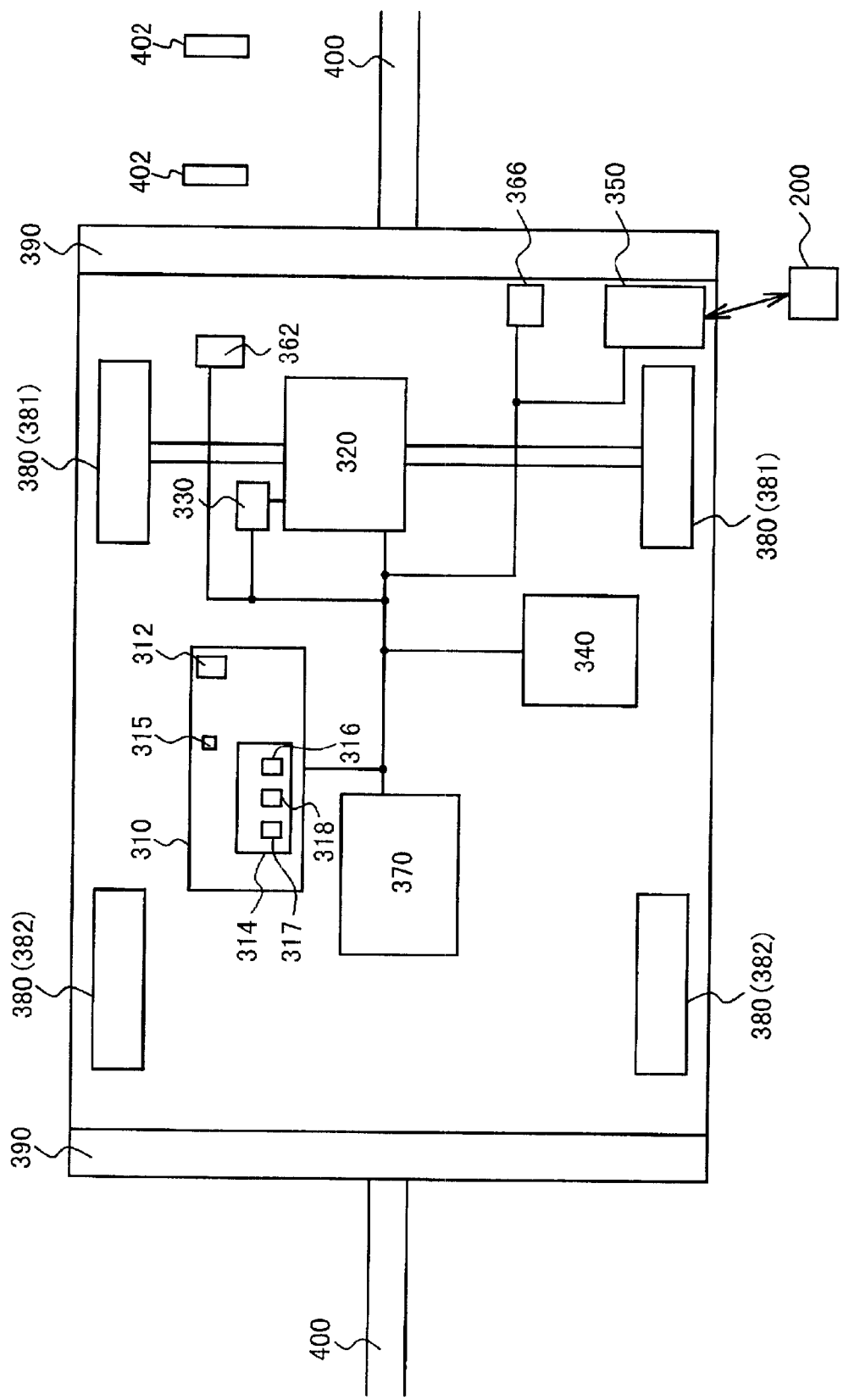
FIG. 3 is a block diagram showing the structure of an assembly carrying vehicle.

FIG. 3 is a view showing the structure of the assembly carrying vehicle 300. Referring to FIG. 3, the assembly carrying vehicle 300 is composed of a control unit 310, a driving unit 320, a rotation position sensor 330, a lifter height adjusting unit 340, a communicating unit 350, an indication plate detection sensor 362, a distance sensor 366, a power supply unit 370, a plurality of wheels 380 and a plurality of bumpers 390.

The control unit 310 controls the running of the assembly carrying vehicle, a height of a lifter and the communication with the control apparatus 100. The control unit 310 includes a running distance detecting section 312, a memory 314 and a timer section 315. The memory 314 includes an operation table 316, an indication plate table 317 and a status table 318. Since data is frequently re-written, DRAMs may be used for the memory 314. The memory 314 is backed up by a backup battery (not shown). Thus, the data in the memory 314 is maintained even if the power supply to the assembly carrying vehicle 300 is stopped. A non-volatile RAM may be used for the memory 314.

The driving unit 320 has electric motors, and uses the electric motors to drive the running and steering of the assembly carrying vehicle 300 in response to an instruction from the control unit 310.

The rotation position sensor 330 generates a number of pulses proportional to a rotation number (or a rotation angle)

of the electric motor of the driving unit 320 for driving the wheels 380. Then, the rotation position sensor 330 sends the pulses to the running distance detecting section 312 of the control unit 310. Also, the rotation position sensor 330 may generate pulses proportional to the rotation number (or the rotation angle) of the wheels and send the pulses to the running distance detecting section 312 of the control unit 310. The running distance detecting section 312 determines a running distance of the assembly carrying vehicle 300 in accordance with the number of pulses sent from the rotation position sensor 330.

The lifter height adjusting unit 340 adjusts a height from a floor of a lifter (not shown) on which an assembled automobile 500 is mounted.

The communicating unit 350 communicates with the plurality of access points AP 200 connected to the control apparatus 100.

The indication plate detection sensor 362 is mounted on the assembly carrying vehicle 300 closely to the floor, and detects each indication plate 402 which is installed on the floor along the orbit 400.

The distance sensor 366 is, for example composed of a supersonic sensor and detects a distance from a preceding assembly carrying vehicle 300. The distance sensor 366 is used to maintain a tact interval from the preceding assembly carrying vehicle 300, or an interval between the assembly carrying vehicles 300.

The power supply unit 370 has a brush contacting an energized rail of the orbit 400 and the electric power from the rail to the sensor and the respective units in the assembly carrying vehicle 300.

The plurality of wheels 380 are mounted. The rotation of the wheels enables the assembly carrying vehicle 300 to be moved. The plurality of wheels 380 are composed of running wheels 381 and playing idle wheels 382. The running wheels 381 are rotated and steered by the driving unit 320.

The bumpers 390 are attached at the front and rear of the assembly carrying vehicle 300, and have a function of reducing the impact which the assembly carrying vehicle 300 receives when it contacts or impacts another assembly carrying vehicle 300.

The memory 314 stores the operation table 316, the indication plate table 317 and the status table 318. The structure of the operation table 316, the indication plate table 317 and the status table 318 stored in the memory 314 will be described below with reference to FIGS. 4 to 6.

Figure 4:
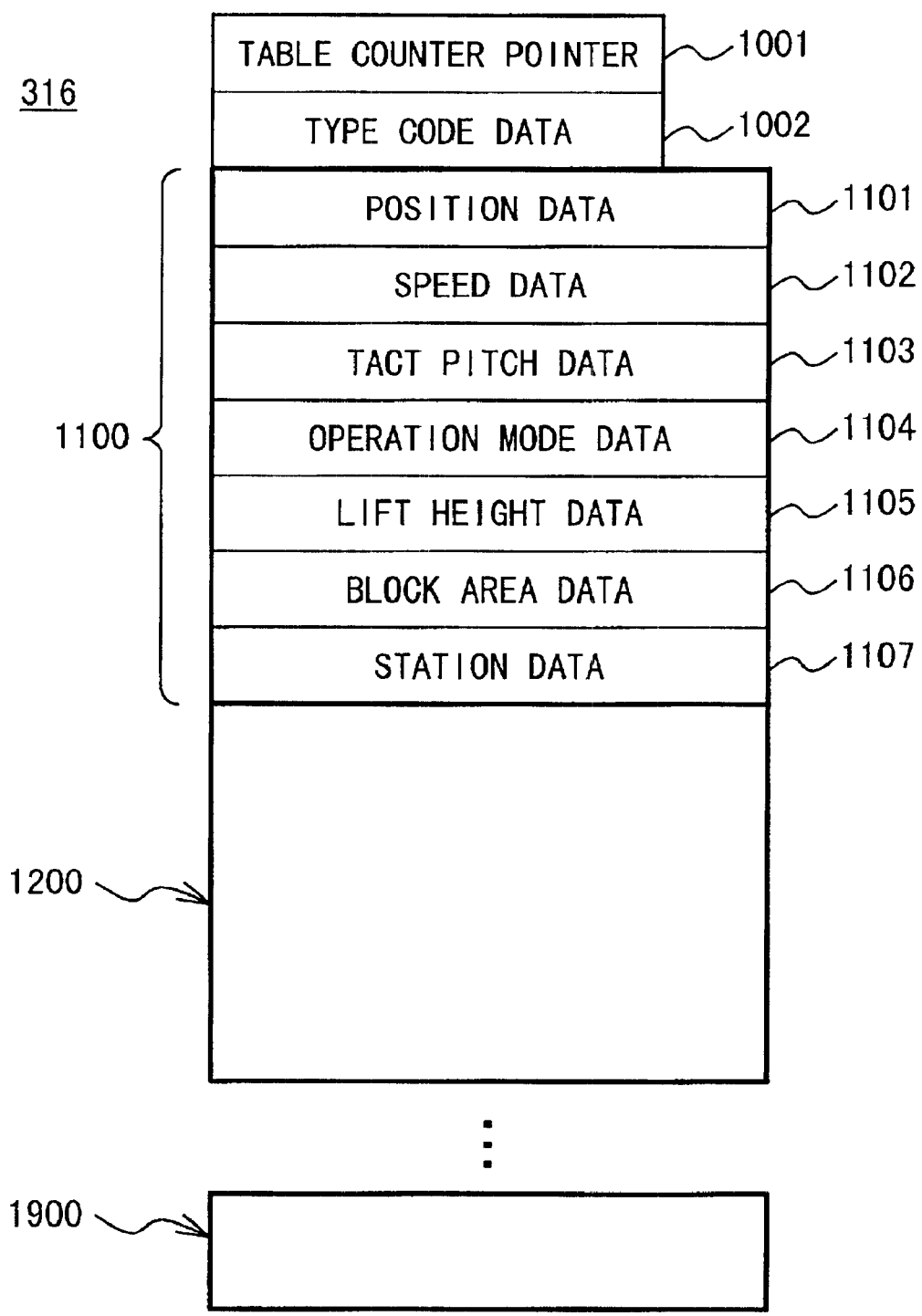
FIG. 4 is a diagram showing an operation table stored in a memory of the assembly carrying vehicle.

At first, the operation table 316 will be described. The operation table 316 stores data relating to the operation of the assembly carrying vehicle 300. FIG. 4 is a diagram showing the operation table 316.

As shown in FIG. 4, the operation table 316 stores a table counter pointer 1001, a type code data 1002, and a plurality of process data 1100, and 1200 to 1900.

The table counter pointer 1001 indicates the number of indication plates 402 which have been detected by the indication plate detection sensor 362 of the assembly carrying vehicle 300 from the start point. The number of detected indication plates 402 is reset to 0 at the preset start point. The table counter pointer 1001 points out the plurality of later-described process data 1100, and 1200 to 1900 in order one by one.

The type code data 1002 indicates a code corresponding to an operation pattern currently selected from a plurality of preset operation patterns. The plurality of process data 1100, and 1200 to 1900 are different for every operation pattern, i.e., are determined based on the operation pattern.

Each process data 1100 is composed of a position data 1101, a speed data 1102, a tact interval or pitch data 1103, an operation mode data 1104, a lifter height data 1105, a block area data 1106 and a station number data 1107.

The position data 1101 indicates the position of the currently detected indication plate with respect to the preset start position as a reference. The speed data 1102 indicates a running speed of the assembly carrying vehicle 300. The tact interval data 1103 indicates the interval from the preceding assembly carrying vehicle 300.

The operation mode data 1104 indicates a code data corresponding to one selected from among a plurality of operations to be carried out by the assembly carrying vehicle 300. The plurality of operations carried out by the assembly carrying vehicle are composed of a process end, a continuous run, a tact run, a corner run and a due-out operation. In the operation of the process end, the assembly carrying vehicle 300 stops in the corresponding process, and the table counter pointer 1001 is reset to 0. In the operation of the continuous run, the assembly carrying vehicle continues to run in the corresponding process without stopping. In the operation of the tact run, the assembly carrying vehicle 300 runs while maintaining a constant interval from the preceding assembly carrying vehicle 300. The interval between the assembly carrying vehicles 300 is maintained by controlling the run of the succeeding assembly carrying vehicle 300 in accordance with a distance from the preceding assembly carrying vehicle. The interval is measured by the distance sensor 366 of the assembly carrying vehicle 300. This distance sensor 366 effectively functions if the assembly carrying vehicle 300 runs on a straight portion on the orbit 400.

The lifter height data 1105 indicates a height from a floor to the platform on which an assembled automobile is mounted. In accordance with the lifter height data, the lifter height adjusting unit 340 controls the lifter for adjusting the height of the platform. As this height from the floor, a plurality of stages in height are preset in advance. The code data corresponding to the selected height is stored as the lifter height data 1105.

The block area data 1106 and the station data 1107 indicate a block area and a station, respectively.

A Table 1 shows an example of the operation table 316 of the present invention.

TABLE 1

| | address | contents | | input |
|---|---|---|---|---|
| | DM2000 | table counter point | (2 digits) | bit code data |
| | DM2001 | type code data | (2 digits) | bit code data |
| first process data | DM2010 | position (0.1 mm) | (lower 4 digits) | bit code data |
| | DM2011 | position | (upper 4 digits) | bit code data |
| | DM2012 | speed (mm/s) | (4 digits) | bit code data |
| | DM2013 | tacke pitch | (4 digits) | bit code data |
| | DM2014 | operation mode lifter height | (upper 2 digits) (lower 2 digits) | 0–4 1–6 |
| | DM2015 | block area data station data | (upper 2 digits) (lower 2 digits) | bit code data bit code data |
| | DM2016– DM2019 | reserved | | |
| second process data | DM2020– DM2029 | | | |

Figure 5:
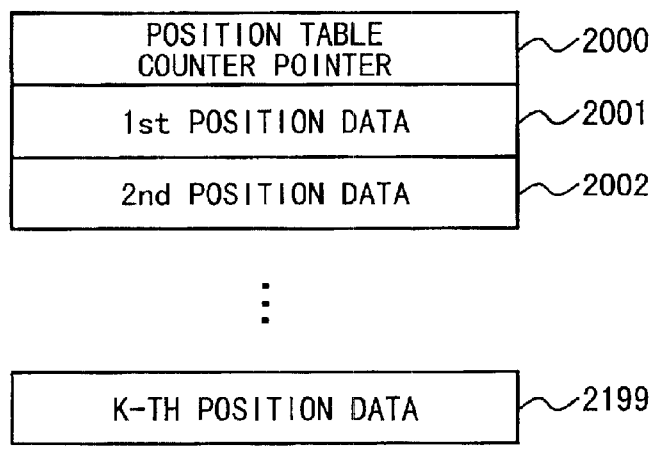
FIG. 5 is a diagram showing an indication plate table stored in a memory of the assembly carrying vehicle.

Next, the indication plate table 317 will be described below. The indication plate table 317 stores data indicative of a position of the indication plate 402 installed along the orbit 400. FIG. 5 shows the indication plate table 317. As shown in FIG. 5, the indication plate table 317 is composed of a position table counter pointer 2000 and a plurality of position data 2001, 2002 to 2199.

The position table counter pointer 2000 indicates the number of indication plates from the preset start position to a next indication plate to be detected.

Each of the respective position data 2001, 2002 to 2199 indicates a distance of a corresponding indication plate from the start position, and are stored in the indication plate table 317 in the order of the distance from the preset start position.

A Table 2 shows an example of the indication plate table 317 of the present invention.

TABLE 2

|  | address | content |  | input |
|---|---|---|---|---|
|  | DM4100 | position table counter pointer | | |
| first | DM4101 | position | (lower 4 digits) | bit code data |
| position | DM4102 | position (0.1 mm) | (upper 4 digits) | bit code data |
| second | DM4103 | position | (lower 4 digits) | bit code data |
| position | DM4104 | position (0.1 mm) | (upper 4 digits) | bit code data |

Figure 6:
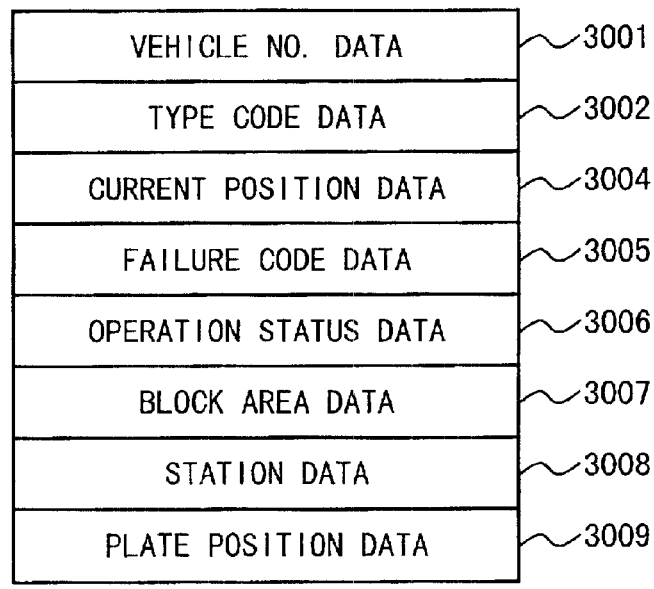
FIG. 6 is a diagram showing a status table stored in a memory of the assembly carrying vehicle.

Next, the status table 318 will be described below. The status table 318 stores data indicating a current status of the assembly carrying vehicle 300. FIG. 6 shows the status table 318. Referring to FIG. 6, the status table 318 is composed of an assembly carrying vehicle number data 3001, a type code data 3002, a current position data 3004, a failure code data 3005, an operation status data 3006, a block area data 3007, a station number data 3008 and an indication plate position data 3009.

The assembly carrying vehicle number data 3001 indicates a preset number corresponding to each assembly carrying vehicle 300. Individually different code data is allocated to each assembly carrying vehicle 300.

The type code data 3002 indicates an operation pattern that the assembly carrying vehicle 300 is currently carrying out. The operation pattern is specified from among a plurality of preset operation patterns. This type code data corresponds to the type code data 1002 of the operation table 316.

The current position data 3004 indicates a current position of the assembly carrying vehicle 300 by use of a distance from the preset start position.

The failure code data 3005 indicates a failure of the assembly carrying vehicle 300 itself and an occurrence of communication failure with the communicating unit 350. The failure code data is specified from among preset code data in accordance with the type of failure.

The operation status data 3006 indicates an operation status of the assembly carrying vehicle 300. The operation status data is composed of a selection switch, a status data, a high speed dog data, a corner dog data, a fixed indication plate number data, a lifter height data and a start wait position data. The selection switch indicates a control status selected in the assembly carrying vehicle 300, and takes any one of a non-operation, an automatic control and a manual control. The status data indicates a running status of the assembly carrying vehicle 300, and takes any one of an automatic stop and an automatic running. The high speed dog data indicates a status of whether or not the assembly carrying vehicle 300 is running at a high speed. The corner dog data indicates a status of whether or not the assembly carrying vehicle 300 is running on a corner. The fixed indication plate number data is composed of a data indicative of a process being currently carried out and the data corresponds to a process data in the operation table 316. The lifter height data indicates a current height from a floor to a platform on which the assembled automobile is mounted. This data corresponds to the lifter height data 1105 of the operation table 316. The start wait position data indicates a status of whether or not the assembly carrying vehicle 300 is currently located at a start wait position.

The block area data 3007 and the station number data 3008 indicate a block area and a station number at which a work has been performed or is being performed, respectively.

The indication plate position data 3009 indicates an indication plate through which the assembly carrying vehicle 300 passes. The indication plate position data corresponds to the counter pointer 2000 of the indication plate table 317.

A Table 3 shows an example of the status table 318 of the present invention.

TABLE 3

| address | content | | input |
|---|---|---|---|
| DM4000 | mobile mount vehicle No. | (4 digits) | bit code data |
| DM4001 | type code data | (2 digits) | bit code data |
| DM4011 | current position | (lower 4 digits) | bit code data |
| DM4012 | current position | (upper 4 digits) | bit code data |
| DM4013 | failure code data | (4 digits) | bit code data |
| DM4014 | operation status 1 | (4 digits) | bit code data |
| DM4015 | operation status 2 | (4 digits) | bit code data |
| DM4016 | block area data | (upper 2 digits) | bit code data |
|  | station data | (lower 2 digits) | bit code data |
| DM4017 | position table counter pointer | (4 digits) | bit code data |
| DM4018 | reserved | | bit code data |

Figure 7:
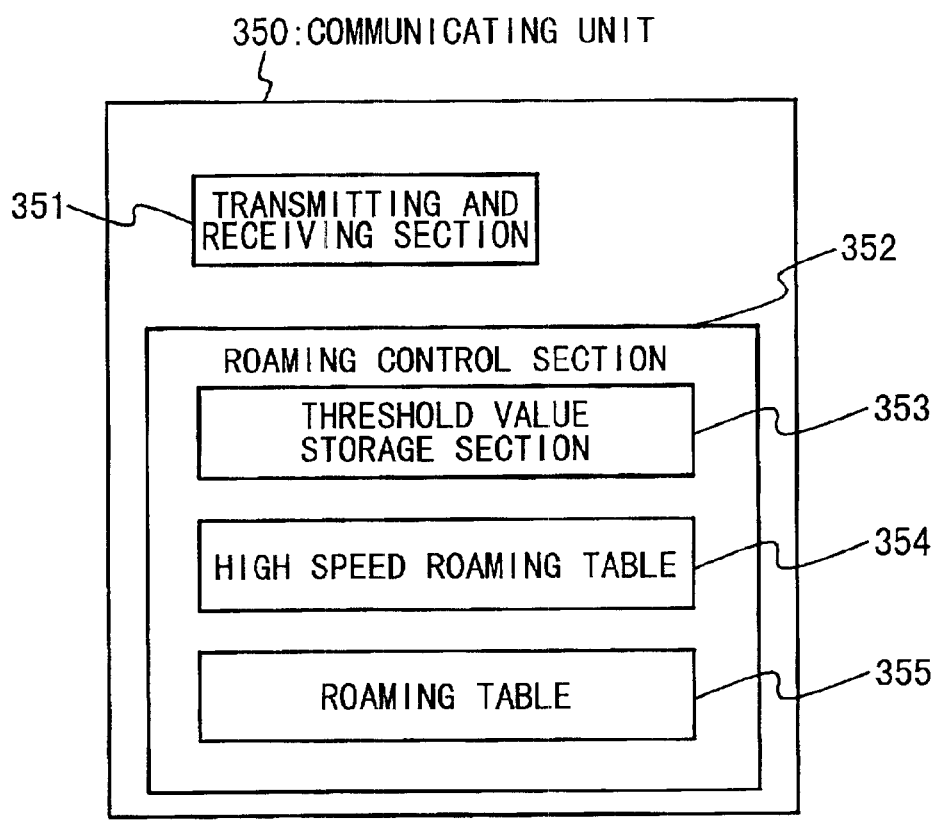
FIG. 7 is a block diagram showing the structure of a communicating unit of the assembly carrying vehicle.

FIG. 7 shows a function block diagram of the communicating unit 350 of the assembly carrying vehicle 300. Referring to FIG. 7, the communicating unit 350 is composed of a transmitting and receiving section 351 and a roaming control section 352. The transmitting and receiving section 351 can communicate with one access point AP 200 among the plurality of access points AP 200. The roaming control section 352 controls a roaming operation to change the access point AP 200 to be communicated with.

The roaming control section 352 is composed of a threshold value storage section 353, a high speed roaming table 354 and a roaming table 355. The threshold value storage section 353 stores at least one threshold value. The high speed roaming table 354 corresponds to the high speed roaming table 221 of the communicating access point AP. The roaming table 355 stores all the access points AP 200. The threshold value storage section 353, the high speed roaming table 354 and the roaming table 355 may be provided in the memory 314 and not placed in the communicating unit 350.

Next, the roaming control section 352 carries out the roaming operation if the electric field intensity of a reception signal sent from the communicating access point AP 200 is lower than a threshold value. At this time, the roaming control section 352 first uses each of the access points AP 200 loaded from the high speed roaming table 221 of the communicating access point AP 200, as roaming destination candidates. Then, the roaming control section 352 measures the electric field intensity of a reception signal sent from each access point AP 200. Subsequently, the roaming control section 352 selects one having a maximum measured electric field intensity of the reception signal among the roaming destination candidates and sets the selected access point AP 200 as the communicating access point AP 200.

Figure 8:
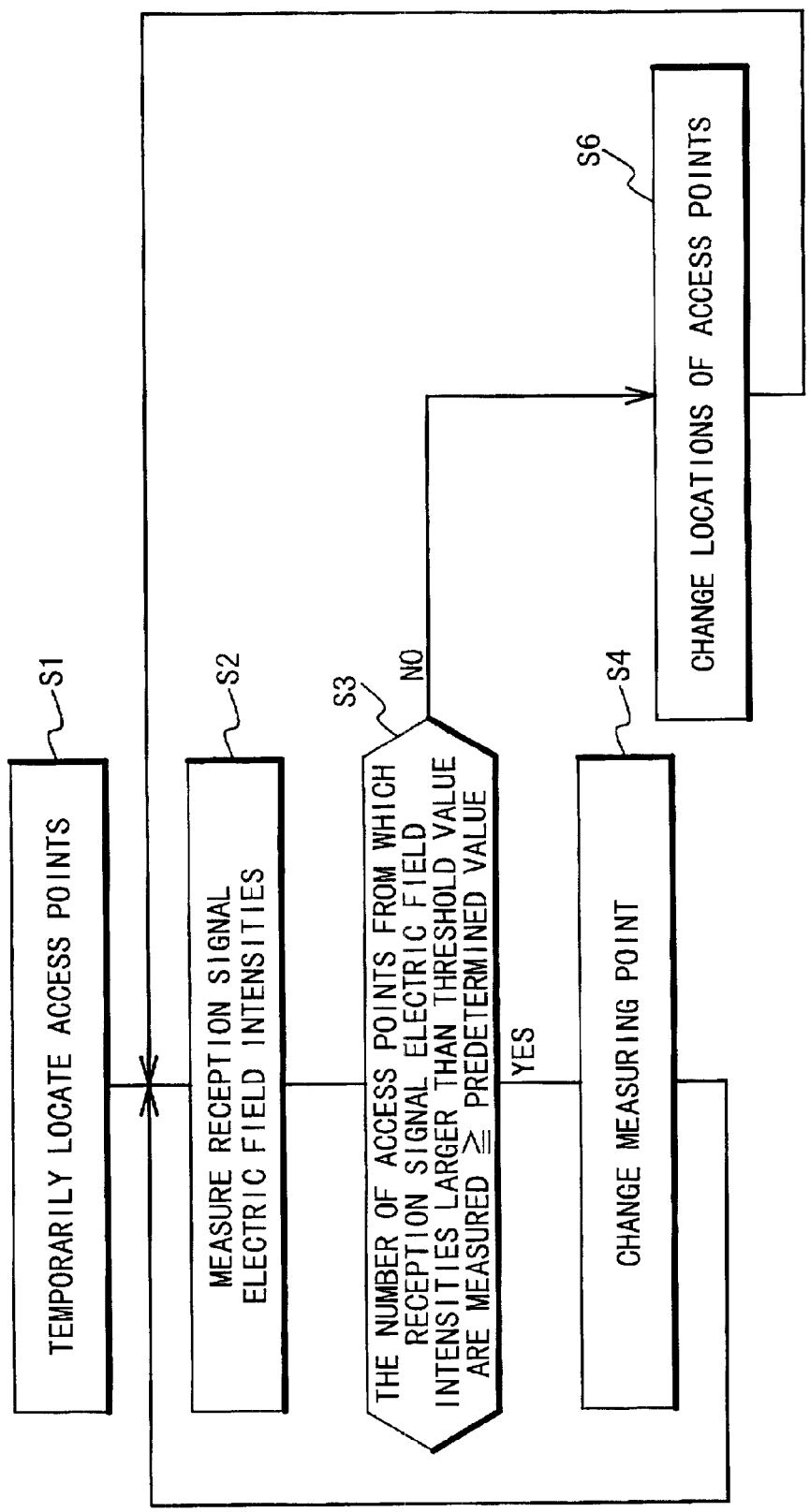
FIG. 8 is a flowchart showing a first operation example of an access point installing method in an assembly carrying vehicle travel control system of the present invention.

An access point installing method in the assembly carrying vehicle running control system of the present invention will be described below. FIG. 8 is a flowchart showing a first operation example of the access points AP 200 installing method of the present invention.

Referring to FIG. 8, access points AP 200 are temporarily installed in a factory (Step S1). In the temporal installation, an interval between the access points AP 200 is made wider in an area having few obstacles and excellent visibility in the factory so that the communication status of the signal seems to be better. On the contrary, the interval between the access points AP 200 is made narrower than the above-mentioned interval in an area having many obstacles and severe visibility so that the communication status of the signal seems to be worse than the above-mentioned portion.

The electric field intensities of reception signals from all the access points AP 200 are measured at a position along the orbit 400 on which the assembly carrying vehicle 300 runs and near to a concerned one of the plurality of access points AP 200 (Step S2). The measuring operation is carried out by use of the communicating unit 350 of the assembly carrying vehicle 300. It should be noted that the measuring operation may be carried out by a portable computer (PC) or a dedicated electric field intensity of a reception signal measuring instrument, instead of the communicating unit 350.

From the measured results of the electric field intensities of the reception signals at the step S2, it is determined whether or not the number of access points AP 200 which sent the reception signals having the electric field intensities higher than a threshold value is equal to or greater than a preset number (Step S3).

If Y in the step S3, the access points AP 200 which sent the reception signals having the electric field intensities higher than the threshold value are registered in the control apparatus 100. It should be noted that the access points AP 200 thus obtained are registered in the high speed roaming table of the concerned access point AP 200. Also, the access points AP 200 thus obtained may be registered in the high speed roaming table of the control apparatus 100 and then are loaded into the concerned access point AP 200. Then, the measurement position is changed to another position along the orbit 400 (Step S4). Then, the operation flow returns to the step S2, and the operations of and subsequent to the step S2 are carried out.

On the other hand, if N in the step S3, then the arrangement of the access points AP 200 is changed (step S6). Then, the operational flow returns back to the operation at the step S2.

By using the above-mentioned method, the arrangement of the access points AP 200 can be accomplished such that the number of access points AP 200 which have sent the reception signals having the electric field intensities equal to or higher than the predetermined threshold value equal to or more than the preset number in anywhere along the orbit 400. Thus, the access points AP can be arranged such that each of the assembly carrying vehicles 300 and the control apparatus 100 can communicate with each other via the access points AP 200 at any position without any interruption.

Here, the above-mentioned access point installing method is applicable to a case where there is no orbit 400, namely the assembly carrying vehicles 300 can run freely in a closed space in which the access points AP 200 are installed.

Figure 9:
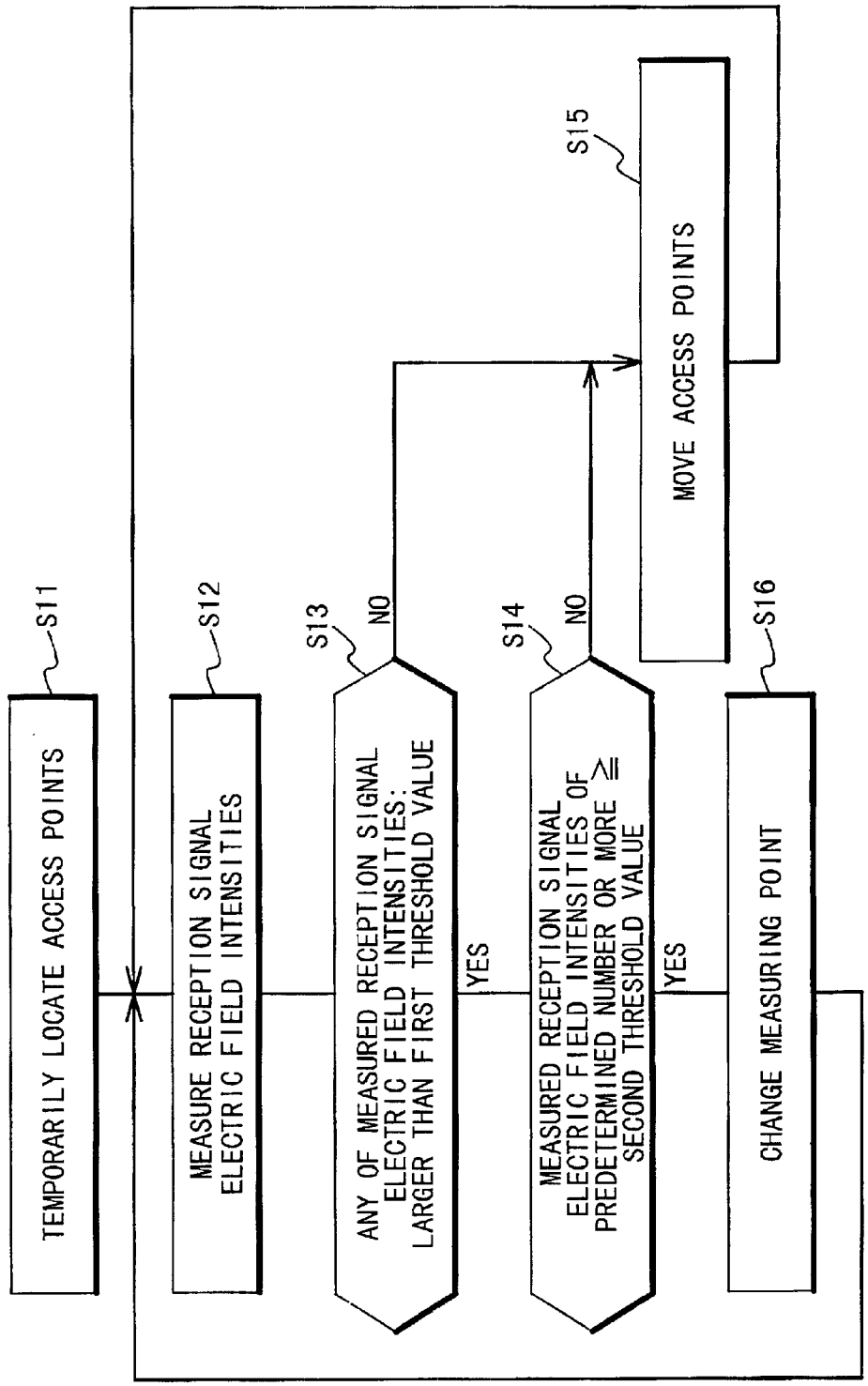
FIG. 9 is a flowchart showing a second operation example of an access point installing method in an assembly carrying vehicle running control system of the present invention.

FIG. 9 is a flowchart showing a second example of the access point installing method of the present invention.

Referring to FIG. 9, at first, the plurality of access points AP 200 connected to the control apparatus 100 are temporarily installed within a closed space in which the assembly carrying vehicles 300 are run (Step S11).

Subsequently, the electric field intensities of reception signals from the respective access point AP 200 are measured (Step S12). This measurement position is selected near one of the temporarily installed access points AP 200 along the orbit 400 for the assembly carrying vehicle 300 to be run. If any of the respective electric field intensities of the reception signals measured at the step S12 is lower than a first threshold value (Step S13), the access points AP 200 are moved and rearranged (Step S15). Then, the operation flow returns to the step S12 and the operations of and subsequent to the step S12 are carried out. Here, the first threshold value is greater than a second threshold value to be used later. Also, the second threshold value is equal to or greater than the threshold value stored in the threshold value storage section 353 of the assembly carrying vehicle 300.

When any of the respective electric field intensities of the reception signals measured at the step S12 is equal to or greater than the first threshold value (Step S13), it is determined whether or not the number of access points AP 200 which have sent the reception signals having electric field intensities equal to or greater than the second threshold value is less than a preset number (step S14). If N at the step S14, the operation flow goes to the step S15 and the above-mentioned step is carried out.

On the other hand, if Y at the step S14, the access points AP 200 which sent the reception signals having the electric field intensities higher than the threshold value are registered in the control apparatus 100. It should be noted that the access points AP 200 thus arranged are registered in the high speed roaming table of the control apparatus 100 in association with the selected access point AP 200. Also, the high speed roaming table in the control apparatus 100 is loaded into the access points AP 200 for every relating content.

Then, the operation flow goes to a step S16. At the step S16, the measurement position is moved to the next measurement position. The next measurement point is located near one of the temporarily installed access points AP 200 along the orbit 400 for the assembly carrying vehicle 300 to be run. Then, the operation flow returns back to the step S12 and the operations of and subsequent to the steps S12 are carried out again.

This operation for changing the measurement position is carried out until the above two conditions are satisfied for all the measuring positions.

In the above-mentioned access point installing method, the change of the measurement point at the step S16 may be targeted for any position within a closed space in which the access points AP 200 are installed. Thus, the access points AP can be arranged such that the assembly carrying vehicle 300 and the control apparatus 100 can communicate with each other via the access points AP 200 at any position within the closed space without any interruption.

Next, a third example of the access point installing method of the present invention will be described below.

At first, the access points AP 200 are temporarily installed. Subsequently, the electric field intensity of the reception signal from a selected one of the access points AP 200 is measured at a start point along the orbit 400. Then, the selected access point AP 200 is moved such that the electric field intensity of the reception signal has a maximum value. In this example, the measured electric field intensity of the reception signal is displayed as a numeral on a display of a reception signal measuring instrument. This numeral is referred to as an RSSI (Receiving Signal Strength Indicator)

value, and represented as either of numerals 0 to 43 depending on the electric field intensity of the reception signal. Also, the above-mentioned electric field intensity of the reception signal may be indicated on the display by use of a graph representation such as a bar graph in accordance with the RSSI value.

Next, electric field intensities of reception signals from access points AP adjacent to the selected access point AP are measured at a position corresponding to a start point of the orbit 400. In this example, four access points AP 200 can be registered in the high speed roaming table of the control apparatus 100. Accordingly, the access points AP 200 other than the selected access point AP 200 are installed such that the assembly carrying vehicle 300 can communicate with at least four access points AP other than the selected access point AP at the position corresponding to the start point. In this case, the assembly carrying vehicle 300 communicates with the access points AP 200 each indicating the RSSI values in a range from 35 and 43. For example, first and second adjacent access points AP 200 installed around the selected access point AP are selected from among the plurality of access points AP 200. Then, the respective first and second adjacent access point AP are moved such that the individual RSSI values of the first and second adjacent access points AP indicate 35 or more. Especially in this example, the respective first and second adjacent access point AP are moved such that some margin of 2 is given to the RSSI values. Accordingly, the measured RSSI value of the first adjacent access point AP is in a range from 40 to 42, and the measured RSSI values of the second adjacent access point AP is in a range from 37 to 39.

The operations similar to the above-mentioned operations are repeated at the position near to the first adjacent access point AP along the orbit 400 using the first access point AP 200 as the selected access point AP 200. Thus, the above-mentioned operations are carried out at positions along the orbit 400. In this way, the four access points AP having the communicable RSSI value near the selected access point AP can be registered in the high speed roaming table of the control apparatus 100. Then, the high speed roaming table of the control apparatus 100 is loaded into the access points AP 200 for every content.

In the above example, each time the arrangement of the adjacent access points AP are ended with respect to each selected access point AP, the adjacent access point AP may be registered to the high speed roaming table 221. However, when the electric field intensity of a reception signal is measured by the measuring instrument, the measuring instrument may have a memory area. In this case, each time the arrangement of the adjacent access point AP is ended with respect to each access point AP, the access point AP and the adjacent access points AP may be stored in the memory area of the instrument. Then, the stored access points are notified to the control apparatus 100 after the determination of all the adjacent access point AP.

Also, in the above-mentioned examples of the method of installing access points AP, an antenna of the access point AP 200 may be moved or changed in an orientation of the antenna, instead of moving and arranging the access point AP 200 itself in correspondence to the electric field intensity of a reception signal.

Next, a method for determining a status of each access point AP 200 in the assembly carrying vehicle running control system of the present invention will be described below with reference to the attached drawings.

The control apparatus 100 is connected to the plurality of access points AP 200. Radio communication is carried out between the access points AP 200 and the assembly carrying vehicles 300. The spectral spreading (SS) communication of a frequency hopping (FH) method is applied to the radio communication in this case. The control apparatus 100 manages all the assembly carrying vehicle 300 and controls the running states of all the assembly carrying vehicles 300 by use of the radio communication. For this purpose, the control apparatus 100 has a function of carrying out a broadcast in order to investigate the individual states of the connected access points AP 200.

Also, each of the access points AP 200 can carry out the radio communication with the plurality of assembly carrying vehicles 300. The assembly carrying vehicle 300 can communicate with the access points AP 200 when the assembly carrying vehicle 300 is present in corresponding cell areas. Here, the cell area of the access point AP 200 is an area indicating that the electric field intensity of a reception signal is equal to or higher than a preset threshold value.

The plurality of access points AP200 are arranged such that the communication between the control apparatus 100 and the assembly carrying vehicle 300 is always possible through the access points AP 200. At this time, any location of the assembly carrying vehicle 300 on the orbit 400 is included in at least one cell area.

Figure 13:
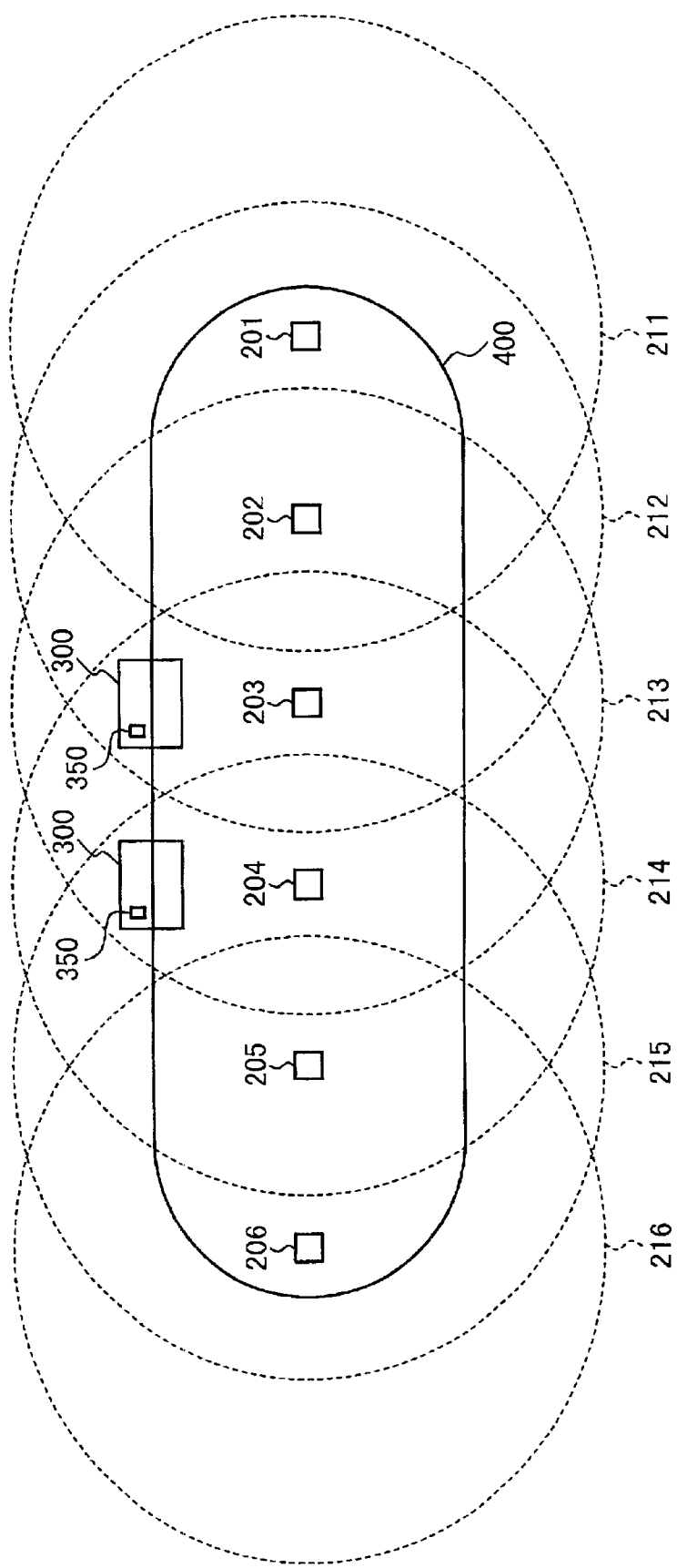
FIG. 13 shows an arrangement example of a plurality of access points AP in the assembly carrying vehicle travel control system in the present invention.

FIG. 13 shows an arrangement example of the plurality of access points AP in the assembly carrying vehicle running control system of the present invention. Six access point AP 201, 202, 203, 204, 205 and 206 are arranged in this arrangement example. The six access point AP 201, 202, 203., 204, 205 and 206 have cell areas 211, 212, 213, 214, 215 and 216, respectively. Any location along the predetermined orbit 400 on which each assembly carrying vehicle 300 moves is included in at least two cell areas. Each assembly carrying vehicle 300 has the communicating unit 350, and uses the communicating unit 350 to carry out the radio communication with one of the plurality of access points AP 200.

If the frequency hopping (FH) method of the spectral spreading (SS) communication is used for the radio communication between the assembly carrying vehicle 300 and the access point AP, each access point AP 200 carries out a transmission by use of a different hopping pattern. In this case, the assembly carrying vehicle 300 can receive a transmission signal from one access point AP 200 without regarding transmission signals from the other access points AP 200 as noise. Thus, the assembly carrying vehicle 300 can individually identify and receive the transmission signal from each access point AP 200. Hence, the assembly carrying vehicle 300 can communicate with one of the plurality of access points AP 200, even in an overlap area in which the cell areas in the plurality of access points AP 200 overlap with each other.

Referring to FIG. 2, each access point AP 200 is composed of the transmitting and receiving section 220, the high speed roaming table 221, roaming table 222, and the IP address storage section 223. The transmitting and receiving section 220 can carry out the radio communication with the plurality of assembly carrying vehicles 300. The IP address stored in the IP address storage section 223 is an address allocated to the access point AP 200 itself, and is used to identify the access point AP 200. Here, the IP address stored in the IP address storage section 223 has a relation to a broadcasting operation carried out by the control apparatus 100 as described below.

Referring to FIG. 7, the communication unit 350 of each assembly carrying vehicle 300 is composed of the transmitting and receiving section 351, and the roaming control section 352. The transmitting and receiving section 351 can communicate with one access point AP 200 among the plurality of access points AP 200. The roaming control section 352 controls the roaming operation for switching the access point AP 200 to be communicated with. The roaming control section 352 executes the roaming operation, when the electric field intensity of a reception signal from the communicating access point AP 200 during the communication is lower than a predetermined threshold value. The roaming control section 352 has the threshold value. Here, the threshold value may be stored in the memory 314 and not in the communicating unit 350.

Figure 23:
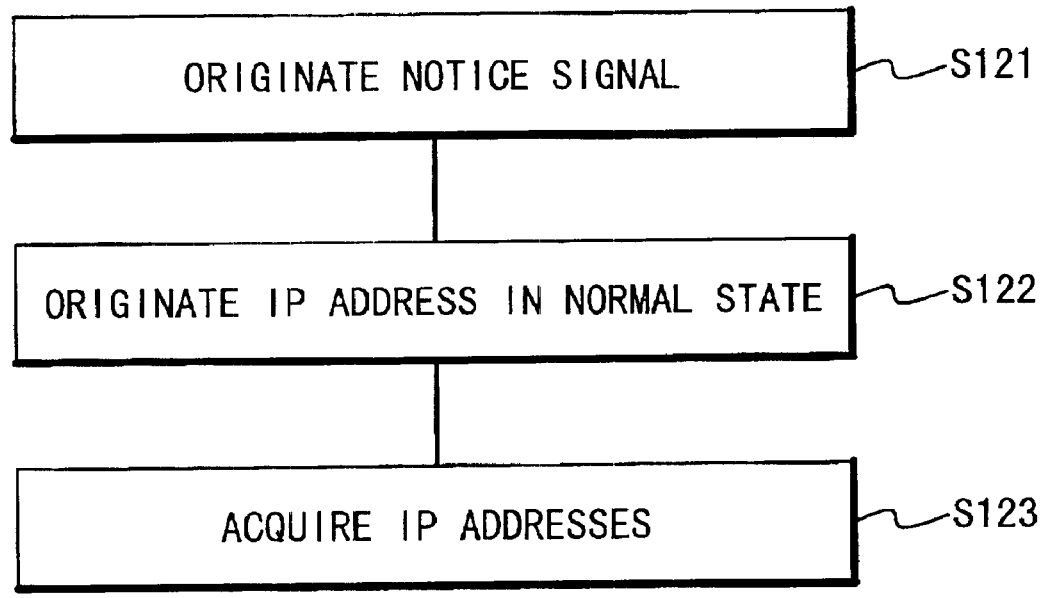
FIG. 23 is a flowchart showing a method for determining a status of each access point AP 200 in the assembly carrying vehicle travel control system of the present invention.

A method for determining a status of each access point AP 200 in the assembly carrying vehicle running control system of the present invention will be described below. FIG. 23 is a flowchart showing the broadcast in the present invention.

Referring to FIG. 23, the control apparatus 100 broadcasts an access point inquiry signal to all the access points AP 200 (Step S121). Each access point AP 200 sends the IP address 221 to the control apparatus 100 in response to the access point inquiry signal, if no failure occurs in the access point AP (Step S122). Here, at the step S122, each access point AP 200 may send the IP address 221 to the control apparatus 100 in response to the access point inquiry signal, if the failure occurs in the access point AP.

The control apparatus 100 determines whether or not each of the access points AP 200 is in the failure state. in accordance with the response of each IP address 221 (Step S123). The failure access point AP thus recognized is notified to a system manager through the input and output unit 101.

This method for determining the operation status is desirably carried out at a timing when the production line is not operated, namely, before it is operated or after it is stopped. This is because there may be a fear that a communication failure occurs since a communication traffic is much during the operation of the production line.

In the assembly carrying vehicle running control system of the present invention, the two or more access points AP along the orbit 400 can always communicate with the assembly carrying vehicle 300, in the condition that any failure does not occur in the access point AP 200. Accordingly, even when one access point AP 200 has failed which has a cell area in which the assembly carrying vehicle 300 is currently running, the communication between the control apparatus 100 and the assembly carrying vehicle 300 can be carried out through another access point AP 200. Hence, if the radio communication method is used for the communication between the control apparatus 100 and the assembly carrying vehicle 300, it is possible to prevent disabling the communication between the control apparatus 100 and the assembly carrying vehicle 300 has failed even when an access point AP has failed.

Otherwise, the plurality of access points AP 200 may be arranged such that any location in a closed space in which the assembly carrying vehicles 300 are present is included in at least one cell area. The closed space may be the whole automobile assembling line or the like. Also, it is possible to avoid the communication from being substantially interrupted even when the assembly carrying vehicle 300 is present in the closed space such as an automobile assembling line.

Next, a first example of a method for detecting a current position of an assembly carrying vehicle in the assembly carrying vehicle running control system according of the present invention will be described below with reference to the attached drawings.

The case where the indication plate table 317 and the status table 318 are stored in the memory 314 will be described below.

FIG. 5 is a view showing the table configuration of the indication plate table 317, as described above. The indication plate table 317 is composed of the position table counter pointer 2000, the first position data 2001, with and the second data 2002 to the k-th position data 2199 ($k \leq 199$). The position table counter pointer 2000 indicates the number of indication plates detected from a preset start point. A distance of each indication plate 402 from the preset start point is recorded in each of the position data 2001, 2002 to 2199. For example, an m-th position data ($1 \leq m \leq k$) indicates a distance from the start point to the m-th indication plate 402 detected.

If a value recorded in the field of the position data indicates 0, the corresponding indication plate 402 is defined as a final indication plate. For this reason, when a position data obtained by referring to the position table counter pointer 2000 indicates 0, the assembly carrying vehicle 300 changes a value of the position table counter pointer 2000 to 0. Thus, the assembly carrying vehicle 300 can circulate along the orbit 400 through the execution of this operation.

It should be noted that the control unit 310 of the assembly carrying vehicle 300 can carry out an operation for erasing the data in the indication plate table 317, when the position data obtained by referring to the position table counter pointer 2000 indicates 0. Also, the control unit 310 of the assembly carrying vehicle 300 can acquire a new position data from the control apparatus 100 via the access point AP 200 at the start point. It should be noted that the indication plate table 317 may be designed such that the m-th position data ($1 \leq m \leq k$) has a distance between the m-th indication plate 402 and the (m−1)-th indication plate 402. In this case, the distance from the start point is calculated through the summation of the data for the respective position data.

FIG. 6 shows the table configuration of the status table 318, as described above. The status table 318 stores the assembly carrying vehicle number data 3001, the type code data 3003 current position data 3004, the failure code data 3005 and an operation status data 3006.

A first example of the method for detecting a current position of an assembly carrying vehicle in the assembly carrying vehicle running control system of the present invention will be described below. Now, it is supposed that the assembly carrying vehicle 300 is at a status that the assembly carrying vehicle 300 can always communicate with the control apparatus 100 through the plurality of access points AP 200.

The plurality of access points AP 200 are arranged such that the access points AP 200 and the assembly carrying vehicle 300 carry out spectral spreading communication of the frequency hopping method with each other. An area communicable with one or more access points AP 200 among the plurality of access points AP 200 is placed along any orbit 400 for the assembly carrying vehicle 300 to be run.

Figure 21:
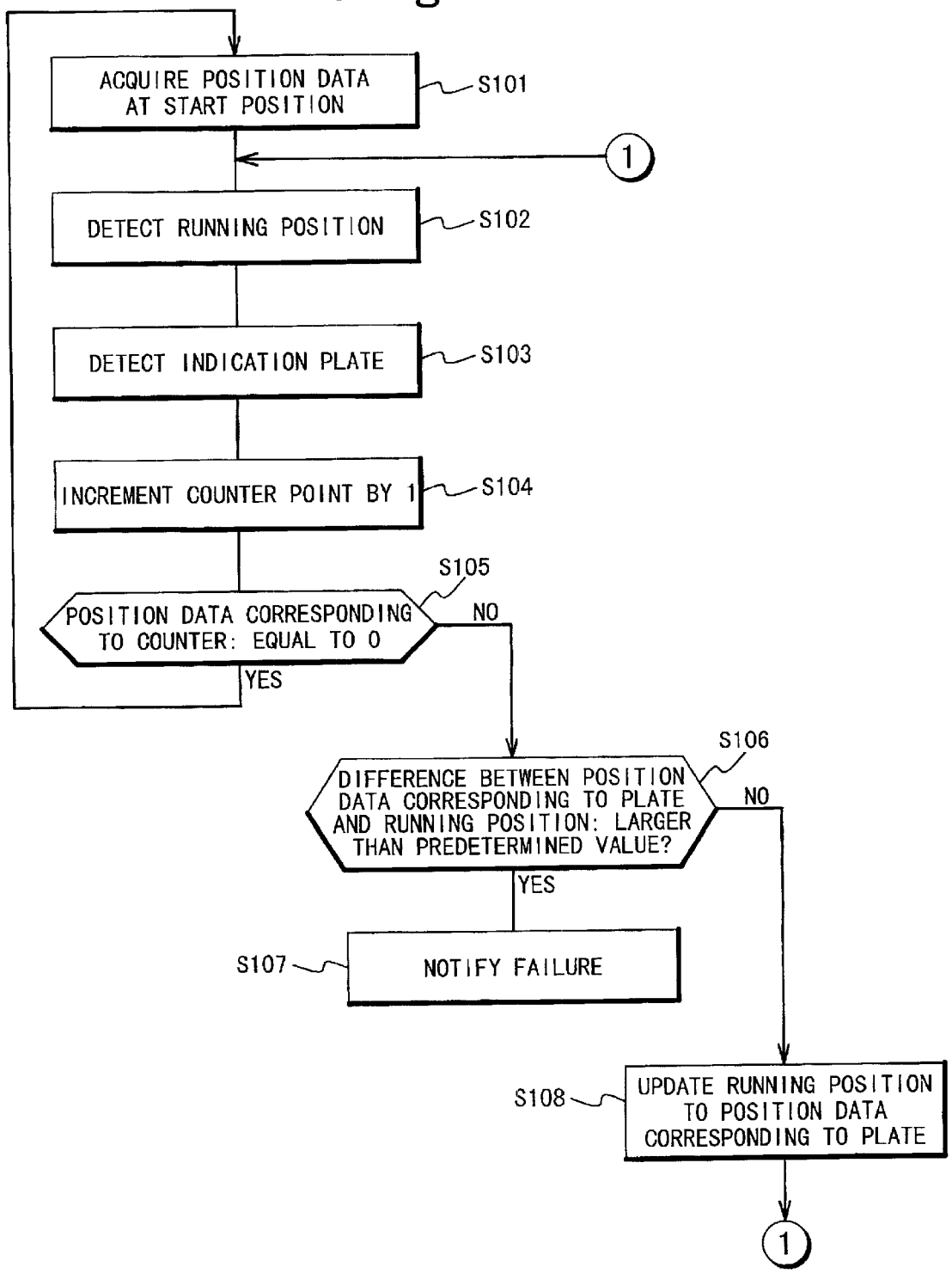
FIG. 21 is a flowchart showing a method for detecting a current position of an assembly carrying vehicle in the assembly carrying vehicle travel control system of the present invention.

FIG. 21 is a flowchart showing a method for detecting a current position of an assembly carrying vehicle in the, assembly carrying vehicle running control system of the present invention. Referring to FIG. 21, at a preset start point along the orbit 400, the data indicative of positions of the indication plates is acquired from the control apparatus 100 via the access point, and stored in the indication plate table 317 as the position data (Step S101). Here, the position data indicates a distance from the start point to each indication plate along the orbit 400. Also, in this distance, a traveling direction of the assembly carrying vehicle 300 is positive. At this time, the data indicative of the current position of the assembly carrying vehicle 300 which is indicated by the current position data 3004 of the status table 318 is set to be 0.

Next, in association with the movement of the assembly carrying vehicle 300, the current position data 3004 of the status table 318 is updated in accordance with a data indicative of a running distance detected by the running distance detecting section 312. Accordingly, a running position of the assembly carrying vehicle 300 is acquired (Step S102). Here, the running position obtained by use of the running distance detecting section 312 is determined from the number of rotations of the electric motor of the driving unit 320 for driving the wheels 380. Therefore, any errors due to the skidding of the wheels in the assembly carrying vehicle 300 and the abrasion of the wheels are not considered.

When the assembly carrying vehicle 300 detects a next indication plate 402 (Step S103), "1" is added to the value of the indication plate counter pointer 2000 (Step S104). At this time, it is determined whether or not a position data corresponding to the added value of the indication plate counter pointer is 0 (Step S105). If Y at the step S105, it is determined that the assembly carrying vehicle returns back to the start point. Then, the value of the indication plate counter pointer is updated to 0, and the operation flow returns to the operation at the step S101.

On the other hand, if N at the step 105, the current position data 3004 of the status table 318 is compared with the indication plate counter pointer 2000 stored in the indication plate table 317 and incremented by "1" at the step S104. If a difference between these values is smaller than a preset value (Step S106), the current position data 3004 is updated to the position data corresponding to the value of the indication plate counter pointer 2000 incremented by "1" at the step S104 (Step S108). After that, the operation flow returns to the step S102, and the operations of and subsequent to the step S102 are repeatedly executed.

If the difference between these values is equal to or larger than the preset value at the step S106, it is determined that a failure has occured during the run status of the assembly carrying vehicle 300. Then, the failure code data 3005 is stored in the status table 318 based on the type of the failure. Thereafter, the status table 318 is notified to the control apparatus 100 through the access point AP 200 (Step S107). The type of the failure in this case results from a position deviation due to the skidding of the wheels 380, the abrasion of the wheels 380 and the like. After that, the control apparatus 100 can issue a stop request signal to all the assembly carrying vehicles 300 running on the orbit 400 in response to the notice. Thus, all the assembly carrying vehicles 300 are stopped.

The assembly carrying vehicle 300 can accurately detect its current position through the above-mentioned operations.

Since the assembly carrying vehicle 300 sends the data stored in the status table 318 to the control apparatus 100, the control apparatus 100 can grasp the current position of the assembly carrying vehicle 300.

Next, a second example of the method for detecting a current position of an assembly carrying vehicle in the assembly carrying vehicle running control system of the present invention will be described below.

Here, it is supposed that each indication plate 402 is made of aluminum plate of 60×150 mm and installed at any detection point along the orbit 400. Also, the indication plate detection sensor 362 of the assembly carrying vehicle 300 sends an ON/OFF signal to the control unit 310, when detecting the indication plate 402. The control unit 310 adds "1" to the position table counter pointer 2000 of the indication plate table 317 in response to the ON signal to update the position table counter pointer 2000. Then, the control unit 310 acquires the position data stored in the indication plate table 317 based on the value indicated by the position table counter pointer 2000. Thus, the control unit 310 can recognize a position of the indication plate 402 detected by the indication plate detection sensor 362.

For this reason, the position recognized by the assembly carrying vehicle 300 is different from the arranged position of the indication plate 402, if the assembly carrying vehicle 300 is moved beyond the indication plate 402 in the state in which the electric power is not supplied to the assembly carrying vehicle 300. If the indication plates 402 are provided at a uniform speed interval, the correction for the current position is carried out, while the assembly carrying vehicle 300 still recognizes the wrong arrangement order. Various types of control are performed on the assembly carrying vehicle 300 in accordance with an accurate current position of the vehicle on the assembly production line. Hence, the inaccurate determination of the current position has an undesirable influence on the operation of the line. Also, If the indication plates 402 are not arranged in the uniform interval, this may result in the occurrence of a failure similar to the above-mentioned case, since the assembly carrying vehicle 300 can not measure the distance between the indication plates 402.

Figure 22:
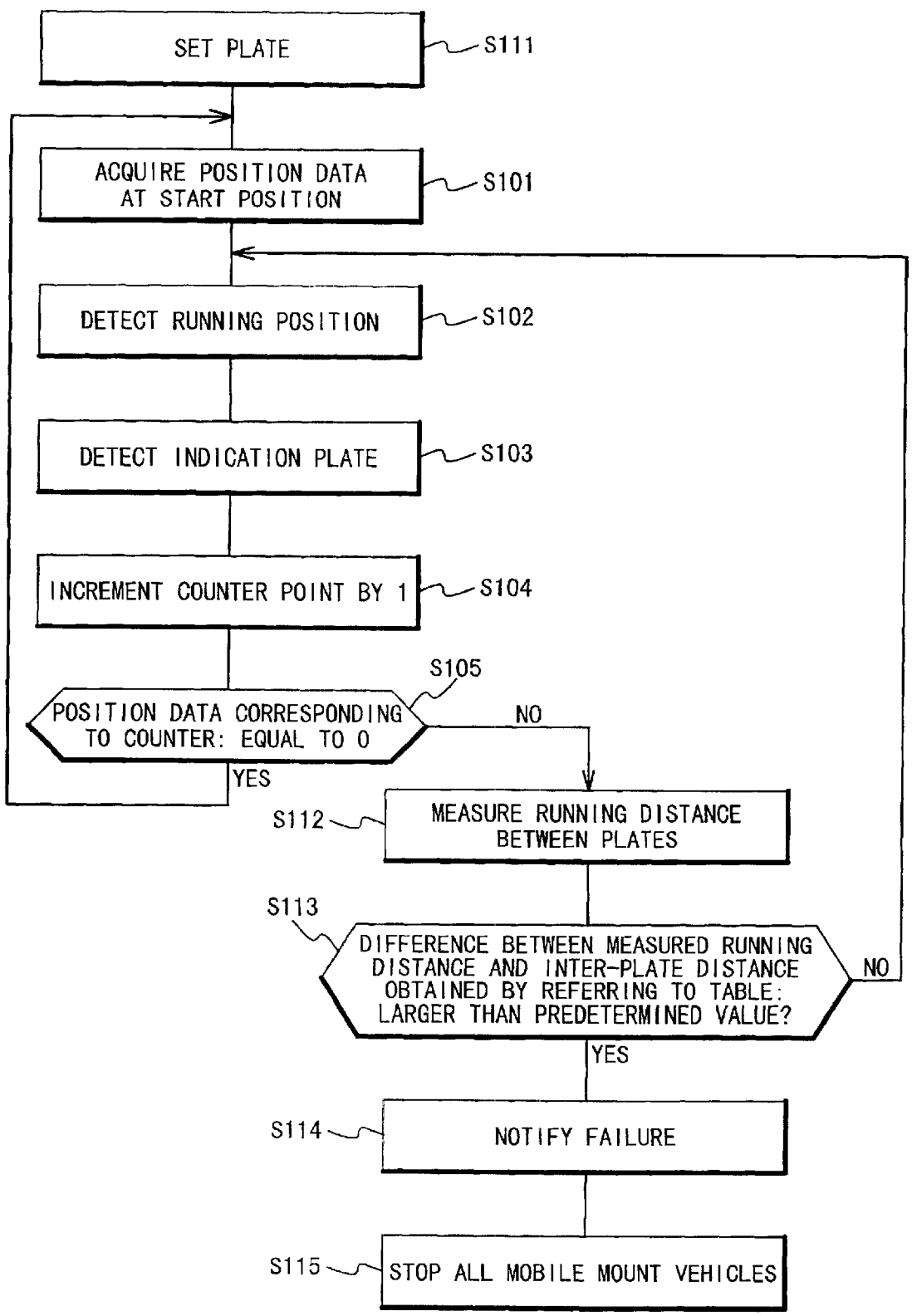
FIG. 22 is a flowchart showing another method for detecting a current position of an assembly carrying vehicle in the assembly carrying vehicle travel control system of the present invention.

A third example of the method for detecting a current position of an assembly carrying vehicle in the assembly carrying vehicle running control system of the present invention will be described below. FIG. 22 is a flowchart showing the third example of the method for detecting a current position of an assembly carrying vehicle in the assembly carrying vehicle running control system of the present invention.

Referring to FIG. 22, a plurality of indication plates 402 are arranged such that the interval between the indication plates 402 adjacent to each other is set at any desired interval (Step S111).

Next, operations at steps S101 to S105 are carried out which are indicated in the above-mentioned first example of the method for detecting a current position of an assembly carrying vehicle 300.

If N at the step S105, the operation flow advances to a step 5112. At the step S112, a distance between the indication plates 402 is measured by the rotation position sensor 330. Then, the operation flow advances to a step S113. At the step S113, a distance is calculated from a difference between the current position data obtained from the indication plate table 317 when the indication plate 402 is detected at the step S103 and the position data 3004 of the status table 318 corresponding to the indication plate 402 detected at a previous time. Then, the measured distance and the calculated distance are compared with each other.

If the difference between the measured distance and the calculated distance is smaller than a preset error range (N at Step S113), it is determined that a current position is within an allowable error. Then, the position data of the indication plate table 317 corresponding to the detected indication plate is transferred to the current position data 3004 of the status table 318. Thereafter, the operation flow returns back to the step S102, and the operations of and subsequent to the step S102 are repeated.

If the difference between the measured distance and the calculated distance is equal to or larger than the preset error range (Y at Step S113), it is determined that a failure has occurred. As a result, the communicating unit 350 of the assembly carrying vehicle 300 notifies a failure occurrence signal to the control apparatus 100 via the access point AP 200 (Step S114). The control apparatus 100 issues the stop request signal to all the assembly carrying vehicles 300 running on the orbit 400 via all the access points AP 200 in response to the failure occurrence signal. Thus, all the assembly carrying vehicles 300 are stopped in response to the stop request signal (Step S115).

In the above example, it may be designed such that the memory 312 of the assembly carrying vehicle 300 has another counter for determining the distance between the indication plates 402. In this case, a counter value of the counter is first reset when the indication plate is detected. Then, the counter is counted up in accordance with the detection result by the rotation position sensor 330 as the assembly carrying vehicle 300 runs. Thus, the movement distance of the assembly carrying vehicle 300 from the indication plate previously detected is acquired. When the indication plate is detected for this time, the movement distance is acquired as the distance between the indication plates 402. Then, the counter is reset again. The above-mentioned operations are repeated each time one of the indication plates 402 is detected.

As mentioned above, in the assembly carrying vehicle running control system of the present invention, the current position is always corrected based on the installed position of the indication plate 402 so that the assembly carrying vehicle 300 can accurately recognize the position on the orbit 400. Especially, if the communication between the assembly carrying vehicle 300 and the control apparatus 100 is always possible, a substantially accurate position control of the assembly carrying vehicles 300 can be carried out by the control apparatus 100.

Figure 10:
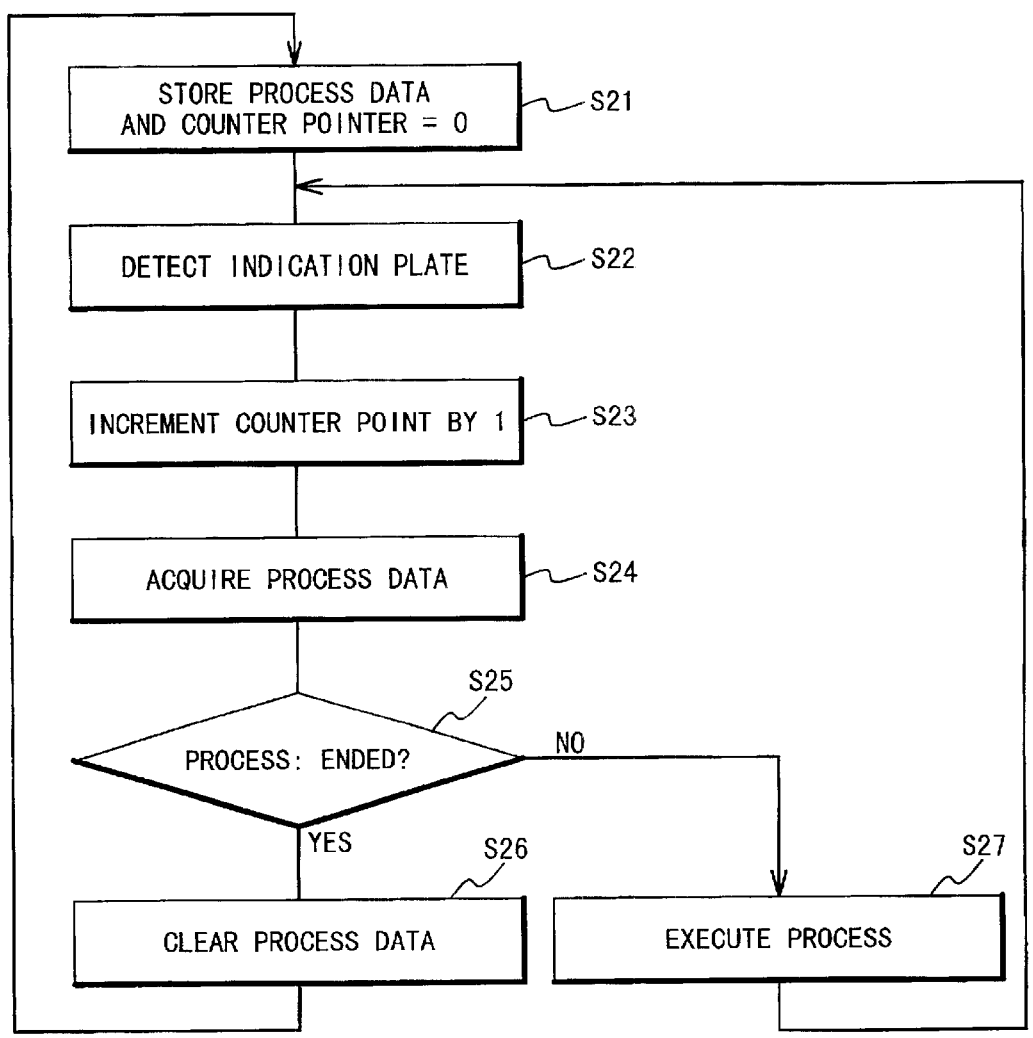
FIG. 10 is a flowchart showing a first example of a method for travel control in the assembly carrying vehicle travel control system of the present invention.

Next, a method for running control in the assembly carrying vehicle running control system of the present invention will be described below. FIG. 10 is a flowchart showing a first example of a method for running control in the assembly carrying vehicle running control system of the present invention, in the state in which the access points are arranged as described above.

Referring to FIG. 10, first, the assembly carrying vehicle 300 receives a process data 1100, and 1200 to 1900 from the access point AP 200 at the start point along the orbit 400, and stores the data in the operation table 316 in the order of access points AP. Also, the control unit 310 resets the table counter pointer 1001 of the operation table to 0 (Step S21). Then, the assembly carrying vehicle 300 starts to run in accordance with the process data 1100.

Next, when detecting the indication plate 402 during the running (Step S22), the assembly carrying vehicle 300 adds "1" to the table counter pointer 1001 (Step S23). Then, the assembly carrying vehicle 300 selects one of the process data 1100, and 1200 to 1900 corresponding to the value of the table counter pointer 1001 in the operation table 316 (Step S24). For example, the process data 1200 is selected.

Next, it is determined whether or not the operation mode data of the process data selected at the step S24 indicates a process end operation (Step S25). If N at the step S25, the assembly carrying vehicle 300 carries out an operation specified by the operation mode data of the selected process data (Step S27). After that, when detecting a next indication plate 402, the assembly carrying vehicle 300 carries out the operation of and subsequent to the step S22 again.

If the operation mode data of the process data selected at the step S24 specifies the process end operation (Step S25), the assembly carrying vehicle 300 determines that the assembly carrying vehicle 300 returns back to the start point. Then, the assembly carrying vehicle 300 clears the plurality of process data 1100, and 1200 to 1900 stored in the operation table 316 (Step S26), and then carries out the operations of and subsequent to the step S21.

As described above, in the first operation example of the method for running control in the assembly carrying vehicle running control system of the present invention, the assembly carrying vehicle 300 may have only the operation table 316.

Next, a second operation example of a method for running control in the assembly carrying vehicle running control system of the present invention will be described below. In the second operation example, the number of indication plates 402 is more than the number of storage areas for the process data. For this reason, when the indication plate 402 is detected, it is determined whether or not the process data corresponding to the detected indication plate 402 has been stored in the operation table 316.

Figure 11:
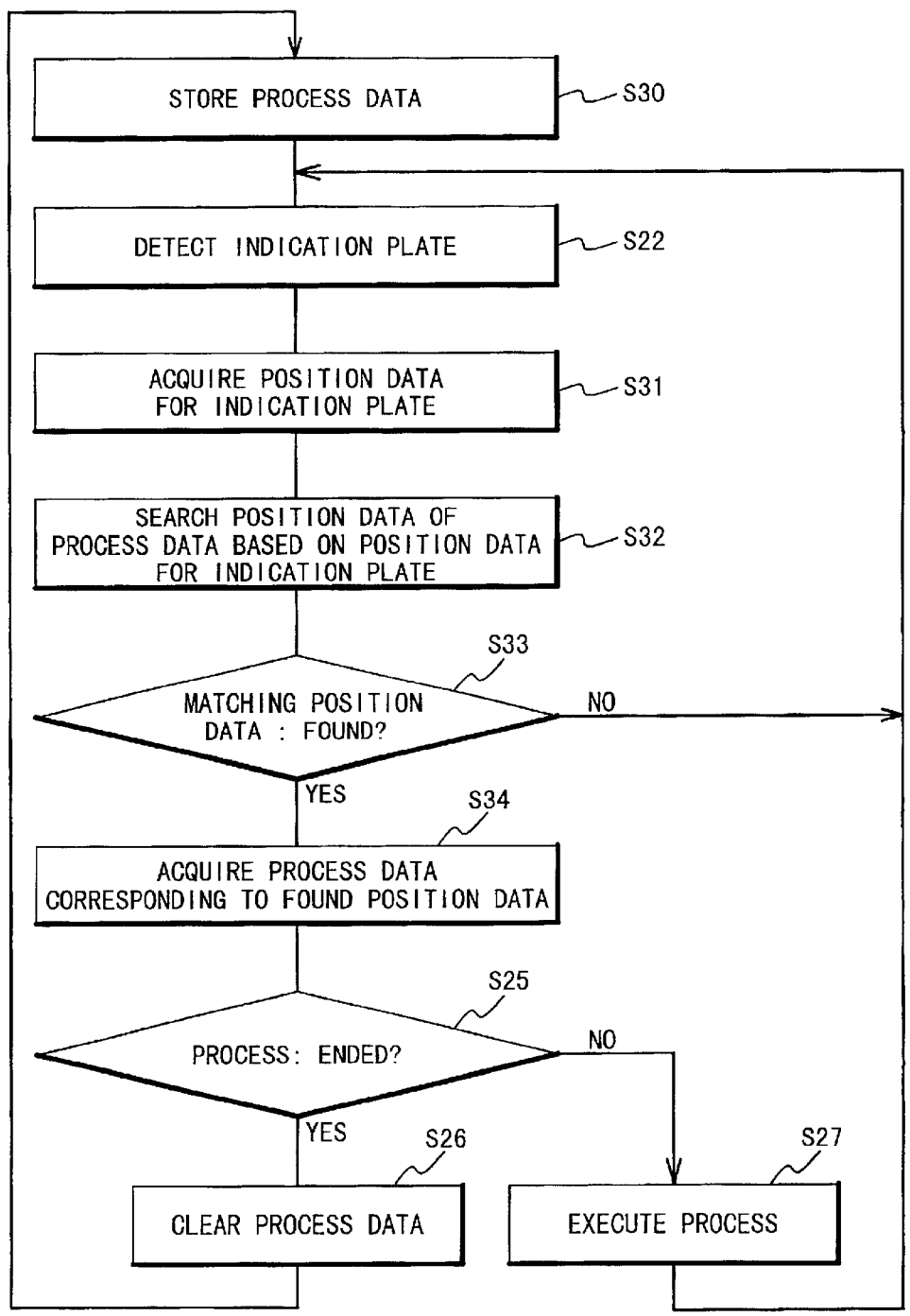
FIG. 11 is a flowchart showing a second example of a method for travel control in the assembly carrying vehicle travel control system of the present invention.

FIG. 11 is a flowchart showing the second operation example of the method for running control in the assembly carrying vehicle running control system of the present invention.

Referring to FIG. 11, the plurality of process data 1100, and 1200 to 1900 are stored from the access point AP 200 to the operation table 316 at the start point along the orbit 400 (Step S30).

Next, when detecting the indication plate 402 by the indication plate detection sensor 362 during the running of the assembly carrying vehicle 300 (Step S22), the control unit 310 of the assembly carrying vehicle 300 increments the table counter pointer 1001 by "1" and acquires a position data (Step S31). Subsequently, the control unit 310 checks whether or not there is the process data having the position data 1101 corresponding to the acquired position data in the operation table 316 (Step S32). When it is determined that the process data having the position data 1101 corresponding to the position data acquired at the step S31 is not in the operation table 316 (Step S33), the assembly carrying vehicle 300 continues to run in accordance with the process data currently specified, until the next indication plate 402 is detected. When detecting the next indication plate 402, the control unit 310 of the assembly carrying vehicle 300 carries out the operations of and subsequent to the step S22 again.

On the other hand, when it is determined that the process data having the position data 1101 corresponding to the position data acquired at the step S31 is stored in the operation table 316 (Step S33), the control unit 310 of the assembly carrying vehicle 300 specifies one of the plurality of process data corresponding to the position data acquired at the step S31 from the operation table 316 (Step S34). Subsequently, whether the specified process data instructs the operation end is determined (Step S25). When the process data specified at the step S34 is different from the operation end (N at the Step S25), the assembly carrying vehicle 300 carries out the operation instructed by the specified process data (Step S27). After that, the assembly carrying vehicle 300 continues the operation until the next indication plate 402 is detected. When detecting the next indication plate 402, the control unit 310 carries out the operations of and subsequent to the step S22 again.

When the process data specified at the step S34 instructs the process end operation (Y at the Step S25), the assembly carrying vehicle 300 determines that the assembly carrying vehicle 300 has returned back to the start point. Then, the control unit 310 of the assembly carrying vehicle 300 clears the plurality of process data 1100, and 1200 to 1900 stored in the operation table 316 (Step S26), and then carries out the operations of and subsequent to the step S30.

As mentioned above, in the second operation example of the assembly carrying vehicle running control system of the present invention, the assembly carrying vehicle 300 is sufficient to have only the operation table 316. Also, in the assembly carrying vehicle running control system of the present invention, a tag on which a position data is recorded may be placed along the orbit 400 instead of the indication plate 402. In this case, the assembly carrying vehicle 300 is sufficient to have the operation table 316, if the plate detection sensor 362 of the assembly carrying vehicle 300 can read the position data from the tag.

Also, in the second operation example, the specification of the process data is carried out based on the current position data updated based on the indication plate 402. However, if the position data 1101 of the operation table 316 has the number of times of detection of the indication plates 402 from the start point, the process data may be specified by using the position table counter pointer 2000 of the indication plate table 317 as a key.

Figure 12:
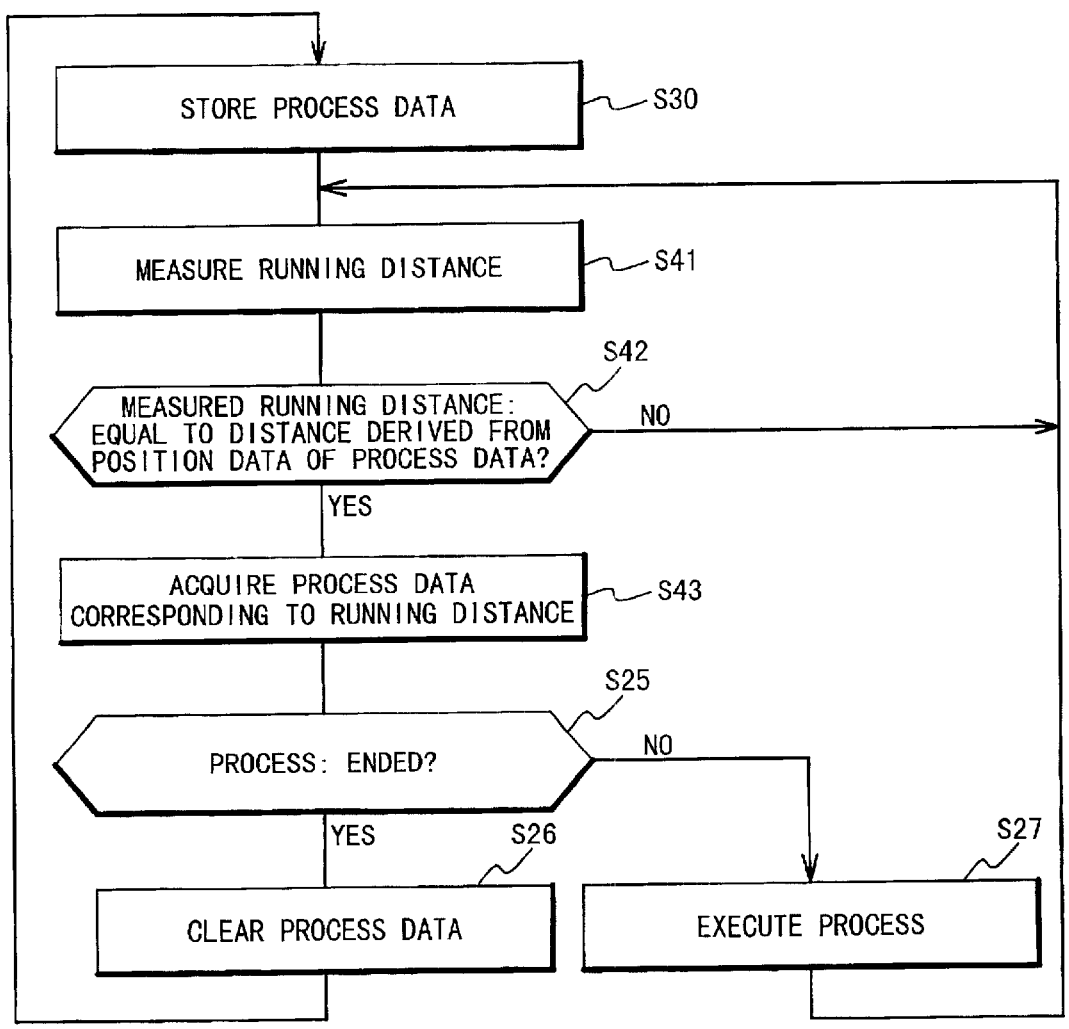
FIG. 12 is a flowchart showing a third example of a method for travel control in the assembly carrying vehicle travel control system of the present invention.

Next, a third operation example of a method for running control in the assembly carrying vehicle running control system of the present invention will be described below. In the third operation example, the process data is obtained by using as a key the current position measured by the assembly carrying vehicle 300. FIG. 12 is a flowchart showing the third operation example of the assembly carrying vehicle running control system in the present invention.

Referring to FIG. 12, at first, at a start point on the production line, the plurality of process data 1100, and 1200 to 1900 are stored from the access point AP 200 to the operation table 316, and the table counter pointer 1001 is set to 0 (Step S30).

The assembly carrying vehicle 300 measures a running distance of the assembly carrying vehicle 300 during the running (Step S41). It is determined whether or not there is one of the plurality of process data having the position data corresponding to the measured running distance in the operation table 316 (Step S42). If N at the step S42, the assembly carrying vehicle 300 continues to run in accordance with the process data currently specified, until the next indication plate 402 is detected. During movement of the assembly carrying vehicle 300, the running distance is measured. When detecting the next indication plate 402, the control unit 310 of the assembly carrying vehicle 300 carries out the operations of and subsequent to the step S41 again.

On the other hand, when it is determined that the process data having the position data 1101 corresponding to the measured running distance is stored in the operation table 316 (Step S42), the control unit 310 of the assembly carrying vehicle 300 specifies one of the plurality of process data corresponding to the measured running distance from the operation table 316 (Step S43).

Next, it is determined whether the process data specified at the step S43 is different from the process end operation (Step S25). If N at the step S25, the assembly carrying vehicle 300 carries out the operation specified by the process data (Step S27). After that, the assembly carrying vehicle 300 carries out the operations of and subsequent to the step S41 again, when detecting a next indication plate 402.

If the process data specified at the step S43 indicates the process end operation (Step S25), the assembly carrying vehicle 300 determines that the assembly carrying vehicle 300 has returned back to the start point. Then, the control unit 310 of the assembly carrying vehicle 300 clears the plurality of process data 1100, and 1200 to 1900 stored in the operation table 316 (Step S26). Subsequently, the control unit 310 carries out the operations of and subsequent to the step S30.

In the third operation example in the assembly carrying vehicle running control system of the present invention as mentioned above, the assembly carrying vehicle 300 is sufficient to have only the current position data 3004 of the status table 318 and the operation table 316. Also, in order to accurately obtain the current position used in this case, it is desirable to have the position table 2000 of the indication plate table 317. In addition, it is desirable to correct the current position by use of the position data corresponding to the indication plate 402, each time the indication plate detection sensor 362 detects the indication plate 402. This case requires the configuration that the assembly carrying vehicle 300 has the operation table 316, the position table indication plate 317 and the status table 318.

Also, in the third operation example, even if the position correction is carried out by use of the indication plate 402, the assembly carrying vehicle 300 is sufficient to have only the current position data 3004 of the status table 318 and the operation table 316, if the following conditions are met. That is, the conditions are that the tag on which the position data is recorded is placed along the orbit 400 instead of the indication plate 402, and that the plate detection sensor 362 of the assembly carrying vehicle 300 can read the position data from the tag.

Next, a roaming method in the assembly carrying vehicle running control system of the present invention will be described below.

FIG. 13 shows an arrangement example of a plurality of access points AP in the assembly carrying vehicle running control system of the present invention. Six access points AP 201, 202, 203, 204, 205 and 206 are arranged in this arrangement example.

The six access point AP 201, 202, 203, 204, 205 and 206 have the cell areas 211, 212, 213, 214, 215 and 216, respectively. Any location along the predetermined orbit 400 on which each assembly carrying vehicle 300 runs is included in at least one cell area. Each assembly carrying vehicle 300 has the communicating unit 350 and a high speed roaming table 354, as described above. The assembly carrying vehicle 300 carries out the radio communication with one of the plurality of access points AP 200 using the communicating unit 350. Each assembly carrying vehicle 300 communicates with the access point AP 200 having an electric field intensity of a reception signal equal to or greater than a preset threshold value among the plurality of access points AP 200.

Here, a Table 4 shows the high speed roaming table 221 in an arrangement example of the plurality of access points AP.

TABLE 4

| AP of center | adjacent access points |
| --- | --- |
| AP1 | AP2, AP3, AP4, AP5 |
| AP2 | AP1, AP3, AP4, AP5 |
| AP3 | AP1, AP2, AP4, AP5 |
| AP4 | AP2, AP3, AP, AP6 |
| AP5 | AP2, AP3, AP4, AP6 |
| AP6 | AP2, AP3, AP4, AP5 |

If the frequency hopping (FH) method of the spectral spreading (SS) communication is used for the radio communication between the assembly carrying vehicle 300 and the access point AP 200, each access point AP 200 carries out a transmission by use of a different hopping pattern. For this reason, when the assembly carrying vehicle 300 receives a transmission signal sent from one access point AP 200, transmission signals from the other access points AP 200 do not function as a noise substantially. Thus, the assembly carrying vehicle 300 can individually identify and receive the transmission signal from each access point AP 200. Hence, the assembly carrying vehicle 300 can communicate with one of the plurality of access points AP 200, even in an overlap area in which the cell areas in the plurality of access points AP 200 overlap with each other.

Next, the high speed roaming method in the assembly carrying vehicle running control system of the present invention of the present invention will be described below.

Figure 14:
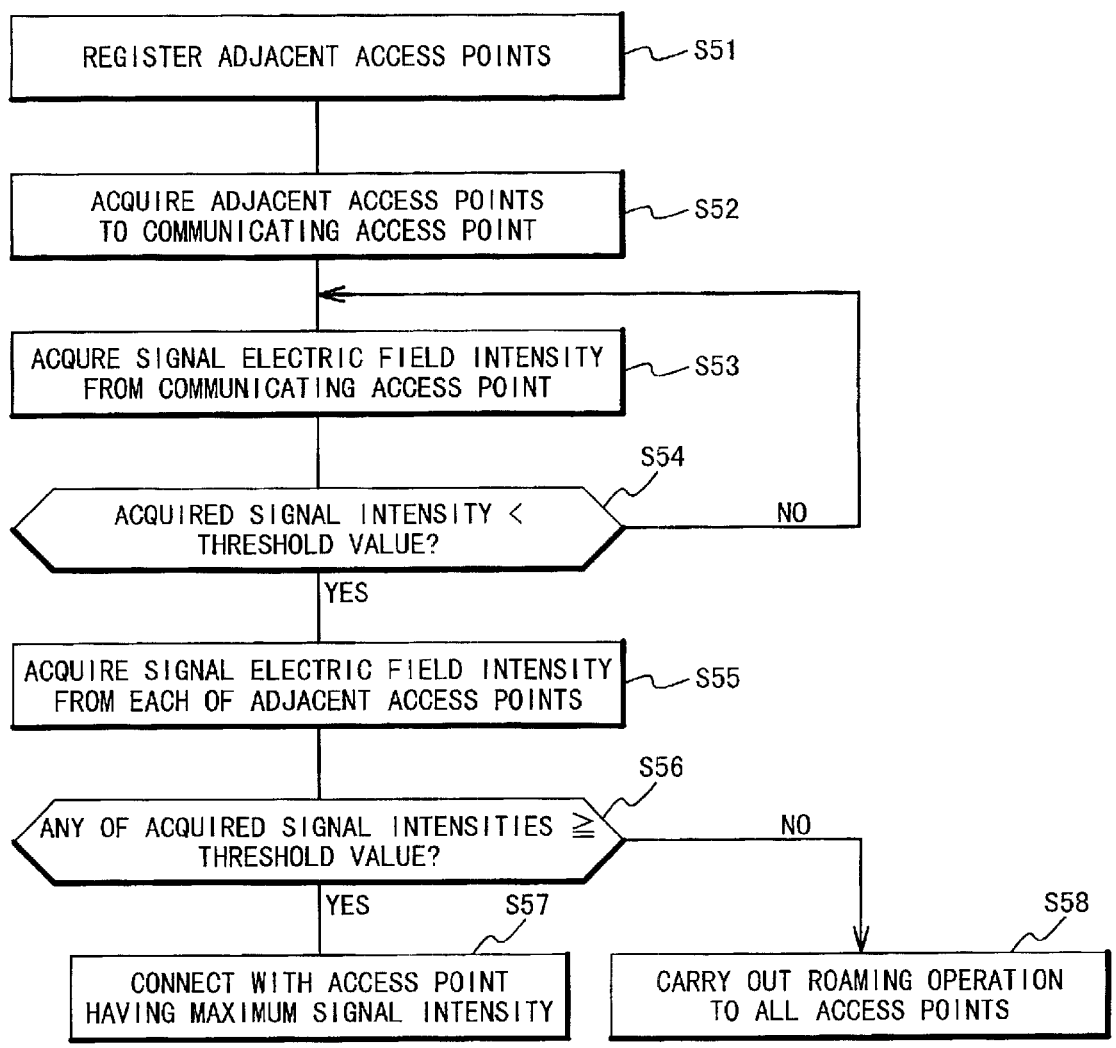
FIG. 14 is a flowchart showing the high speed roaming method of in the assembly carrying vehicle travel control system in the present invention.

FIG. 14 is a flowchart showing the high speed roaming method of the present invention. Referring to FIG. 14, at first, data indicative of access points AP 200 adjacent to each of the plurality of access points AP 200 are registered on a high speed roaming table 221 of the access point AP 200 from the control apparatus 100 (Step S51). It is supposed that the number of registered adjacent access points AP is a maximum of 4 in this example. In this case, as the adjacent access points AP, it is desirable to select access points AP close to the access point AP 200 in physical distance and/or the access points AP provided in a travelling direction of the assembly carrying vehicle 300.

If the assembly carrying vehicle 300 communicates with one access point AP 200 as a communicating access point, the assembly carrying vehicle 300 acquires the data indicative of the adjacent access points AP from the communicating access point AP (Step S52).

The assembly carrying vehicle 300 measures the electric field intensity of a reception signal from the communicating access point AP (Step S53). It is determined whether or not the electric field intensity of the reception signal is equal to or lower than the predetermined threshold value (step S54). If N at the step S54, the operational flow returns back to the step S53 again. On the contrary, if Y at the step S54, namely, the electric field intensity of the reception signal is lower than a predetermined threshold value, the assembly carrying vehicle 300 measures the electric field intensities of a reception signal from each of the adjacent access point AP indicated by the high speed roaming table 354 acquired from the communicating access point AP (Step S55).

It is determined whether or not the maximum of the electric field intensities of the reception signals measured at the step S55 is equal to or higher than the predetermined threshold value (Step S56). If Y at the step S56, the assembly carrying vehicle 300 switches a communication destination from the currently communicating access point AP to one of the adjacent access points AP which has the maximum reception signal electric field intensity (Step S57). This operation is a high speed roaming operation.

On the other hand, when all the electric field intensities of the reception signals measured at the step S55 are lower than the predetermined threshold value (Step S56), the assembly carrying vehicle 300 measures the electric field intensity of a reception signal from each of the access points AP 200 which are previously registered in the roaming table 355. Then, the assembly carrying vehicle 300 switches the communication destination from the currently communicating access point AP to one of the access points AP 200 having the maximum reception signal electric field intensity (Step S58). This operation is a normal roaming operation.

As a first modification of the high speed roaming method in the assembly carrying vehicle running control system of the present invention, each access point AP 200 does not have the high speed roaming table 221 but the control apparatus 100 stores the adjacent access points AP corresponding to each access point AP. In this case, the above mentioned high speed roaming method by the assembly carrying vehicle may be changed as follows. That is, at first, at the step S51, the high speed roaming table indicative of the adjacent access points AP 200 for each access point AP 200 is recorded in the control apparatus 100. Next, at the step S52, when the assembly carrying vehicle 300 communicates with the control apparatus 100 via the communicating access point AP 200, the assembly carrying vehicle 300 acquires the high speed roaming table indicative of the adjacent access points AP for the communicating access point AP from the control apparatus 100 through the communicating access point AP.

As a second modification of the high speed roaming method in the assembly carrying vehicle running control system of the present invention, each access point AP 200 does not have the high speed roaming table 221. On contrary, the high speed roaming table 354 of the assembly carrying vehicle 300 previously stores the adjacent access points AP corresponding to each access point AP. In this case, the above mentioned roaming method by the assembly carrying vehicle is changed as follows. That is, the steps S51, S52 are not executed. At the step S55, the assembly carrying vehicle 300 refers to the high speed roaming table 354 to acquire the adjacent access points AP for the communicating access point AP. Then, the assembly carrying vehicle 300 measures the electric field intensity of a reception signal from each adjacent access point AP.

Also, the adjacent access points AP corresponding to each access point AP stored in the high speed roaming table 354 are recorded or updated by the following operations. That is, a record or change instruction is transmitted from the input and output unit 101 to the control apparatus 100. Then, the control apparatus 100 transmits the record data or the change data to the assembly carrying vehicle 300 through the communicating access point AP in response to the record or update instruction. Finally, the assembly carrying vehicle 300 records the adjacent access points AP corresponding to the communicating access point AP on the high speed roaming table 354 in accordance with the record instruction. Also, the assembly carrying vehicle 300 updates the adjacent access points AP corresponding to the communicating access point AP on the high speed roaming table 354 in accordance with the update instruction.

In the above-mentioned example and the modifications, the communicating unit 350 of the assembly carrying vehicle 300 may carry out the operation based on the signal-noise ratio of a reception signal, instead of the electric field intensity of a reception signal.

In case of the assembly carrying vehicle running control system used in the automobile assembling line, the assembly carrying vehicle moves between the stations at a constant pitch and at a constant speed during the operation of the system. Unless a subsequent assembly carrying vehicle is controlled, the subsequent assembly carrying vehicle continues to run. Therefore, if the assembly carrying vehicle stops because of any trouble, the subsequent assembly carrying vehicle collides with the assembly carrying vehicle. In order to avoid the collision, an urgent stop of the entire assembly carrying vehicles is necessary.

In this case, in the assembly carrying vehicle running control system, when the radio communication is carried out between the control apparatus 100 and each assembly carrying vehicle 300 in a wide range such as an automobile manufacturing factory, the control apparatus 100 is connected to access points AP 200. The radio communication with each assembly carrying vehicle 300 is carried out through the plurality of access points AP. In this case, each assembly carrying vehicle communicates with the control apparatus 100 through a communicating access point AP determined in accordance with a measured result of the electric field intensity of a reception signal from each of the plurality of access points AP. In short, each assembly carrying vehicle 300 communicates with the control apparatus 100 while switching the access point AP used for the communication in accordance with the running of each assembly carrying vehicle.

The high speed roaming operation and switching operation to the access points AP are carried out by the assembly carrying vehicle as follows. That is, if the communicating access point AP does not satisfy a communicable condition, the communicating unit 350 of the assembly carrying vehicle 300 determines one access point AP having the strongest electric field intensity of a reception signal from among the existing access points AP. Then, the communicating unit 350 of the assembly carrying vehicle 300 switches the communication destination to that access point AP if the electric field intensity of the reception signal from that access point AP satisfies the connection condition.

In this case, the assembly carrying vehicle 300 can not communicate with the control apparatus 100 while the switching operation of the access point AP 200 is carried out. For this reason, if a preceding assembly carrying vehicle 300 is urgently stopped while the succeeding assembly carrying vehicle 300 carries out the switching operation of the access point AP 200, the succeeding assembly carrying vehicle 300 can not receive a stop request signal for urgent stop sent by the control apparatus 100. The succeeding assembly carrying vehicle 300 can receive the stop request signal from the control apparatus 100 only after the switching operation of access point AP 200. Thus, a delay corresponding to the switching operation of the access point AP is present in the signal transmission. Also, if the preceding assembly carrying vehicle 300 urgently stops while carrying out the switching operation of the access point AP 200, the urgent stop occurrence signal can not be transmitted from the preceding assembly carrying vehicle 300 to the control apparatus 100. The urgent stop occurrence signal can be transmitted to the control apparatus 100 after the switching operation of the access point AP 200. Hence, the delay corresponding to the switching operation of the access point AP 200 is generated in the signal transmission.

According to the above example and modifications of the high speed roaming method of the present invention, the high speed roaming operation can be carried out in which the access points AP as the candidates of the switching operation are limited. Therefore, the switching operation of the access point AP can be carried out faster. According to an experiment, the high speed roaming operation in the assembly carrying vehicle running control system of the present invention is carried out in several tens of milliseconds or in hundred milliseconds or less at most.

Here, it is supposed that in the assembly carrying vehicle running control system, the assembly carrying vehicle 300 having the weight of 1,400 kg is driven under the conditions of the running speed of 1.5 m/s, the interval of 0.8 m from a preceding assembly carrying vehicle 300, the weight of the carried automobile assembly of 1,400 kg. In this case, when a certain assembly carrying vehicle 300 is urgently stopped, the subsequent assembly carrying vehicle collides with the urgently stopped assembly carrying vehicle, unless a stop request signal for urgent stop of the subsequent assembly carrying vehicles is transmitted from the control apparatus 100 to the subsequent assembly carrying vehicle 300 within about 500 ms after the urgent stop of the certain assembly carrying vehicle 300.

In the assembly carrying vehicle running control system of the present invention, the urgent stop of all the assembly carrying vehicles 300 is carried out by use of the following methods: (1) the urgently stopped assembly carrying vehicle 300 sends the urgent stop occurrence signal to the control apparatus 100 through the access point AP 200, (2) the control apparatus 100 sends the stop request signal to all the assembly carrying vehicles 300 through the access point AP 200 when receiving the urgent stop occurrence signal, and (3) all the assembly carrying vehicles 300 carry out the urgent stop. Here, in the communication between the access point AP 200 and the assembly carrying vehicles 300 carried out in the operations (1) and (2), it is necessary that the assembly carrying vehicles 300 carry out the switching operation of the access point AP 200, depending on the electric field intensities of reception signals from the access points AP 200 prior to the communication. The communication between the assembly carrying vehicles 300 and the access points AP 200 can not be carried out during the switching operation of the access point AP.

In the assembly carrying vehicle running control system of the present invention, if a time necessary for the switching operation of the access points AP 200 by the assembly carrying vehicle 300 is equal to or less than 200 ms, the stop request signal can be transmitted to the subsequent assembly carrying vehicle 300 within about 500 ms after the urgent stop of a certain assembly carrying vehicle 300.

According to the experiment, the high speed roaming operation in the assembly carrying vehicle running control system of the present invention can be carried out in several tens of milliseconds or in hundred milliseconds or less at most. Also, the access points AP 200 for the high speed roaming operation are limited to the access points 200 provided physically close to the communicating access point AP and/or provided in the travelling direction of the assembly carrying vehicle. Thus, the high speed roaming operation is substantially applied to the switching operation of the access point AP. Hence, the assembly carrying vehicle running control system of the present invention using the radio communication method between the control apparatus 100 and the assembly carrying vehicle 300, can avoid or reduce the collision between the assembly carrying vehicles 300 caused by the trouble occurring in the running assembly carrying vehicle 300. In short, the assembly carrying vehicle running control system of the present invention can satisfy the transmission time of the signal required to maintain the stability of the system, in the communication between the control apparatus 100 and the assembly carrying vehicle 300. Also, the assembly carrying vehicle running control system can protect the radio communication between the control apparatus 100 and the assembly carrying vehicle 300 from being substantially interrupted in temporal element.

Next, the communicating method between the assembly carrying vehicle 300 and the access point AP 200 in the assembly carrying vehicle running control system of the present invention will be described below. Here, a frequency hopping (FH) method of the spectral spreading (SS) communication is used for the radio communication between the assembly carrying vehicle 300 and the access point AP 200.

Figure 15:
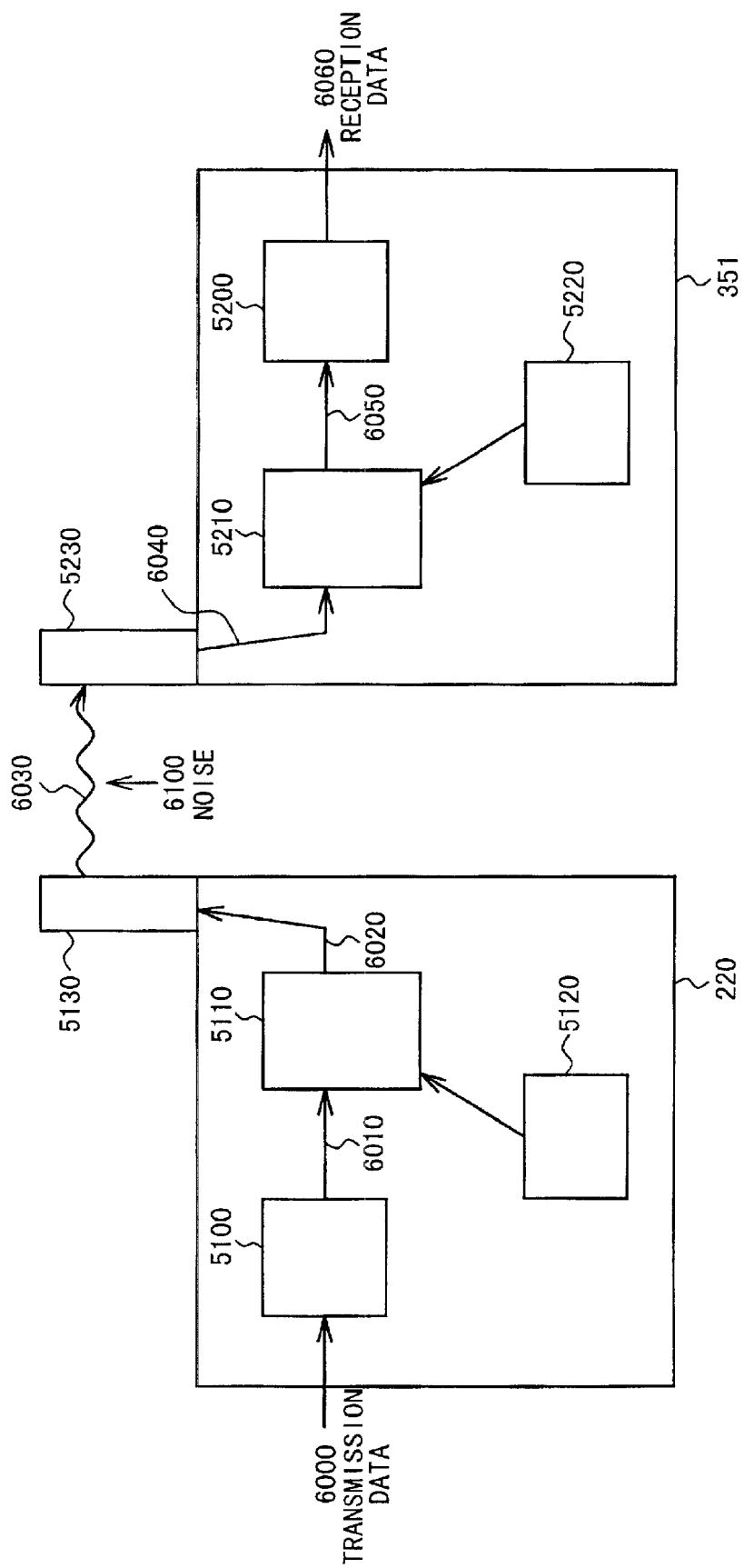
FIG. 15 is a function block diagram of a transmitting and receiving section on an access point and a transmitting and receiving section of a communicating unit of the assembly carrying vehicle.

FIG. 15 is a function block diagram of the transmitting and receiving section 351 of the assembly carrying vehicle 300 and the transmitting and receiving section 220 of the access point AP 200. This function block diagram shows a function when a signal is sent from the transmitting and receiving section 220 of the access point AP 200 to the transmitting and receiving section 351 of the assembly carrying vehicle 300, for convenience.

Referring to FIG. 15, the transmitting and receiving section 220 of the access point AP 200 is composed of a modulator 5100, a frequency synthesizer 5110, a spreading section 5120 and an antenna 5130. The modulator 5100 of the access point AP 200 converts or modulates a transmission signal 6000 from a bit sequence into a digital sequence. The frequency synthesizer 5121 of the access point AP 200 is a device for generating various frequencies. Also, the transmitting and receiving section 351 of the assembly carrying vehicle 300 is composed of a demodulator 5200, a frequency synthesizer 5210, an inversely spreading section 5220 and an antenna 5230. The frequency synthesizer 5210 of the assembly carrying vehicle 300 is a device for generating various frequencies.

The modulator 5100 modulates a transmission signal 6000 to produce a modulated transmission signal 6010. The spreading section 5110 of the access point AP 200 spreads the modulated transmission signal 6010 based on a frequency generated by the frequency synthesizer 5110 which switching a central frequency in a predetermined order. The order of the frequency in this switching operation is defined in accordance with a PN (Pseudo Noise) code. At this time, the modulated transmission signal is spread in a frequency band of a relatively wide band, e.g., from 2.471 to 2.497 GHz within a 2.4 GHz band in this example. A spread transmission signal 6020 is transmitted from the antenna 5130 of the access point AP 200 as a radio signal 6030. The spread signal is transmitted with a relatively weak wave, e.g., less than the electric field intensity of 100 mW as the radio signal 6030. At this time, in the radio signal 6030, one bit can be spread into many frequencies. Thus, the frequency hopping (FH) method of the spectrum spreading (SS) communication is strong for fading and interference.

The antenna 5230 of the assembly carrying vehicle 300 receives the radio signal 6030 and produces a reception signal 6040. At this time, the radio signal 6040 includes a noise 6100 in many cases. The inversely spreading section 5220 of the assembly carrying vehicle 300 inversely spreads the reception signal 6040 by use of the frequency generated by the frequency synthesizer 5210. The order of the frequency used for this inversely spreading is defined in accordance with the PN (Pseudo Noise) code used by the spreading section 5110 of the access point AP 200. At this time, in the radio signal 6040, the data of one bit is spread with many frequencies. Therefore, the inversely spreading of the reception signal 6040 has the excellent property of removing the noise 6100 added to the radio signal 6030. The demodulator 5200 of the assembly carrying vehicle 300 demodulates an inversely spread signal 6050 from the digital sequence into the bit sequence. As a result, the assembly carrying vehicle 300 acquires a received signal 6060.

Also, with regard to the transmission from the assembly carrying vehicle 300 to the access point AP, it is possible by reversing the function of the access point AP 200 and the function of the assembly carrying vehicle 300 described above.

Here, in the spectral spreading (SS) communication using the frequency hopping (FH) method, even if a plurality of transmitters send transmission signals, a receiver can receive a corresponding one of the transmission signals from one transmitter. In this case, the other transmission signals sent from the other transmitters are not regarded as noise. This is because the hopping patterns used in the spreading modulation carried out on the transmission signals on the respective transmitter are different from each other, which results in a low probability that the respective transmission signals interfere with each other as the noise. Also, the signals themselves are spread. Hence, the recovery of the transmission signal is high even if the noise is generated in a part of the band.

As a modification of the assembly carrying vehicle running control system, a case is supposed that the assembly carrying vehicle 300 does not run on the predetermined orbit but runs freely within any preset closed space. In this case, it is supposed that a plurality of access points AP 200 are arranged such that they can communicate with the assembly carrying vehicle 300 at any location within the closed space. The modification makes it possible for the assembly carrying vehicle 300 to always communicate with the control apparatus 100.

In the assembly carrying vehicle running control system, it is desired that the assembly carrying vehicle 300 and the control apparatus 100 always communicate with each other. For this purpose, the assembly carrying vehicle 300 needs to carry out the roaming operation based on the electric field intensity of a reception signal from the access point AP 200 in accordance with the flow shown in FIG. 14.

In this way, in the assembly carrying vehicle running control system of the present invention, it is possible for the assembly carrying vehicle 300 to always communicate with the control apparatus 100 in the closed space within a factory, or in the entire area in which the assembly carrying vehicle moves.

FIG. 13, again shows an arrangement example of the plurality of access points AP 200 in the assembly carrying vehicle running control system of the present invention, as described above. The six access point AP 201, 202, 203, 204, 205 and 206 are arranged in this arrangement example. The six access points AP 201, 202, 203, 204, 205 and 206 have respectively corresponding cell areas 211, 212, 213, 214, 215 and 216. An optional location along the predetermined orbit 400 on which each assembly carrying vehicle 300 moves is contained in at least one cell area. Each assembly carrying vehicle 300 has a communicating unit 350, and uses this communicating unit 350 to carry out the radio communication with one of the plurality of access points AP 200.

The frequency hopping (FH) method of the spectral spreading (SS) communication is used for the radio communication between the assembly carrying vehicle 300 and the access point AP 200. In this case, each access point AP 200 carries out a transmission by use of a different hopping pattern. The assembly carrying vehicle 300 can receive the transmission signal from one access point AP 200 without regarding transmission signals from other access points AP 200 as noise. Thus, the assembly carrying vehicle 300 can individually identify and receive the transmission signal from each access point AP 200. Hence, the assembly carrying vehicle 300 can communicate with one of the plurality of access points AP 200, even in an overlap area in which the cell areas of the plurality of access point AP 200 overlap with each other.

The function of the access point AP 200 will be described below. Each access point AP 200 can carry out the radio communicate with the plurality of assembly carrying vehicles 300. Also, each access point AP 200 has a cell area at which the access point AP 200 can communicate with the assembly carrying vehicle 300.

Here, the assembly carrying vehicle 300 refers to the operation table 316, the indication plate table 317 and the status table 318 to carry out the operation. At first, in the assembly carrying vehicle 300, the distance detecting section 312 detects a current position based on the sensing result of the rotation position sensor 330. Then, the control unit 310 of the assembly carrying vehicle 300 refers to the status table 318 based on the detected current position as a key to retrieve the current position data 3004 equal to the detected current position. Thus, the control unit 310 of the assembly carrying vehicle 300 acquires the operation status data 3006 corresponding to the current position data 3004 and carries out the operation indicated by the operation status data 3006. Also, the indication plate detection sensor 362 detects the current position of the assembly carrying vehicle 300. The control unit 310 refers to the indication plate table 317 based on the detected current position, to retrieve the position data corresponding to the detected indication plate 402. Thus, the current position data 3004 of the assembly carrying vehicle 300 is corrected based on the retrieved position data. Also, the current operation status data 3006 of the assembly carrying vehicle 300 is recorded in the status table 318.

Figure 16:
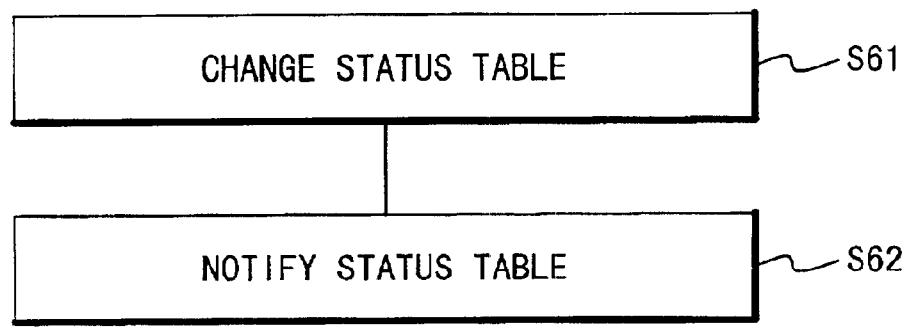
FIG. 16 is a flowchart showing a travel controlling method in the assembly carrying vehicle travel control system of the present invention.

A running controlling method in the assembly carrying vehicle running control system of the present invention will be described below. FIG. 16 is a flowchart showing the running controlling method in the assembly carrying vehicle running control system of the present invention.

Referring to FIG. 16, at first, it is checked whether any of the failure code data 3005, the operation status data 3006, the block area data 3007. the station number data 3008 and the plate position data 3009 in the status table 318 is changed. When it is determined that any data is changed (Step S61), the assembly carrying vehicle 300 notifies the change to the control apparatus 100 through the communicating access point AP 200 (Step S62). In accordance with this notice, the control apparatus 100 can control and manage the running status of each assembly carrying vehicle 300.

In this case, the change of any data of the failure code data 3005, the operation status data 3006, the block area data 3007, the station number data 3008 and the plate position data 3009 is carried out in accordance with the monitor result by the control unit 310 of the assembly carrying vehicles 300.

Figure 17:
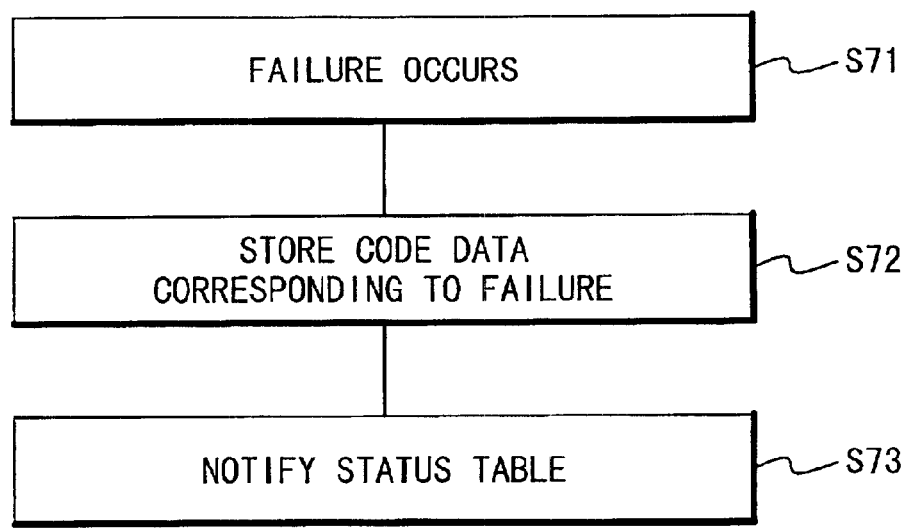
FIG. 17 is a flowchart showing the travel controlling method when trouble occurs in the assembly carrying vehicle in the assembly carrying vehicle travel control system of the present invention.

Especially, the running controlling method in case of occurrence of a failure in the assembly carrying vehicle 300 will be described below with reference to the drawings. FIG. 17 is a flowchart showing the running controlling method when the trouble occurs in the assembly carrying vehicle 300. Referring to FIG. 17, at first, it is checked whether any failure has occurred in the assembly carrying vehicle 300. When it is determined that any failure has occurred in the assembly carrying vehicle 300 (Step S71), the control unit 310 determines a type of the failure, and records a code data 3005 corresponding to the type of failure as the failure code data 3005 (Step S72). When the failure code data 3005 is recorded at the step S72, the data recorded in the status table 318 are sent to the control apparatus 100 through the communicating access point AP 200 (Step S73).

The control apparatus 100 can refer to the status table 318 to thereby identify the assembly carrying vehicle 300 in which the failure has occurred. Also, the control apparatus 100 obtains the current position data 3004 and the failure code data 3005. Moreover, it becomes possible for the control apparatus 100 to stop all the assembly carrying vehicles 300 or to read out the operation status data 3006 of only the assembly carrying vehicle 300 in which the failure has occurred, on the basis of the notice from the control apparatus 100.

In addition, the assembly carrying vehicle 300 and the control apparatus 100 can always communicate with each other, in the assembly carrying vehicle running control system of the present invention. Thus, the assembly carrying vehicle 300 can periodically notify the data stored in the status table 318 to the control apparatus 100. In short, in the assembly carrying vehicle running control system of the present invention, the type and content of the failure occurred in the assembly carrying vehicle can be quickly notified to the, control apparatus 100. Thus, the assembly carrying vehicle running control system of the present invention can manage the status of each assembly carrying vehicles to always and quickly control the assembly carrying vehicles.

As described above, the plurality of access points AP 200 have individually different cell areas. In each cell area, the electric field intensity of a reception signal from a corresponding access point AP 200 is equal to or higher than a predetermined threshold value. Each access point AP 200 carries out the radio communication with the plurality of assembly carrying vehicles 300. This communication can be carried out between a certain access point AP 200 and assembly carrying vehicles 300 existing in a cell area of that access point AP 200.

Also, the plurality of access points AP200 are arranged so as to always permit the communication with the assembly carrying vehicle 300. At this time, any location of the assembly carrying vehicle 300 along the orbit 400 is contained in at least one cell area. Otherwise, the plurality of access points AP 200 may be arranged such that any location of the assembly carrying vehicle 300 in a closed space such as the whole of the automobile assembling line is contain in at least one cell area.

FIG. 13, again shows an arrangement example of the plurality of access points AP in the assembly carrying vehicle running control system of the present invention, as described above.

The frequency hopping (FH) method of the spectral spreading (SS) communication is used for the radio communication between the assembly carrying vehicle 300 and the access point AP 200, and each access point AP 200 carries out a transmission at a different hopping pattern. For this reason, the assembly carrying vehicle 300 can receive a transmission signal from one access point AP 200 without regarding the transmission signals from the other access points AP 200 as noise. Thus, the assembly carrying vehicle 300 can individually identify and receive the transmission signal from each access point AP 200. Hence, even in an overlap area in which the cell areas of the plurality of access points AP 200 overlap with each other, the assembly carrying vehicle 300 can correctly communicate with one of the plurality of access points AP 200.

Figure 18:
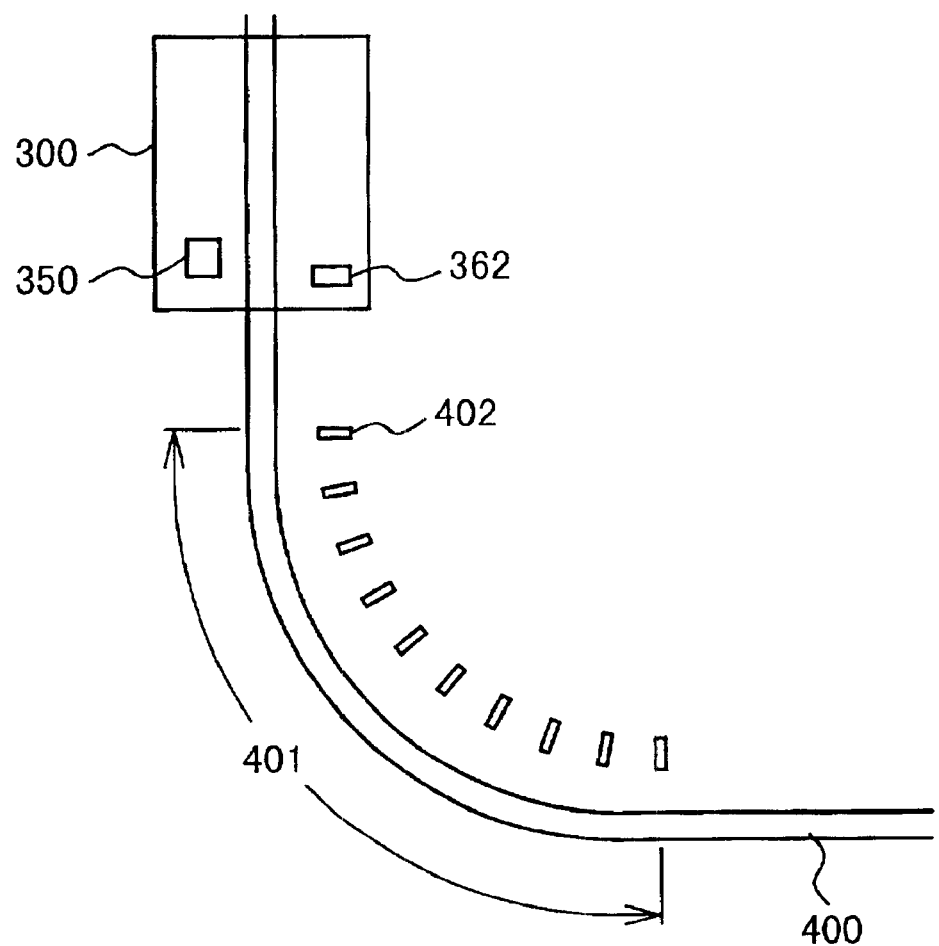
FIG. 18 is a plan view showing an arrangement of indication plates on a corner of an orbit.

FIG. 18 shows an arrangement of an indication plates on the corner 401 of the orbit 400 on which the assembly carrying vehicle 300 runs. As shown in FIG. 18, the indication plates 402 are installed in a constant interval on the corner 401 along the orbit 400 on which the assembly carrying vehicle 300 runs. Also, the indication plate 402 is detected at the installed position by the indication plate detection sensor 362 of the assembly carrying vehicle 300.

FIG. 2 shows the function block diagram of the access point AP 200, as described above. Also, FIG. 7 shows the function block diagram of the communicating unit 350 of the assembly carrying vehicle 300.

The high speed roaming method in the communication between the access points AP 200 and the assembly carrying vehicle 300 is the same as that of the flow shown in FIG. 14. Through the usage of the above-mentioned roaming method, the assembly carrying vehicle 300 can quickly switch the communicating access point AP 200. Also, a delay in the communication between the assembly carrying vehicle 300 and the control apparatus 100 can be reduced.

In addition, the roaming method using the normal roaming table 355 is possible in the assembly carrying vehicle running control system of the present invention. In this case, it is necessary that the access points AP 200 are arranged for the assembly carrying vehicle 300 to communicate with the control apparatus 100 on any corner 401.

An allowable delay in the communication between the assembly carrying vehicle 300 and the control apparatus 100 changes depending on a tact interval between the assembly carrying vehicles 300 and a traveling speed of the assembly carrying vehicle 300.

Figure 19:
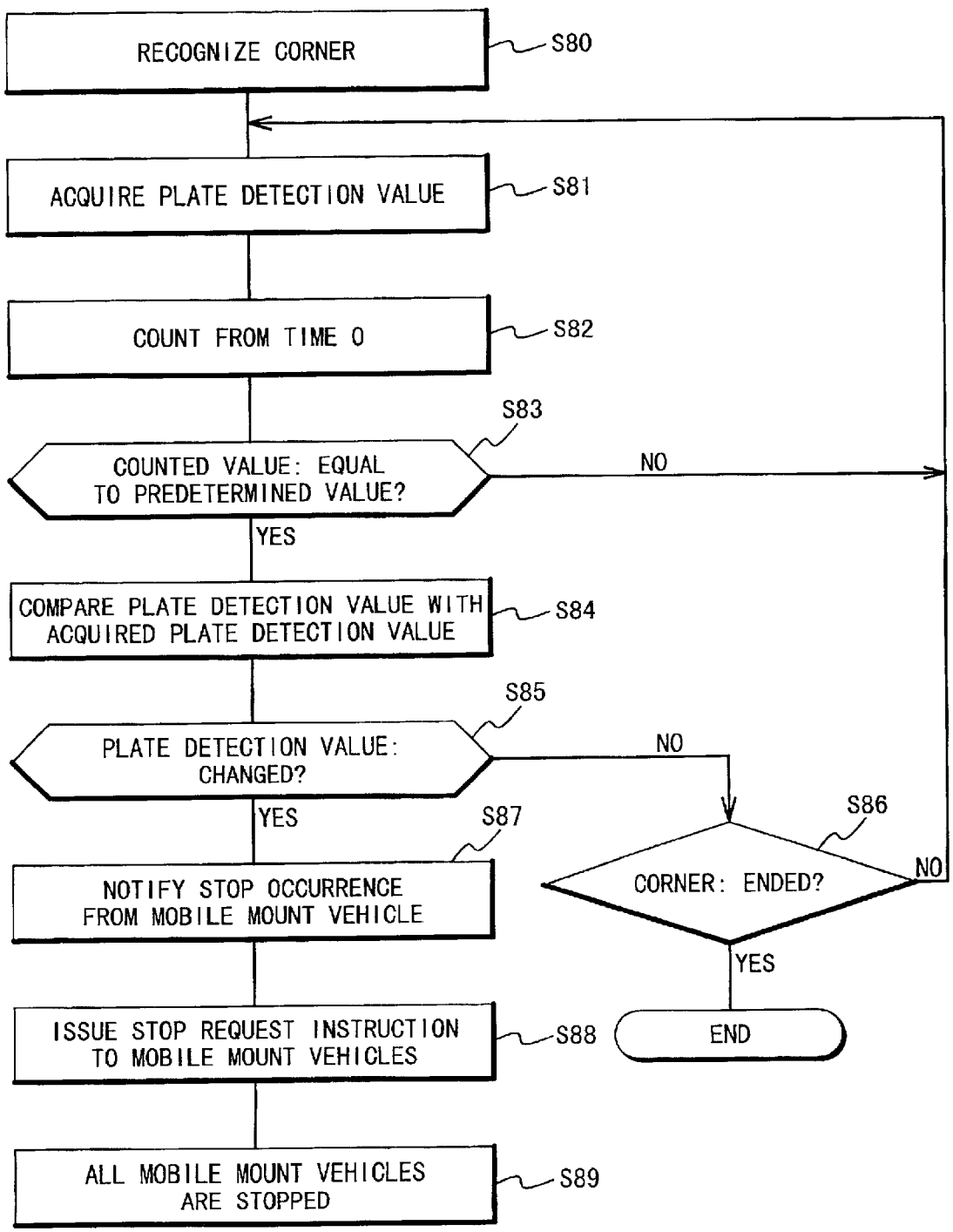
FIG. 19 is a flowchart showing the first operation example of the travel controlling method on the corner in the assembly carrying vehicle travel control system of the present invention.

Next, a first operation example of the running controlling method on the corner in the assembly carrying vehicle running control system of the present invention will be described below. FIG. 19 is a flowchart showing the first operation example of the running controlling method on the corner in the present invention.

Referring to FIG. 19, at first, the assembly carrying vehicle 300 recognizes the corner 401 (Step S80). Here, a recognizing operational example of the corner 401 by the assembly carrying vehicle 300 will be described below.

The assembly carrying vehicle 300 detects the indication plate 402 by use of the indication plate detection sensor 362. At this time, for example, the indication plates 402 are provided in such a manner that the interval between the indication plates 402 is wider at a location other than the corner 401 than the interval the indication plates 402 on the corner 401. Accordingly, the assembly carrying vehicle 300 can recognize the corner 401. Instead, the assembly carrying vehicle 300 may read a data recorded on an ID tag provided along the orbit to thereby recognize the corner 401. Otherwise, an operation table 316 may be stored in the assembly carrying vehicle 300 to indicate an operation at a predetermined position. In this case, the assembly carrying vehicle 300 can retrieve the operation mode data 1164 from the operation table 316 by use of a current position measured by the assembly carrying vehicle 300 as a key. Thus, the assembly carrying vehicle 300 can recognize the corner 401. Otherwise, the assembly carrying vehicle 300 may detect a predetermined indication is plate (not shown), which is provided along the orbit 400 and is different, by use of the indication plate detection sensor 362. Thus, the assembly carrying vehicle 300 can recognize the corner 401.

Next, the assembly carrying vehicle 300 runs on the recognized corner 401 and the indication plate detection sensor 362 detects one indication plate 402. Subsequently, the indication plate counter pointer 2000 of the indication plate table 317 is incremented by one. Then, the control unit 310 temporarily holds the incremented value of the indication plate counter pointer 2000 (Step S81). Also, a timer is set to 0 at the execution of the operation at the step S81, and a time is counted by referring to the timer section 315 (Step S82).

It is determined whether or not the time counted at the step S82 becomes equal to a preset time (Step S83). If N at the step S83, the operation flow returns the step S81, and the operations of and subsequent to the step S81 are carried out. During the operation loop, the assembly carrying vehicle 300 continues to run on the orbit 400 and detects the next indication plate 402. When the next indication plate 402 is detected, the indication plate counter pointer 2000 of the indication plate table 317 is incremented by one. Also, the running distance detecting section 312 detects the running distance of the assembly carrying vehicle 300 based on the pulses from the rotation position sensor 330. Thus, the current position data 3004 of the status table 318 is updated based on the detected running distance during the running of the assembly carrying vehicle 300.

If Y at the step S83, the value of the indication plate counter pointer 2000 for the next indication plate 402 is compared with the value of the pointer 2000 obtained held at the step S81 (Step S84). As the compared result at the step S84, when the values are different from each other (Step S85), it is determined whether or not the assembly carrying vehicle 300 passed through the corner 401, based on the detected running distance from the indication plate detected at the step S81 and the interval between the indication plates 402. When it is determined that the assembly carrying vehicle 300 does not yet pass through the corner 401 (Step S86), the operational flow returns back to the operation at the step S81 again. When it is determined that the assembly carrying vehicle 300 already passed through the corner 401 (Step S86), the operational flow is ended.

As the compared result at the step S84, when both of the values are equal to each other (Step S85), it is recognized that the assembly carrying vehicle 300 itself running on that corner is stopped. Then, the stop occurrence signal is notified to the control apparatus 100 through the communicating access point AP 200 to request the stops of other assembly carrying vehicles 300 (Step S87).

When receiving the stop occurrence signal, the control apparatus 100 instructs the stop request signal to all the assembly carrying vehicles 300 through the access point AP 200 to instruct the urgent stops of all the assembly carrying vehicles 300 running on the orbit 400 (Step S88). All the assembly carrying vehicles 300 running on the orbit 400 are stopped in accordance with the stop request signal (Step S89).

Here, various conditions required in order that a succeeding assembly carrying vehicle 300 does not collide with the urgently stopped assembly carrying vehicle 300 will be described.

At first, it is supposed that a speed of the assembly carrying vehicle is V m/s, an interval between the plurality of indication plates arranged on the corner 401 is I m, a running interval between the assembly carrying vehicles 300 is W m, a preset time indicated at the step S83 is T1 s and a time required to execute the operations from the step S87 to the step S89 is T2 s. Also, the time is a reciprocating communication time between the assembly carrying vehicle 300 and the control apparatus 100. In this case, the collision of the assembly carrying vehicle 300 with the preceding assembly carrying vehicle can be avoided, if the following equations (1) and (2) are satisfied.

$$I < T1 \times V \qquad (1)$$

$$T1 < W/V - T2 \qquad (2)$$

Figure 20:
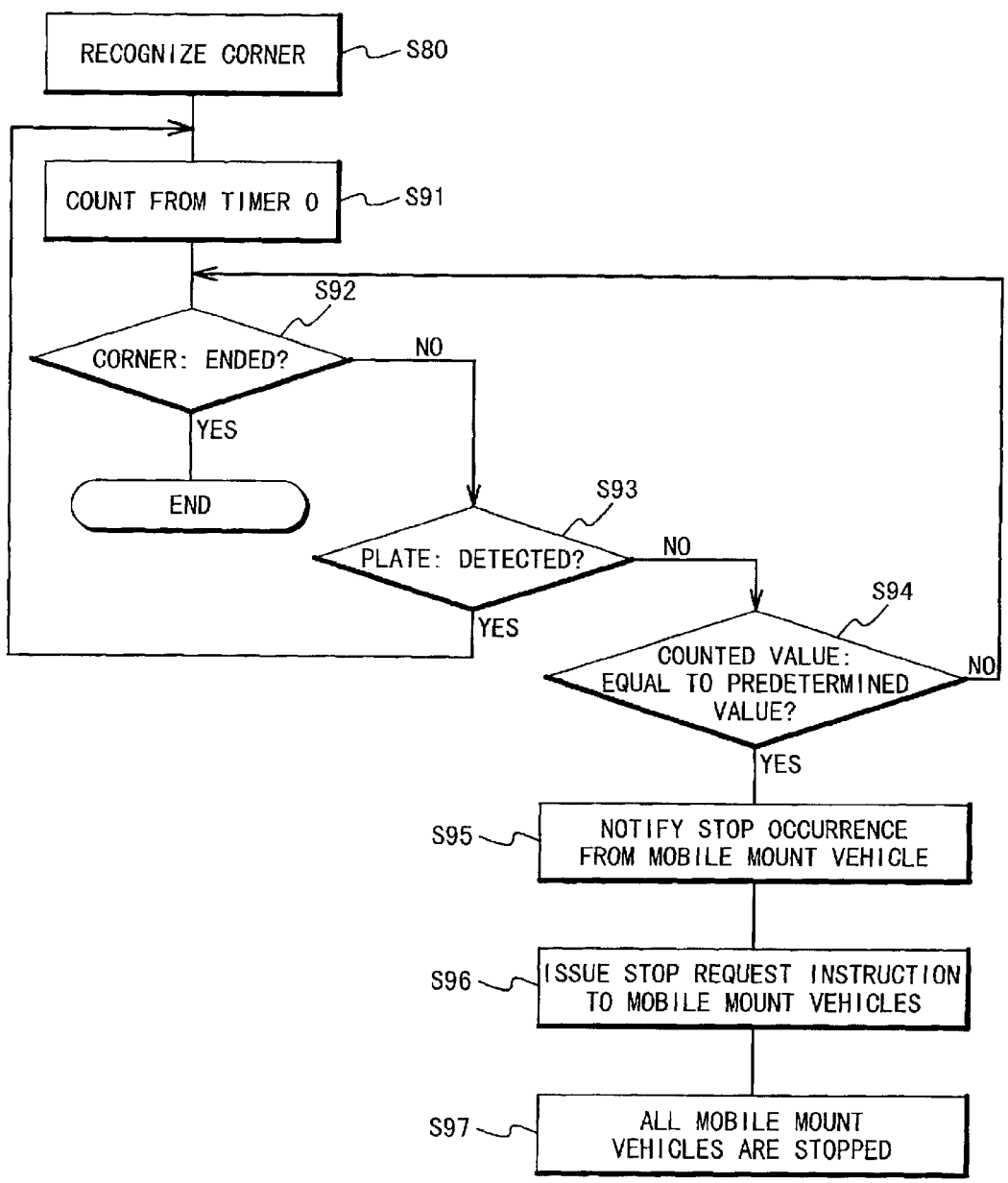
FIG. 20 is a flowchart showing the second operation example of the travel controlling method on the corner in the assembly carrying vehicle travel control system of the present invention.

The second operation example of the running controlling method on the corner in the assembly carrying vehicle running control system of the present invention will be described below. FIG. 20 is a flowchart showing the second operation example of the running controlling method on the corner in the present invention.

Referring to FIG. 20, at first, an assembly carrying vehicle 300 recognizes the corner 401 (Step S80). This operation is identical to that of the first operation example of the assembly carrying vehicle control method on the corner.

The assembly carrying vehicle 300 sets a timer to 0, and then refers to the timer section 315 to further count a time (Step S91). It is determined whether the assembly carrying vehicle 300 recognizes that it passed through the corner 401 (Step S92). If Y at the step S92, the operation flow is ended.

If N at the step S92, it is determined whether the indication plate detection sensor 362 detects the indication plate 402 (Step S93). If Y at the step S93, the operation flow returns to the step S91 and the operations of and subsequent to the step S91 are carried out.

If N at the step S93, it is determined whether the timer indicates a preset time (Step S94). If N at the step S94, the operation flow returns to the step S92 and the operations of and subsequent to the step S92 are carried out. If Y at the step S94, the control unit 310 of the assembly carrying vehicle 300 recognizes that the assembly carrying vehicle 300 stops on this corner. Then, the control unit 310 of assembly carrying vehicle 300 notifies the stop occurrence signal to the control apparatus 100 through the communicating access point AP 200 (Step S95).

When receiving the stop occurrence signal, the control apparatus 100 issues the stop request signal to all the assembly carrying vehicles 300 running on the orbit 400 through the access points AP 200 (Step S96). All the assembly carrying vehicles 300 running on the orbit 400 are stopped in accordance with the stop request signal (Step S97).

Also, the operation for recognizing whether or not the assembly carrying vehicle 300 passed through the corner 401 as shown at the step S92 is identical to the operation at the step S86 in the first operation example.

Also, various conditions are required in order that the urgently stopped assembly carrying vehicle 300 does not collide with a succeeding assembly carrying vehicle 300, in the second operation example in the assembly carrying vehicle running control system of the present invention.

It is supposed that a speed of the assembly carrying vehicle is V m/s, an interval between the plurality of indication plates arranged on the corner 401 is I m, a running interval between the assembly carrying vehicles 300 is W m, a preset time indicated at the step S94 is T1 s and a time required to execute the operations from the step S94 to the step S96 is T2 s. Also, the required time is a reciprocating communication time between the assembly carrying vehicle 300 and the control apparatus 100. In this case, the collision with the succeeding assembly carrying vehicle with the assembly carrying vehicle 300 can be avoided if the above-mentioned equations (1) and (2) are satisfied.

Also, the assembly carrying vehicle running control system of the present invention is driven under a condition that the maximum running speed of the assembly carrying vehicle is 1.5 m/s and the minimum interval from a preceding assembly carrying vehicle is 0.8 m. When a preceding assembly carrying vehicle is urgently stopped, a succeeding assembly carrying vehicle collides with the preceding assembly carrying vehicle, unless the urgent stop request signal is issued to the succeeding assembly carrying vehicle within about 500 ms after the urgent stop of the preceding assembly carrying vehicle. Therefore, in the assembly carrying vehicle running control system of the present invention, it is sufficient to carry out the replicating communication between the assembly carrying vehicle and the control apparatus within 400 ms.

From the viewpoint of the above-mentioned conditions, it is supposed that a time necessary for the assembly carrying vehicle to determine the presence or absence of the detection of the indication plate is set to be equal to or less than 100 ms. In this case, the stop request signal can be notified to the succeeding assembly carrying vehicles within about 500 ms after the occurrence of the urgent stop of the preceding assembly carrying vehicle on the corner.

Also, the high speed roaming operation in the assembly carrying vehicle running control system of the present invention is carried out in several tens of milliseconds or in hundred milliseconds or less at most. Also, the access points AP are selected which are physically close to the communicating access point AP or/and provided in the travelling direction of the assembly carrying vehicle. Thus, the high speed roaming operation is substantially applied to the access point AP switching operation. Hence, in the assembly carrying vehicle running control system of the present invention, the collision between the assembly carrying vehicles due to the failure occurring in the assembly carrying vehicle running on the corner can be avoided or reduced, in case of using the radio communication method for the communication between the control apparatus and the assembly carrying vehicle. Although there have been described what are the present embodiments of the invention, it will be understood that various changes and variations may be made there to without departing from the gist or spirit of the invention. The scope of the invention is indicated by the appended claims.

What is claimed is:

1. An assembly carrying vehicle travel control system, comprising:

a plurality of assembly carrying vehicles;

a control apparatus; and a plurality of access points connected with said control apparatus and provided for said plurality of assembly carrying vehicles;

each of said plurality of access points has a communication area;

when each of said plurality of assembly carrying vehicles is individually in the communication area of a currently communicating one of said access points, said assembly carrying vehicle transmits an operation status data indicative of an operation status thereof to said control apparatus through said currently communicating access point, said control apparatus determines an operation control instruction based on said operation status data and transmits said instruction to said assembly carrying vehicle, and said assembly carrying vehicle receives said operation control instruction from said control apparatus through said currently communicating access point such that an operation of said assembly carrying vehicle is controlled based on said operation control instruction.

2. The assembly carrying vehicle travel control system according to claim 1, wherein said control apparatus issues a state notice request signal to said plurality of access points, each of said plurality of access points transmits an access point operating state data indicating an operating state thereof to said control apparatus, and said control apparatus determines a failed one of said plurality of access points based on said access point operating state data.

3. The assembly carrying vehicle travel control system according to claim 2, wherein each of said plurality of access points has a peculiar data and transmits said peculiar data to said control apparatus in response to said state notice request signal from said control apparatus when said access point has not failed, and said control apparatus determines said failed access point from the peculiar data transmitted from said plurality of access points.

4. The assembly carrying vehicle travel control system according to claim 2, wherein each of said plurality of access points has a peculiar data and transmits said peculiar data to said control apparatus in response to said state notice request signal from said control apparatus when said access point has failed, and said control apparatus determines said failed access point from the peculiar data transmitted from said plurality of access points.

5. The assembly carrying vehicle travel control system according to claim 1, wherein said control apparatus and said plurality of access points are connected with a LAN using Ethernet.

6. The assembly carrying vehicle travel control system according to claim 1, wherein said plurality of access points are arranged such that electric field intensity levels of reception signals from a predetermined number of ones of said plurality of access points are equal to or higher than a first threshold intensity level.

7. The assembly carrying vehicle travel control system according to claim 6, wherein said plurality of access points are arranged such that the electric field intensity level of the reception signal from at least one of said predetermined number of access points is equal to or higher than a second threshold intensity level, and said second threshold intensity level is higher than said first threshold intensity level.

8. The assembly carrying vehicle travel control system according to claim 6, wherein said predetermined number is at least 2.

9. The assembly carrying vehicle travel control system according to claim 1, wherein said plurality of access points are arranged such that electric field intensity levels of reception signals from two or more of said plurality of access points are at least a predetermined threshold intensity level.

10. The assembly carrying vehicle travel control system according to claim 1, wherein said currently communicating access point includes a communicating unit to communicate with said assembly carrying vehicle, said control apparatus transmits said operation control instruction to said assembly carrying vehicle via said currently communicating access point, and each said assembly carrying vehicle includes:

a communicating unit communicating with said currently communicating access point and with said control apparatus via said currently communicating access point; and a control unit controlling said operation of said assembly carrying vehicle based on said operation control instruction received from said control apparatus via said currently communicating access point.

11. The assembly carrying vehicle travel control system according to claim 10, wherein the communication between said currently communicating access point and said assembly carrying vehicle is a spectrum spreading communication of a frequency hopping system.

12. The assembly carrying vehicle travel control system according to claim 10, wherein said control apparatus determines said operation status of said assembly carrying vehicle based on said operation status data transmitted from said assembly carrying vehicle, and transmits an operation data indicative of said determined operation status as said operation control instruction to said assembly carrying vehicle.

13. The assembly carrying vehicle travel control system according to claim 10, wherein said assembly carrying vehicle further includes:

a high speed roaming table which stores next communicatable ones of said plurality of access points, wherein said next communicatable access points are associated with said currently communicating access point; and said control unit selects one of said next communicatable access points stored in said high speed roaming table as a new currently communicating access point when an electric field intensity of a reception signal from said currently communicating access point becomes lower than a predetermined threshold intensity level.

14. The assembly carrying vehicle travel control system according to claim 13, wherein each of said plurality of access points also includes a high speed roaming table to store said next communicatable access points, said communicating unit of said assembly carrying vehicle receives said next communicatable access points from said currently communicating access point, said control unit stores said next communicatable access points received from said currently communicating access point in said high speed roaming table of said assembly carrying vehicle.

15. The assembly carrying vehicle travel control system according to claim 14, wherein said control apparatus includes:

an input unit used to input said next communicatable access points for each of said plurality of access points; and a which notifies unit notifying the inputted next communicatable access points to said plurality of access points, respectively, and each of said plurality of access points stores said next communicatable access points received from said control apparatus in said roaming table thereof.

16. The assembly carrying vehicle travel control system according to claim 13, wherein said control unit selects one, having a maximum reception signal electric field intensity level, of said next communicatable access points stored in said high speed roaming table of said assembly carrying vehicle, when the reception signal electric field intensity level from said currently communicating access point is lower than said predetermined threshold intensity level.

17. The assembly carrying vehicle travel control system according to claim 10, wherein each of said plurality of assembly carrying vehicles has a status table indicating said operation status of said assembly carrying vehicle, and said communicating unit of said assembly carrying vehicle transmits a data of said status table as said operation status data to said control apparatus through said currently communicating access point.

18. The assembly carrying vehicle travel control system according to claim 17, wherein said data of said status table includes:
   a current position data indicative of a current position of said assembly carrying vehicle;
   said operation status data indicative of said operation status of said assembly carrying vehicle; and
   a failure indication data indicative of a failure in said assembly carrying vehicle, and
   said communicating unit notifies said operation status data of said assembly carrying vehicle to said control apparatus, when said operating status data or said failure indication data of said assembly carrying vehicle is updated.

19. The assembly carrying vehicle travel control system according to claim 18, wherein said control apparatus further includes:
   a display unit displaying at least one of said current position of said assembly carrying vehicle, said operation status thereof, and existence or non-existence of the failure based on said operation status data transmitted from said assembly carrying vehicle.

20. The assembly carrying vehicle travel control system according to claim 10, further comprising:
   a plurality of position indication members provided along an orbit, said assembly carrying vehicle traveling on said orbit, and
   wherein each said assembly carrying vehicle further includes:
   a position indication member detector which detects each of said plurality of indication members; and
   a running distance measuring unit which measures a running distance of said assembly carrying vehicle from a start point of said orbit to a current position of said assembly carrying vehicle, or from one of said plurality of position indication members to a next one of said plurality of position indication members.

21. The assembly carrying vehicle travel control system according to claim 20, wherein said communicating unit of said assembly carrying vehicle transmits a failure indication data to said control apparatus when a difference between a position corresponding to one of said position indication members detected by said position indication member detector and a position corresponding to the running distance measured by said running distance measuring unit is larger than a predetermined value.

22. The assembly carrying vehicle travel control system according to claim 20, wherein said running distance measuring unit measures the running distance of said assembly carrying vehicle based on a number of rotations of a motor to drive a wheel of said assembly carrying vehicle.

23. The assembly carrying vehicle travel control system according to claim 20, wherein each of said assembly carrying vehicles further includes:
   an operation table which stores a plurality of operation data indicative of operations to be executed by said assembly carrying vehicle, and
   said control unit acquires a specific one of said plurality of operation data from said operation table and carries out the operation corresponding to the acquired operation data.

24. The assembly carrying vehicle travel control system according to claim 23, wherein said communicating unit receives a plurality of operation data from said control apparatus at a start point of said orbit, and
   said control unit stores said plurality of operation data received by said communicating unit in said operation table.

25. The assembly carrying vehicle travel control system according to claim 24, wherein said plurality of operation data are stored by said control unit in said operation table in an order of execution, and
   said control unit accesses said operation table based on a number of position indication members detected by said position indication member detector from said start point of said orbit to acquire one of said plurality of operation data, and executes the operation corresponding to said acquired operation data.

26. The assembly carrying vehicle travel control system according to claim 24, wherein said plurality of operation data are stored in said operation table based on the distance from the start point of said orbit, and
   said control unit accesses said operation table based on the running distance measured by said running distance measuring unit to acquire one of said plurality of operation data, and executes the operation corresponding to said acquired operation data.

27. The assembly carrying vehicle travel control system according to claim 24, wherein each of said plurality of operation data received by said communicating unit contains a distance data, and
   said control unit searches said operation table for one of said plurality of operation data having a distance data corresponding to the running distance measured by said running distance measuring unit, and carries out any said operation data found by said search.

28. The assembly carrying vehicle travel control system according to claim 27, wherein said control unit continues to carry out a current one of said operation data, when any said operation data having the distance data corresponding to the running distance measured is not found by said search.

29. The assembly carrying vehicle travel control system according to claim 20, wherein said control unit transmits said operation status data indicative of failure occurrence to said control apparatus when said position indication member detector does not detect any position indication member for a predetermined time interval after a previous position indication member is detected,
   then said control apparatus transmits a stop request signal as said operation control instruction to said plurality of assembly carrying vehicles, and
   said control unit of said assembly carrying vehicle stops the running of said assembly carrying vehicle in response to said stop request signal.

30. The assembly carrying vehicle travel control system according to claim 29, wherein said control system is operative according to the equations $$I < T1 \times V$$

$$T1 < W/V - T2$$

where I is a distance between the previous position indication member and the position indication member to be currently detected, T1 is said predetermined time interval, V is a velocity of said assembly carrying vehicle, W is a distance between said assembly carrying vehicle and a preceding one of said plurality of assembly carrying vehicles, and T2 is a time interval from transmission of said operation status data indicative of failure occurrence by said preceding assembly carrying vehicle to reception of said stop request signal.

31. The assembly carrying vehicle travel control system according to claim 20, wherein said current position of said assembly carrying vehicle is updated based on a position data corresponding to said position indication members detected by said position indication member detector.

32. A control method of an assembly carrying vehicle in an assembly carrying vehicle travel control system, comprising the steps of:
arranging a plurality of position indication members along an orbit, each of a plurality of assembly carrying vehicles running on said orbit;
providing a plurality of access points connected to a control apparatus, each of said plurality of access points has a communication area, and each said assembly carrying vehicle being communicatable with one of said plurality of access points as a currently communicating access point when said assembly carrying vehicle is in the communication area of said one access point;
transmitting from said assembly carrying vehicle an operation status data indicative of an operation status thereof to said control apparatus through said currently communicating access point;
determining by said control apparatus an operation control instruction based on said operation status data, and transmitting said operation control instruction to said assembly carrying vehicle;
receiving said operation control instruction by said assembly carrying vehicle from said control apparatus through said currently communicating access point; and
controlling operation of said assembly carrying vehicle based on said operation control instruction received from said control apparatus via said currently communicating access point.

33. The control method according to claim 32, further comprising the steps of:
detecting each of said plurality of position indication members; and
measuring a running distance of said assembly carrying vehicle from a start point of said orbit to a current position of said assembly carrying vehicle, or from one of said plurality of indication members to a next one of said plurality of indication members;
determining a current position of said assembly carrying vehicle based on at least one of said detected position indication members or said measured running distance:
receiving and storing a plurality of operation data indicative of operations to be executed by said assembly carrying vehicle in an operation table; and
controlling said operation of said assembly carrying vehicle based on a specific one of said plurality of operation data which is determined based on said determined current position;
updating a status table indicating said operation status of said assembly carrying vehicle based on at least one of change of said operation status of said assembly carrying vehicle, change of said at least one detected position indication member or said measured running distance, and a failure of said assembly carrying vehicle; and
transmitting said status table as said operation status data from said assembly carrying vehicle to said control apparatus.

34. The control method according to claim 33, further comprising the step of:
displaying at least one of said current position of said assembly carrying vehicle, said operation status thereof, and existence or non-existence of said failure of said assembly carrying vehicle based on said operation status data notified from said assembly carrying vehicle.

35. The control method according to claim 33, further comprising the step of:
transmitting a failure indication data from said assembly carrying vehicle to said control apparatus when a difference between a position corresponding to a detected one of said position indication members and a position corresponding to the measured running distance of said assembly carrying vehicle is larger than a predetermined value.

36. The control method according to claim 33, wherein said measuring step includes:
measuring the running distance of said assembly carrying vehicle based on a number of rotations of a motor driving a wheel of said assembly carrying vehicle.

37. The control method according to claim 33, wherein said step of receiving and storing a plurality of operation data includes:
receiving said plurality of operation data from said control apparatus at a start point of said orbit; and
storing said plurality of received operation data in said operation table.

38. The control method according to claim 37, wherein said step of storing said plurality of received operation data includes:
storing said plurality of received operation data in said operation table in an order of execution; and
said step of controlling operation of said assembly carrying vehicle includes:
accessing said operation table based on a number of position indication members detected from said start point of said orbit to acquire one of said plurality of operation data; and
carrying out the operation corresponding to said acquired one of said plurality of operation data.

39. The control method according to claim 37, wherein said step of storing said plurality of received operation data includes:
storing said plurality of received operation data in said operation table based on the running distance from the start point of said orbit, and
said step of controlling an operation of said assembly carrying vehicle includes:
accessing said operation table based on said measured running distance to acquire one of said plurality of operation data; and
carrying out the operation corresponding to said acquired one of said plurality of operation data.

40. The control method according to claim 37, wherein each of said plurality of operation data contains a distance data, and
said step of controlling an operation of said assembly carrying vehicle includes:
searching said operation table for a specific one of said plurality of operation data having a distance data corresponding to the measured running distance and carrying out any said operation data found by the search.

41. The control method according to claim 40, wherein said step of controlling an operation of said assembly carrying vehicle includes:

continuing to carry out a current operation data when any operation data having the distance data corresponding to the measured running distance is not found by the search.

42. The control method according to claim 33, wherein said step of controlling an operation of said assembly carrying vehicle includes:

transmitting said operation status data indicative of failure occurrence to said control apparatus when any of said position indication members is not detected for a predetermined time interval after a previous position indication member is detected, wherein said control method further comprises the step of:

transmitting by said control apparatus a stop request signal as said operation control instruction to said assembly carrying vehicle upon receiving said operation status data indicative of failure, and said step of controlling an operation of said assembly carrying vehicle stops the running of said assembly carrying vehicle in response to said stop request signal.

43. The control method according to claim 42, wherein the method is operative according to the equations $$I < T1 \times V$$

$$T1 < W/V - T2$$

where I is a distance between the previous position indication member and the position indication member currently detected, T1 is said predetermined time interval, V is a velocity of said assembly carrying vehicle, W is a distance between said assembly carrying vehicle and a preceding one of said plurality of assembly carrying vehicles, and T2 is a time interval from transmission of said operation status data indicative of failure occurrence by said preceding assembly carrying vehicle to reception of said stop request signal.

44. The control method according to claim 33, wherein said current position of said assembly carrying vehicle is updated based on a position data corresponding to said detected position indication members.

45. The control method according to claim 32, wherein said step of providing a plurality of access points includes:

transmitting a state notice request signal from said control apparatus to said plurality of access points;

transmitting from each of said plurality of access points an access point operating state data indicating an operating state thereof to said control apparatus; and determining a failed one of said plurality of access points by said control apparatus based on said access point operating state data.

46. The control method according to claim 45, wherein each of said plurality of access points has a peculiar data, and wherein said control method further comprises the step of:

notifying said peculiar data from each of said plurality of access points to said control apparatus in response to said state notice request signal from said control apparatus, when said access point has not failed; and said step of determining a failed one of said access points involves determining said failed one of said access points from the notified peculiar data from said plurality of access points.

47. The control method according to claim 45, wherein each of said plurality of access points has a peculiar data, and wherein said control method further comprises the step of:

notifying said peculiar data from each of said plurality of access points to said control apparatus in response to said state notice request signal from said control apparatus, when said access point has failed; and said step of determining a failed one of said access points involves determining said failed one of said access points from the notified peculiar data from said plurality of access points.

48. The control method according to claim 32, wherein said control apparatus and said plurality of access points are connected with a LAN using Ethernet.

49. The control method according to claim 32, wherein said step of providing a plurality of access points includes:

arranging said plurality of access points such that electric field intensity levels of reception signals from a predetermined number of ones of said plurality of access points are higher than a first threshold intensity level.

50. The control method according to claim 49, wherein said step of providing a plurality of access points includes:

arranging said plurality of access points such that the electric field intensity level of the reception signal from at least one of said predetermined number of access points is higher than a second threshold intensity level, said second threshold intensity level is higher than said first threshold intensity level.

51. The control method according to claim 49, wherein said predetermined number is at least 2.

52. The control method according to claim 32, wherein said step of providing a plurality of access points includes:

arranging said plurality of access points such that electric field intensity levels of reception signals from at least two of said plurality of access points are higher than a predetermined threshold intensity level.

53. The control method according to claim 32, wherein communication between said currently communicating access point and said assembly carrying vehicle is a spectrum spreading communication of a frequency hopping system.

54. The control method according to claim 32, wherein said step of determining an operation control instruction includes:

determining said operation status of said assembly carrying vehicle by said control apparatus based on said operation status data transmitted from said assembly carrying vehicle; and transmitting an operation data indicative of said determined operation status as said operation control instruction to said assembly carrying vehicle.

55. The control method according to claim 32, further comprising the step of:

selecting one of next communicatable access points stored in a high speed roaming table of said assembly carrying vehicle as a new currently communicating access point, when an electric field intensity of a reception signal from said currently communicating access point becomes lower than a predetermined threshold intensity level, wherein said next communicatable access points are associated with said currently communicating access point.

56. The control method according to claim 55, wherein each of said plurality of access points also includes a high speed roaming table to store said next communicatable access points, and said step of selecting one of next communicatable access points includes:

receiving said next communicatable access points from said currently communicating access point to store in said high speed roaming table of said assembly carrying vehicle.

57. The control method according to claim 55, wherein said selecting step includes:

selecting one, having a maximum reception signal electric field intensity level, of said next communicatable access points stored in said high speed roaming table of said assembly carrying vehicle, when the reception signal electric field intensity level from said currently communicating access point is lower than a predetermined threshold intensity level.

58. The control method according to claim 56, wherein said selecting step includes:

inputting said next communicatable access points for each of said plurality of access points in said control apparatus;

transmitting the inputted next communicatable access points to said plurality of access points, respectively; and storing said next communicatable access points received from said control apparatus in said roaming table of each of said plurality of access points.

* * * * *

UNITED STATES PATENT AND TRADEMARK OFFICE
CERTIFICATE OF CORRECTION

PATENT NO.     : 6,484,077 B1
DATED          : November 19, 2002
INVENTOR(S)    : Noriyuki Unose et al.

It is certified that error appears in the above-identified patent and that said Letters Patent is hereby corrected as shown below:

Title Page,
Add the following data,
Item -- [30]     Foreign Application Priority Data
        Jul. 30, 1999     (JP) .......     1999-216030
        Jul. 30, 1999     (JP) .......     1999-216031
        Jul. 30, 1999     (JP) .......     1999-216032
        Jul. 30, 1999     (JP) .......     1999-216033
        Jul. 30, 1999     (JP) .......     1999-216034
        Jul. 30, 1999     (JP) .......     1999-216035
        Jul. 30, 1999     (JP) .......     1999-216036
        Jul. 30, 1999     (JP) .......     1999-216037 -- .
Add the following data,
Item -- [74] *Attorney, Agent, or Firm* - Carrier, Blackman & Associates, P.C.; Joseph P. Carrier; William D. Blackman --.

Column 1,
Line 30, change "in the" to -- in any such --.
Line 33, change "the station" to -- any such station --.
Line 59, delete "go".

Column 3,
Line 2, after "may" insert -- likely --.
Line 24, after "removed" insert -- or cancelled --.
Line 25, delete "or cancelled".

Column 4,
Line 29, change "can avoided" to -- can be avoided --.

Column 5,
Line 3, change "to transmits" to -- and transmits --.
Line 22, change "Alternately" to -- Alternatively --.
Line 52, change "vehicle" to -- vehicles -- .
Line 66, delete "status".
Line 67, after "determined operation" insert -- status --.

Column 6,
Line 29, change "which notifies unit" to -- notifying unit which notifies --.
Line 30, delete "notifying".
Line 63, change "measuring a" to -- which measures a --.

UNITED STATES PATENT AND TRADEMARK OFFICE
CERTIFICATE OF CORRECTION

PATENT NO. : 6,484,077 B1
DATED : November 19, 2002
INVENTOR(S) : Noriyuki Unose et al.

It is certified that error appears in the above-identified patent and that said Letters Patent is hereby corrected as shown below:

Column 7,
Line 25, change "control units accesses to" to -- control unit accesses --.
Line 32, change "and," to -- , and --; change "control units accesses to" to -- control unit accesses --.
Line 58, after "case" insert a comma; change "is a" to -- is --.

Column 8,
Line 12, after "steps of" insert a colon.
Line 26, after "data" insert a comma.

Column 9,
Line 54, change "include" to -- includes --.

Column 10,
Line 9, change "includes" to -- include --.
Line 10, delete "Also,".
Line 40, change "storing the step of" to -- step of storing the --.
Line 54, after "distance" insert a comma.
Line 56, after "carrying" insert -- vehicle --.
Line 57, delete "vehicle".
Line 59, change "distance measured" to -- running distance --.

Column 11,
Line 2, after "indicative" insert -- of failure --.

Column 12,
Line 34, after "vehicle" insert -- running or --.

Column 13,
Line 56, after "example" insert a comma.
Line 57, change "computer, 110," to -- computer 110, --.
Line 60, after "example" insert a comma.

Column 14,
Line 8, delete "asso-".
Line 9, change "ciated therewith AP 200 at the fixed point." to -- AP 200 at the fixed point associated therewith. --.

UNITED STATES PATENT AND TRADEMARK OFFICE
CERTIFICATE OF CORRECTION

PATENT NO. : 6,484,077 B1
DATED : November 19, 2002
INVENTOR(S) : Noriyuki Unose et al.

It is certified that error appears in the above-identified patent and that said Letters Patent is hereby corrected as shown below:

Column 15,
Line 22, after "example" insert a comma.
Line 30, change "to the sensor" to -- is provided to the sensors --.

Column 21,
Line 55, change "point" to -- points --.

Column 22,
Line 21, change "vehicle" to -- vehicles --.
Line 27, change "point" to -- points --.
Line 29, change "point" to -- points --.
Line 30, after "203" delete the period.

Column 23,
Line 28, after "state" change the period to a comma.
Line 67, change "of" to -- to -- .

Column 24,
Line 9, delete "with".
Line 44, change "3003" to -- 3002, the --.
Line 63, after "the" delete the comma.

Column 25,
Line 46, change "occured" to -- occurred --.

Column 26,
Line 21, change "speed" to -- spaced --.
Line 29, change "If" to -- if --.
Line 52, change "5112" to -- S112 --.

Column 30,
Line 27, change "position" to -- indication plate --.
Line 28, delete "indication plate".
Line 50, change "point" to -- points --.

Column 31,
Line 56, change "point" to -- points --.

UNITED STATES PATENT AND TRADEMARK OFFICE
CERTIFICATE OF CORRECTION

PATENT NO. : 6,484,077 B1
DATED : November 19, 2002
INVENTOR(S) : Noriyuki Unose et al.

It is certified that error appears in the above-identified patent and that said Letters Patent is hereby corrected as shown below:

Column 35,
Line 38, change "which" to -- by --.

Column 36,
Line 47, after "again" insert a comma.
Line 50, change "point" to -- points --.

Column 37,
Line 6, change "point" to -- points --.
Line 10, change "communicate" to -- communication --.
Line 44, after "3007" change the period to a comma.

Column 38,
Line 27, after "to the" delete the comma.
Line 50, change "contain" to -- contained --.
Line 52, after "again" insert a comma.

Column 39,
Line 4, delete "an" (second occurrence only).
Line 51, after "interval" insert -- between --.
Line 59, change "1164" to -- 1104 -- .
Line 64, change "is plate" to -- plate --.

Column 40,
Line 13, after "returns" insert -- to --.
Line 57, after "conditions" insert -- are --.

Column 42,
Line 41, change "there to" to -- thereto --.

Column 44,
Line 48, change "a which notifies unit notifying" to -- a notifying unit which notifies --.

Column 47,
Line 49, change the colon to a semicolon.

UNITED STATES PATENT AND TRADEMARK OFFICE
CERTIFICATE OF CORRECTION

PATENT NO. : 6,484,077 B1
DATED : November 19, 2002
INVENTOR(S) : Noriyuki Unose et al.

It is certified that error appears in the above-identified patent and that said Letters Patent is hereby corrected as shown below:

Column 48,
Line 66, after "distance" insert a comma.

Signed and Sealed this

Seventeenth Day of June, 2003

JAMES E. ROGAN
*Director of the United States Patent and Trademark Office*

UNITED STATES PATENT AND TRADEMARK OFFICE
CERTIFICATE OF CORRECTION

PATENT NO. : 6,484,077 B1
DATED : November 19, 2002
INVENTOR(S) : Noriyuki Unose et al.

It is certified that error appears in the above-identified patent and that said Letters Patent is hereby corrected as shown below:

Title Page,
Add the following data,
Item -- [30]  Foreign Application Priority Data
    Jul. 30, 1999  (JP) .......  1999-216030
    Jul. 30, 1999  (JP) .......  1999-216031
    Jul. 30, 1999  (JP) .......  1999-216032
    Jul. 30, 1999  (JP) .......  1999-216033
    Jul. 30, 1999  (JP) .......  1999-216034
    Jul. 30, 1999  (JP) .......  1999-216035
    Jul. 30, 1999  (JP) .......  1999-216036
    Jul. 30, 1999  (JP) .......  1999-216037 -- .
Add the following data,
Item -- [74] *Attorney, Agent, or Firm* - Carrier, Blackman & Associates, P.C.; Joseph P. Carrier; William D. Blackman --.

Column 1,
Line 31, change "assembly carrying vehicle is moved at a slow speed in the" to
-- assembly carrying vehicle is moved at a slow speed in any such --.
Line 34, change "tioned stated in the station in which the work is carried at by" to
-- tioned state in any such station in which the work is carried out by --.
Line 59, delete "go".

Column 3,
Line 2, after "may" insert -- likely --.
Line 24, after "removed" insert -- or cancelled --.
Line 25, delete "or cancelled".

Column 4,
Line 29, change "can avoided" to -- can be avoided --.

Column 5,
Line 3, change "to transmits" to -- and transmits --.
Line 22, change "Alternately" to -- Alternatively --.
Line 52, change "vehicle" to -- vehicles -- .
Line 66, delete "status".
Line 67, after "determined operation" insert -- status --.

Column 6,
Line 29, change "which notifies unit" to -- notifying unit which notifies --.
Line 30, delete "notifying".
Line 63, change "measuring a" to -- which measures a --.

UNITED STATES PATENT AND TRADEMARK OFFICE
CERTIFICATE OF CORRECTION

PATENT NO. : 6,484,077 B1
DATED : November 19, 2002
INVENTOR(S) : Noriyuki Unose et al.

It is certified that error appears in the above-identified patent and that said Letters Patent is hereby corrected as shown below:

Column 7,
Line 25, change "control units accesses to" to -- control unit accesses --.
Line 32, change "and," to -- , and --; change "control units accesses to" to -- control unit accesses --.
Line 58, after "case" insert a comma; change "is a" to -- is --.

Column 8,
Line 12, after "steps of" insert a colon.
Line 26, after "data" insert a comma.

Column 9,
Line 54, change "include" to -- includes --.

Column 10,
Line 9, change "includes" to -- include --.
Line 10, delete "Also,".
Line 40, change "storing the step of" to -- step of storing the --.
Line 54, after "distance" insert a comma.
Line 56, after "carrying" insert -- vehicle --.
Line 57, delete "vehicle".
Line 59, change "distance measured" to -- running distance --.

Column 11,
Line 2, after "indicative" insert -- of failure --.

Column 12,
Line 34, after "vehicle" insert -- running or --.

Column 13,
Line 56, after "example" insert a comma.
Line 57, change "computer, 110," to -- computer 110, --.
Line 60, after "example" insert a comma.

Column 14,
Line 8, delete "asso-".
Line 9, change "ciated therewith AP 200 at the fixed point." to -- AP 200 at the fixed point associated therewith. --.

UNITED STATES PATENT AND TRADEMARK OFFICE
CERTIFICATE OF CORRECTION

PATENT NO.    : 6,484,077 B1
DATED         : November 19, 2002
INVENTOR(S)   : Noriyuki Unose et al.

It is certified that error appears in the above-identified patent and that said Letters Patent is hereby corrected as shown below:

Column 15,
Line 22, after "example" insert a comma.
Line 30, change "to the sensor" to -- is provided to the sensors --.

Column 21,
Line 55, change "point" to -- points --.

Column 22,
Line 21, change "vehicle" to -- vehicles --.
Line 27, change "point" to -- points --.
Line 29, change "point" to -- points --.
Line 30, after "203" delete the period.

Column 23,
Line 28, after "state" change the period to a comma.
Line 67, change "of" to -- to --.

Column 24,
Line 9, delete "with".
Line 44, change "3003" to -- 3002, the --.
Line 63, after "the" delete the comma.

Column 25,
Line 46, change "occured" to -- occurred --.

Column 26,
Line 21, change "speed" to -- spaced --.
Line 29, change "If" to -- if --.
Line 52, change "5112" to -- S112 --.

Column 30,
Line 27, change "position" to -- indication plate --.
Line 28, delete "indication plate".
Line 50, change "point" to -- points --.

Column 31,
Line 56, change "point" to -- points --.

UNITED STATES PATENT AND TRADEMARK OFFICE
CERTIFICATE OF CORRECTION

PATENT NO. : 6,484,077 B1
DATED : November 19, 2002
INVENTOR(S) : Noriyuki Unose et al.

It is certified that error appears in the above-identified patent and that said Letters Patent is hereby corrected as shown below:

Column 35,
Line 38, change "which" to -- by --.

Column 36,
Line 47, after "again" insert a comma.
Line 50, change "point" to -- points --.

Column 37,
Line 6, change "point" to -- points --.
Line 10, change "communicate" to -- communication --.
Line 44, after "3007" change the period to a comma.

Column 38,
Line 27, after "to the" delete the comma.
Line 50, change "contain" to -- contained --.
Line 52, after "again" insert a comma.

Column 39,
Line 4, delete "an" (second occurrence only).
Line 51, after "interval" insert -- between --.
Line 59, change "1164" to -- 1104 -- .
Line 64, change "is plate" to -- plate --.

Column 40,
Line 13, after "returns" insert -- to --.
Line 57, after "conditions" insert -- are --.

Column 42,
Line 41, change "there to" to -- thereto --.

Column 44,
Line 48, change "a which notifies unit notifying" to -- a notifying unit which notifies --.

Column 47,
Line 49, change the colon to a semicolon.

UNITED STATES PATENT AND TRADEMARK OFFICE
CERTIFICATE OF CORRECTION

PATENT NO. : 6,484,077 B1
DATED : November 19, 2002
INVENTOR(S) : Noriyuki Unose et al.

It is certified that error appears in the above-identified patent and that said Letters Patent is hereby corrected as shown below:

<u>Column 48,</u>
Line 66, after "distance" insert a comma.

This certificate supersedes Certificate of Correction issued June 17, 2003.

Signed and Sealed this

Third Day of February, 2004

JON W. DUDAS
*Acting Director of the United States Patent and Trademark Office*